(12) United States Patent
Shimomura et al.

(10) Patent No.: US 10,578,843 B2
(45) Date of Patent: Mar. 3, 2020

(54) IMAGE PICKUP APPARATUS, REAR ATTACHMENT LENS, AND IMAGE PICKUP SYSTEM INCLUDING THE SAME

(71) Applicant: CANON KABUSHIKI KAISHA, Tokyo (JP)

(72) Inventors: Kazuya Shimomura, Utsunomiya (JP); Naotoshi Ogawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/997,125

(22) Filed: Jun. 4, 2018

(65) Prior Publication Data

US 2018/0284404 A1    Oct. 4, 2018

Related U.S. Application Data

(62) Division of application No. 15/218,209, filed on Jul. 25, 2016, now Pat. No. 10,012,821.

(30) Foreign Application Priority Data

Jul. 28, 2015   (JP) .................................. 2015-148595
Jul. 28, 2015   (JP) .................................. 2015-148596
Feb. 29, 2016  (JP) .................................. 2016-037528

(51) Int. Cl.
*G02B 15/08* (2006.01)
*G02B 5/20* (2006.01)
(Continued)

(52) U.S. Cl.
CPC ............. *G02B 15/08* (2013.01); *G02B 5/205* (2013.01); *G02B 7/006* (2013.01); *G02B 13/02* (2013.01)

(58) Field of Classification Search
CPC ........ G02B 13/02; G02B 15/02; G02B 15/06; G02B 15/08; G02B 15/10
(Continued)

(56) References Cited

U.S. PATENT DOCUMENTS 5,253,112 A    10/1993   Suzuki
6,058,269 A    5/2000    Tsutsumi
(Continued)

FOREIGN PATENT DOCUMENTS

JP    S58203409 A    11/1983
JP    H05142473 A     6/1993
(Continued)

OTHER PUBLICATIONS

Quayle Action issued in U.S. Appl. No. 15/218,209 dated Nov. 6, 2017.
(Continued)

*Primary Examiner* — Darryl J Collins
(74) *Attorney, Agent, or Firm* — Rossi, Kimms & McDowell LLP

(57) ABSTRACT

An image pickup apparatus includes: a mount to which an interchangeable lens is mountable; an image sensor; an optical system having a refractive power and imaging an object point located on an image side of a most-object-side surface of the optical system onto the image sensor; and an optical filter arranged between the optical system and the image sensor, and a distance on an optical axis from a flange surface of the mount to the object point located on the image side of the most-object-side surface, a distance on the optical axis from the flange surface of the mount to the image pickup element, and a lateral magnification of the optical system when the interchangeable lens is mounted to the image pickup apparatus and the object point located on the
(Continued)

image side of the most-object-side surface, is imaged onto the image pickup element, are appropriately set.

17 Claims, 26 Drawing Sheets

(51) Int. Cl.
*G02B 13/02* (2006.01)
*G02B 7/00* (2006.01)
(58) Field of Classification Search
USPC ....... 359/672, 675, 754–756, 761, 763, 770, 359/771, 781
See application file for complete search history.

(56) References Cited

U.S. PATENT DOCUMENTS

| | | | |
|---|---|---|---|
| 6,288,847 B1* | 9/2001 | Tsutsumi | G02B 15/10 359/675 |
| 6,704,053 B1 | 3/2004 | Niikawa et al. | |
| 6,995,920 B2 | 2/2006 | Nurishi | |
| 8,526,806 B2 | 9/2013 | Kikuchi | |
| 9,638,892 B2 | 5/2017 | Kikuchi | |
| 2003/0151827 A1 | 8/2003 | Tsutsumi | |
| 2005/0225876 A1 | 10/2005 | Nurishi | |
| 2013/0064532 A1 | 3/2013 | Caldwell et al. | |
| 2015/0346465 A1* | 12/2015 | Yonezawa | G02B 15/12 359/675 |

FOREIGN PATENT DOCUMENTS

| | | |
|---|---|---|
| JP | H11194268 A | 7/1999 |
| JP | H11258499 A | 9/1999 |
| JP | 2000019613 A | 1/2000 |
| JP | 2000022998 A | 1/2000 |
| JP | 2000122110 A | 4/2000 |
| JP | 2000330191 A | 11/2000 |
| JP | 2004287150 A | 10/2004 |
| JP | 2007081488 A | 3/2007 |
| JP | 2009186611 A | 8/2009 |
| JP | 2010015049 A | 1/2010 |
| JP | 2010191211 A | 9/2010 |
| JP | 2012222602 A | 11/2012 |
| JP | 2014073234 A | 4/2014 |
| JP | 2014170043 A | 9/2014 |

OTHER PUBLICATIONS

Notice of Allowance issued in U.S. Appl. No. 15/218,209 dated Mar. 13, 2018.
Office Action issued in Japanese Appln. No. 2015-148596 dated Apr. 2, 2019.
English translation of Japanese Office Action issued in Japanese Appln. No. 2015-148596 dated Apr. 2, 2019, previously cited in IDS filed Apr. 19, 2019.
English translation of Japanese Office Action issued in Japanese Appln. No. 2015-148595 dated May 9, 2019, previously cited in IDS filed Jun. 6, 2019.
English translation of Japanese Office Action issued in Japanese Appln. No. 2016-037528 dated Aug. 15, 2019, previously cited in IDS fled Sep. 9, 2019.
English translation of Japanese Office Action issued in Japanese Appln. No. 2015-148596 dated Nov. 28, 2019, previously cited in IDS filed Dec. 6, 2019.

* cited by examiner

IMAGE PICKUP APPARATUS, REAR ATTACHMENT LENS, AND IMAGE PICKUP SYSTEM INCLUDING THE SAME

BACKGROUND OF THE INVENTION

Field of the Invention

The present invention relates to an image pickup apparatus, and more particularly, to an image pickup apparatus to which an interchangeable lens is mountable, and which has a function of changing a focal length of the interchangeable lens, and to an image pickup system including the same.

Description of the Related Art

Hitherto, there have been proposed various methods of arranging an optical system between a photographing optical system (main lens system) and an image pickup element in order to change a focal length of the photographing optical system. For example, in Japanese Patent Application Laid-Open No. 2000-19613, there is proposed an image pickup apparatus, including an optical system configured to change a focal length of a photographing optical system to increase the focal length. In addition, in each of Japanese Patent Application Laid-Open No. H11-258499 and Japanese Patent Application Laid-Open No. H11-194268, there is proposed an attachment capable of increasing a focal length of an interchangeable lens serving as a photographing optical system by inserting an optical system between the interchangeable lens and an image pickup apparatus.

In recent years, image pickup apparatus, such as a television camera, a movie camera, a photographic camera, and a video camera, have been desired to increase both the number of pixels and sensitivity. Thus, there has been demanded an image pickup apparatus including a large-sized image pickup element. At the same time, a user may wish to use a resource of an existing interchangeable lens. Accordingly, for example, there is a strong need to use a ⅔-inch format interchangeable lens for a super-35 mm format image pickup apparatus including a larger image pickup element. In this case, an optical system configured to increase the focal length of the interchangeable lens needs to be arranged between the interchangeable lens and the image pickup element to enlarge an image circle of the interchangeable lens.

In Japanese Patent Application Laid-Open No. 2000-19613, there is proposed an image pickup apparatus according to one embodiment, in which a photographing optical system (main lens system) is arranged integrally with an image pickup apparatus main body. Thus, an interchangeable lens cannot be mounted to this image pickup apparatus. In Japanese Patent Application Laid-Open No. H11-258499 and Japanese Patent Application Laid-Open No. H11-194268, reduction in size and securement of a backfocus are not achieved sufficiently at the same time. Thus, further improvement is required.

SUMMARY OF THE INVENTION

It is an object of the present invention to provide an image pickup apparatus and a rear attachment lens, which have an action of changing a focal length of an interchangeable lens toward a magnification side and which are capable of achieving all of reduction in size of an optical system, securement of a backfocus, and high optical performance by setting a refractive power, a lens configuration, and aberration contribution of each lens.

In order to achieve the above-mentioned object, according to one embodiment of the present invention, there is provided an image pickup apparatus, including:
a mount to which an interchangeable lens is mountable;
an optical system;
an image pickup element; and
an optical filter arranged between the optical system and the image pickup element,
in which the optical system has a refractive power, and is configured to image an object point, which is located on an image side of a surface of the optical system that is closest to an object side, onto the image pickup element, and in which the following expressions are satisfied:

$1.0 < L/FB < 3.0$; and $1.0 < \beta < 3.0$, where FB represents a distance on an optical axis from a flange surface of the mount to the object point, which is located on the image side of the surface of the optical system that is closest to the object side, L represents a distance on the optical axis from the flange surface of the mount to the image pickup element, and β represents a lateral magnification of the optical system under a state in which the interchangeable lens is mounted to the image pickup apparatus and the object point, which is located on the image side of the surface of the optical system that is closest to the object side, is imaged onto the image pickup element.

Further, in order to achieve the above-mentioned object, according to another embodiment of the present invention, there is provided an image pickup apparatus, to which an interchangeable lens is mountable, the image pickup apparatus including:
an image pickup element; and
an optical system configured to change a focal length of the interchangeable lens,
in which the following expression is satisfied:

$0.1 < SK/Ls < 0.7$, where Ls represents a distance from a vertex of a lens surface of a lens of the optical system that is closest to an object side to the image pickup element and SK represents a distance from the image pickup element to a vertex of a lens surface of a lens closest to an image side among lenses of the optical system that have a refractive power.

Further, in order to achieve the above-mentioned object, according to another embodiment of the present invention, there is provided a rear attachment lens, which is configured to change a focal length of an interchangeable lens toward a magnification side by being mounted to an image side of the interchangeable lens, the rear attachment lens including, in order from an object side to the image side:
a negative lens portion;
an intermediate lens portion; and
a positive lens portion,
in which the intermediate lens portion includes one positive lens and one negative lens, and
in which the following conditional expressions are satisfied:

$0.01 < |fn/f| < 0.25$; and $1.8 < BFair/Lc < 3.5$, where fn and f represent focal lengths of the negative lens portion and the rear attachment lens, respectively, Lc represents a distance on an optical axis from a surface of the rear attachment lens that is closest to the object side to a surface of the rear attachment lens that is closest to the image side, and BFair represents a backfocus in air when the rear attachment lens is mounted to the interchangeable lens.

According to the present invention, it is possible to provide the image pickup apparatus and the rear attachment lens, which have an action of changing the focal length of the interchangeable lens toward the magnification side and which are capable of achieving all of reduction in size of the optical system, securement of the backfocus, and high optical performance by setting a refractive power, a lens configuration, and aberration contribution of each lens.

Further features of the present invention will become apparent from the following description of exemplary embodiments with reference to the attached drawings.

DESCRIPTION OF THE EMBODIMENTS

Now, exemplary embodiments of the present invention are described in detail based on the attached drawings.

Embodiment 1

Figure 1:
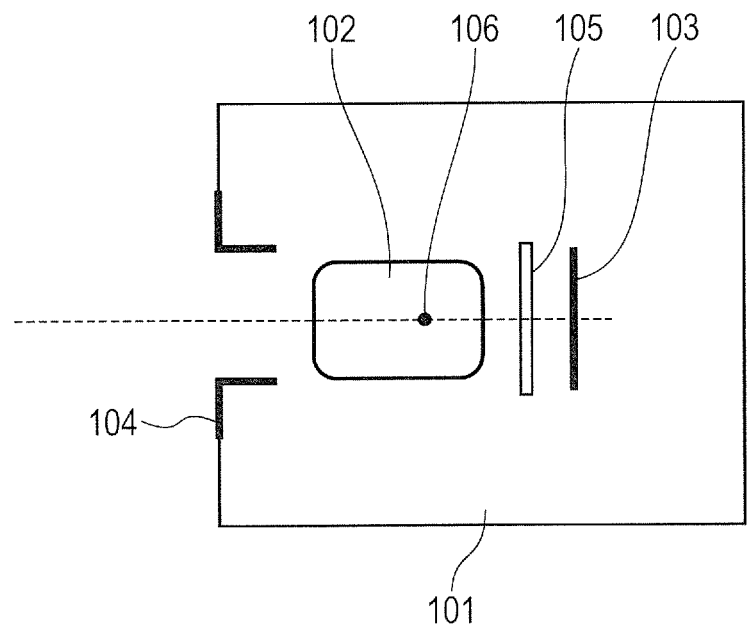
FIG. 1 is a basic configuration diagram according to Embodiment 1 of the present invention.

FIG. 1 is a basic configuration diagram according to Embodiment 1 of the present invention. An image pickup apparatus 101 according to the present invention includes an optical system 102, an image pickup element 103, and a mount 104 to which an interchangeable lens is mountable. The optical system 102 is configured to image an object point 105, which is located on an image side of a surface of the optical system 102 that is closest to an object side, onto the image pickup element 103. The object point 105 is an imaging point of the interchangeable lens when the interchangeable lens is mounted to the mount 104 and the image side of the interchangeable lens is air. That is, the optical system 102 is configured to image the imaging point of the interchangeable lens (the object point of the optical system 102) onto the image pickup element 103. The optical system 102 has a refractive power, and is configured to increase a focal length of the interchangeable lens and enlarge an image circle of the interchangeable lens. The image pickup apparatus according to the present invention has a feature in that an optical filter 106 is arranged between the optical system 102 and the image pickup element 103.

Figure 20:
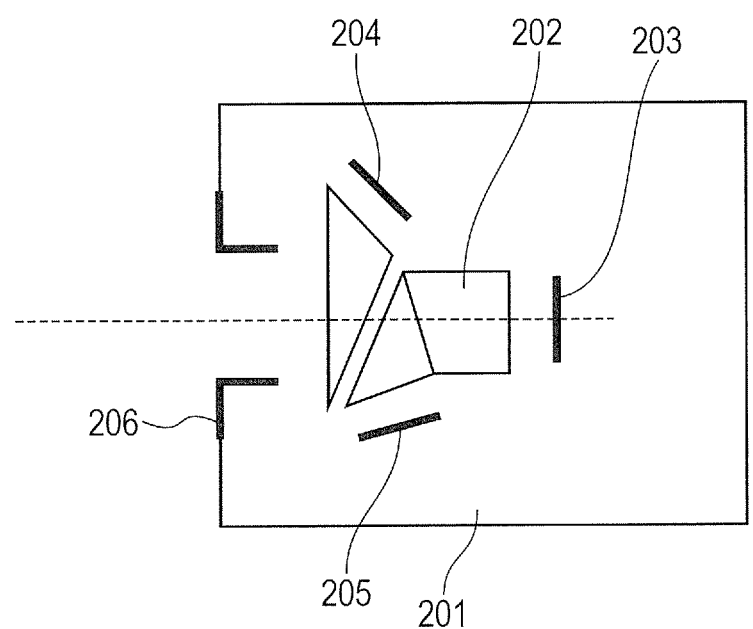
FIG. 20 is a basic configuration diagram of a three-image-sensor camera.

Next, the arrangement of the optical system 102 is described. In the present invention, the optical system 102 is arranged within the image pickup apparatus 101, to thereby achieve reduction in size of a photographing system. Now, a case is considered in which, in a three-image-sensor camera using a color separation optical system as in an image pickup apparatus supporting a ⅔-inch format, the optical system according to the present invention is arranged in place of the color separation optical system. FIG. 20 is a diagram for illustrating a general configuration of the three-image-sensor camera. A three-image-sensor camera 201 includes a color separation optical system 202, image pickup elements 203, 204, and 205, and a mount 206.

The optical system according to the present invention is designed to have a size close to the size of the color separation optical system 202 of the three-image-sensor camera 201, and the optical system according to the present invention is arranged in place of the color separation optical system. With this configuration, the size of the photographing system using the image pickup apparatus according to the present invention becomes equivalent to that of a ⅔-inch format photographing system. Therefore, the size of the photographing system can be reduced as compared with a case in which an external attachment is inserted between the interchangeable lens and the image pickup apparatus.

Further, in the image pickup apparatus according to the present invention, the optical system 102 is arranged on the image side of the mount 104. Through this arrangement, interference between the interchangeable lens and the optical system 102 can be prevented when the interchangeable lens is mounted to the image pickup apparatus 101.

Further, the image pickup apparatus according to the present invention has a feature in that, when a lateral magnification of the optical system 102 under a state in which the interchangeable lens is mounted to the image pickup apparatus 101 and the image pickup element 103 is in focus (the object point 105, which is located on the image side of the surface of the optical system 102 that is closest to the object side, is imaged onto the image pickup element) is represented by β, an image circle of the interchangeable lens is represented by IC, and a diagonal length of the image pickup element 103 is represented by I, the following expression is satisfied.

$$0.8 < IC \times \beta / I < 1.3 \tag{1}$$

The image circle IC of the interchangeable lens is defined herein as a diagonal length of the image pickup element of a camera originally supporting the interchangeable lens. For example, the ⅔-inch format interchangeable lens has an image circle of 11 mm as the image circle IC.

Through satisfaction of Expression (1), both reduction in size of the image pickup apparatus and securement of an image size on the image pickup element are achieved.

When the upper limit of Expression (1) is not satisfied, a magnification ratio of the image circle of the interchangeable lens becomes larger relative to the size of the image pickup element 103, and hence the size of the optical system 102 increases. As a result, it becomes difficult to reduce the size of the image pickup apparatus 101.

When the lower limit of Expression (1) is not satisfied, the magnification ratio of the image circle of the interchangeable lens becomes smaller, and hence vignetting occurs greatly on the image pickup element 103. As a result, peripheral portions of an image are darkened. It is further preferred that Expression (1) be set as follows.

$$0.95 < IC \times \beta / I < 1.15 \tag{1a}$$

Further, the image pickup apparatus according to the present invention has a feature in that, when a flange back in air (distance from the mount to the object point 105 located on the image side of the surface of the optical system 102 that is closest to the object side) of the interchangeable lens is represented by FB, and a distance on an optical axis from a flange surface of the mount to the image pickup element is represented by L, the following expressions are satisfied.

$$1.0 < L/FB < 3.0 \tag{2}$$

$$1.0 < \beta < 3.0 \tag{3}$$

Through satisfaction of Expression (2) and Expression (3), both reduction in size of the image pickup apparatus 101 and high optical performance under a state in which the image size of the interchangeable lens is increased are achieved.

When the upper limit of Expression (2) is not satisfied, the distance from the interchangeable lens to the image pickup element 103 becomes larger, and hence it becomes difficult to reduce the size of the image pickup apparatus 101.

When the lower limit of Expression (2) is not satisfied, the distance from the interchangeable lens to the image pickup element 103 becomes shorter, which is advantageous for reduction in size of the image pickup apparatus 101. However, the length of the optical system 102 becomes shorter in this case, and hence the refractive powers of lenses included in the optical system 102 become stronger. As a result, it becomes difficult to achieve high optical performance.

When the upper limit of Expression (3) is not satisfied, the lateral magnification of the optical system 102 becomes larger, and hence the size of the optical system 102 increases. As a result, it becomes difficult to reduce the size of the image pickup apparatus 101.

When the lower limit of Expression (3) is not satisfied, the lateral magnification of the optical system 102 falls below 1, and hence the image size of the interchangeable lens is no longer increased. It is further preferred that Expression (2) and Expression (3) be set as follows.

$$1.2 < L/FB < 2.0 \tag{2a}$$

$$1.2 < \beta < 2.2 \tag{3a}$$

It is further preferred that Expression (2) and Expression (3) be set as follows.

$$1.2 < L/FB < 1.8 \tag{2b}$$

$$1.20 < \beta < 1.45 \tag{3b}$$

Further, the image pickup apparatus according to the present invention has a feature in that, when the optical system 102 is divided into a front lens unit on the object side of the largest air interval within the optical system 102 and a rear lens unit on the image side of the largest air interval, the front lens unit has a negative refractive power. The image pickup apparatus also has a feature in that, when a focal length of the front lens unit is represented by ff and a focal length of the optical system 102 is represented by f, the following expression is satisfied.

$$|ff/f| < 1.5 \tag{4}$$

Through satisfaction of Expression (4), the interval between the optical system 102 and the image pickup element 103 can be secured appropriately. When Expression (4) is not satisfied, the negative refractive power of the front lens unit becomes weaker relative to the refractive power of the optical system. Thus, a backfocus of the optical system becomes shorter, and the interval between the optical system and the image pickup element becomes narrower. Therefore, a lens of the optical system that is closest to the image side may be deformed due to heat generated by the image pickup element. It is further preferred that Expression (4) be set as follows.

$$|ff/f| < 1.3 \tag{4a}$$

Further, the image pickup apparatus according to the present invention has a feature in that, when an air-equivalent distance from a surface of the optical system 102 that is closest to the image side to the image pickup element 103 is represented by SK, the following expression is satisfied.

$$0.52 < SK/FB < 1.10 \tag{5}$$

Through satisfaction of Expression (5), the interval between the optical system 102 and the image pickup element 103 can be increased, and a space for arranging the optical filter 106 can be secured between the optical system 102 and the image pickup element 103. Through arrangement of the optical filter 106 between the optical system 102 and the image pickup element 103, for example, a mechanism for inserting and removing the filter, which is used when a density of an ND filter is to be changed, can be arranged easily.

In contrast, when the optical filter is arranged on the object side of the optical system, the mount is located near the optical filter. Thus, it becomes difficult to secure a space for the mechanism for inserting and removing the filter. In addition, when insertion and removal of the optical filter arranged within the optical system is considered, a lens barrel of the optical system needs to be divided into two on both sides of the optical filter. Thus, it becomes difficult to match axes of the lens barrels.

When the upper limit of Expression (5) is not satisfied, the interval between the optical system and the image pickup element becomes longer. Thus, it becomes difficult to reduce the size of the image pickup apparatus.

When the lower limit of Expression (5) is not satisfied, the interval between the optical system and the image pickup element becomes shorter. Thus, it becomes difficult to secure a space of mechanical structure for inserting and removing the optical filter. It is further preferred that Expression (5) be set as follows.

$$0.6 < SK/FB < 1.0 \tag{5a}$$

Further, the image pickup apparatus according to the present invention has a feature in that the optical system 102 includes six or less lenses, and that, when a distance from the surface of the optical system 102 that is closest to the object side to the surface thereof that is closest to the image side is represented by Lc, the following expression is satisfied.

$$0.2 < Lc/FB/ < 0.6 \tag{6}$$

Through satisfaction of Expression (6), both reduction in size of the image pickup apparatus and high optical performance are achieved.

When the upper limit of Expression (6) is not satisfied, the thickness of the optical system 102 in the optical axis direction becomes larger relative to the lateral magnification of the optical system 102. Thus, it becomes difficult to reduce the size of the image pickup apparatus.

When the lower limit of Expression (6) is not satisfied, the thickness of the optical system 102 in the optical axis direction becomes smaller, which is advantageous for reduction in size of the image pickup apparatus. However, the refractive powers of respective lenses included in the optical system 102 become stronger in this case, and hence it becomes difficult to achieve high optical performance. It is further preferred that Expression (6) be set as follows.

$$0.24 < Lc/FB/ < 0.58 \tag{6a}$$

It is further preferred that Expression (6) be set as follows.

$$0.24 < Lc/FB/ < 0.43 \tag{6b}$$

Further, the image pickup apparatus according to the present invention has a feature in that the optical system 102 includes, in order from the object side to the image side, a negative lens, a negative lens, one of a positive lens or a negative lens, a positive lens, and a negative lens, and that, when a focal length of one of the lenses that is closest to the object side is represented by f1, the following expression is satisfied.

$$0.05 < |f1/f| < 0.60 \tag{7}$$

Through use of the negative lens as the lens of the optical system 102 that is closest to the object side, a rear principal point of the optical system 102 can be set to a position on the object side. Thus, image points of the optical system 102 and the optical system 102 can be separated from each other. Therefore, this configuration is advantageous for securing the interval between the optical system 102 and the image pickup element 103. Through use of the negative lens and the positive lens as the second lens and the third lens of the optical system 102 from the object side, respectively, a spherical aberration and a chromatic aberration generated by the negative lens closest to the object side can be corrected.

In addition, through satisfaction of Expression (7), both securement of the interval between the optical system 102 and the image pickup element 103 and high optical performance are achieved. When the upper limit of Expression (7) is not satisfied, the refractive power of the lens of the optical system that is closest to the object side becomes smaller relative to the refractive power of the optical system. Thus, it becomes difficult to secure the interval between the optical system 102 and the image pickup element 103. When the lower limit of Expression (7) is not satisfied, the refractive power of the lens of the optical system that is closest to the object side becomes larger, and the curvature of the lens increases. Thus, it becomes difficult to achieve high optical performance. It is further preferred that Expression (7) be set as follows.

$$0.07 < |f1/f| < 0.52 \tag{7a}$$

Further, the image pickup apparatus according to the present invention has a feature in that, when a lens unit including the lens of the optical system 102 that is closest to the object side to a lens thereof that is third closest to the object side is defined as a first lens unit, and when an average refractive index of the negative lenses included in the first lens unit is represented by n1av, an average Abbe number of the negative lenses is represented by ν1n, and an Abbe number of the positive lens included in the first lens unit is represented by ν1p, the following expressions are satisfied.

$$1.8 < n1av \tag{8}$$

$$5 < \nu1n - \nu1p < 20 \tag{9}$$

An Abbe number ν is defined as the following expression:

$$\nu = (Nd-1)/(NF-NC),$$

where NF represents a refractive index at the F-line, Nd represents a refractive index at the d-line, and NC represents a refractive index at the C-line. Through satisfaction of Expression (8) and Expression (9), high optical performance is achieved. Expression (8) defines the refractive indices of the negative lenses included in the first lens unit. Through use of a material having a high refractive index for a negative lens having a strong refractive power, the curvature of the negative lens decreases, and it becomes easy to correct the spherical aberration.

A further effect is that this configuration is advantageous for correction of a Petzval sum, which enables correction of a field curvature of the peripheral portions of the image. Expression (9) defines a difference between the average Abbe number of the negative lenses included in the first lens unit and the Abbe number of the positive lens included in the first lens unit. Through satisfaction of Expression (9), the refractive powers of the respective lenses included in the first lens unit can be set appropriately. When the lower limit of Expression (8) is not satisfied, curvatures of the respective lenses included in the first lens unit become larger. Thus, it becomes difficult to achieve high optical performance.

When the upper limit of Expression (9) is not satisfied, a material having a relatively high Abbe number needs to be used for each negative lens. Thus, it becomes difficult to select a material having a high refractive index for each negative lens. When the lower limit of Expression (9) is not satisfied, a difference between the Abbe numbers of the positive lens and the negative lens of the first lens unit becomes smaller, and the curvatures of the respective lenses become larger. As a result, it becomes difficult to achieve high optical performance.

It is further preferred that Expression (8) and Expression (9) be set as follows.

$$1.88 < n1av < 2.05 \tag{8a}$$

$$7 < v1n - v1p < 16 \tag{9a}$$

Now, a description is given of a specific configuration of the image pickup apparatus according to the present invention by way of features of the optical system according to Numerical Embodiment 1 corresponding to Embodiment 1.

Figure 2:
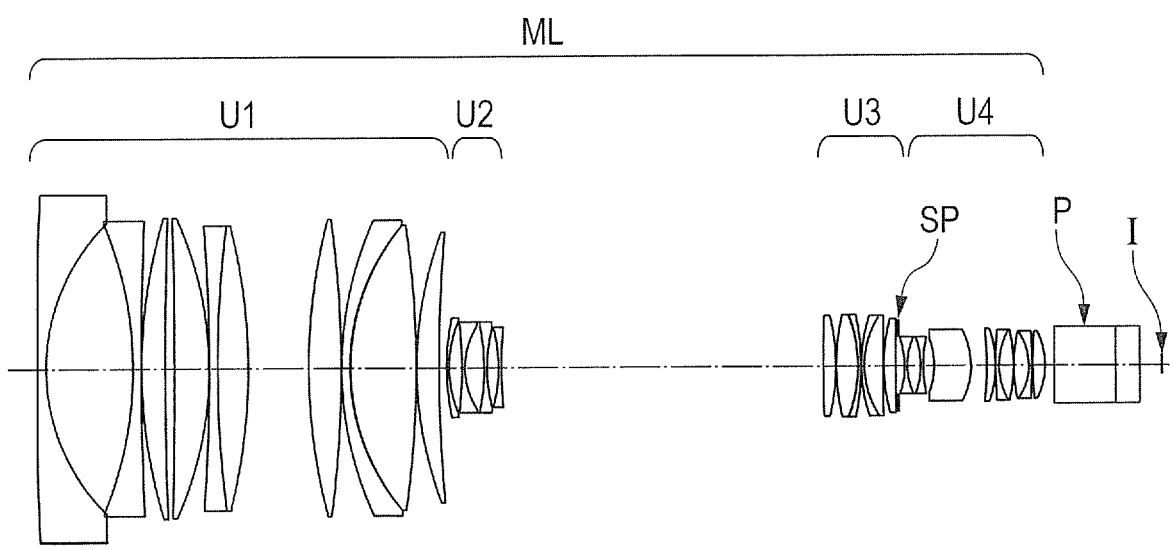
FIG. 2 is a lens cross-sectional view of an interchangeable lens when focused on an object at infinity at a wide angle end.
Figure 3:
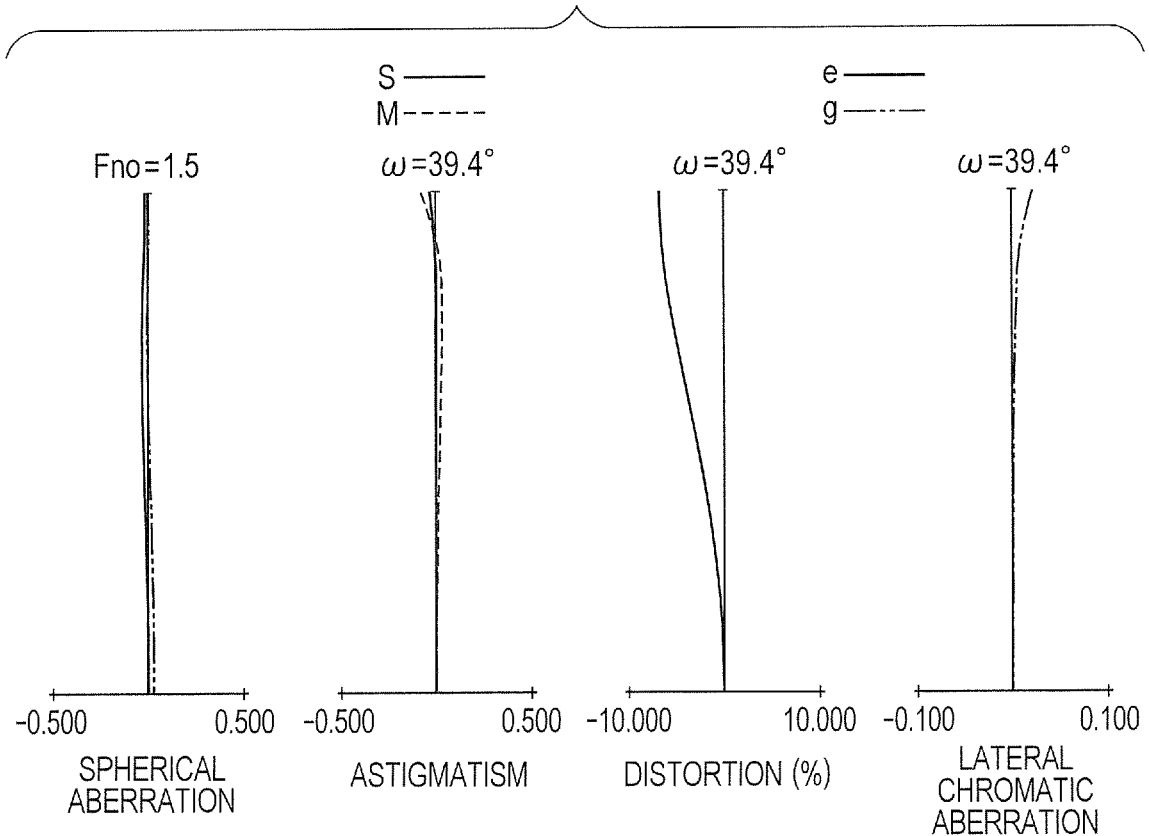
FIG. 3 is longitudinal aberration diagrams of the interchangeable lens when focused on the object at infinity at the wide angle end.

FIG. 2 is a lens cross-sectional view of the interchangeable lens to be mounted to the image pickup apparatus according to each Embodiment of the present invention when, as an example, the lens is focused on an object at infinity at a wide angle end of the interchangeable lens. FIG. 3 is longitudinal aberration diagrams of the interchangeable lens when focused on the object at infinity at the wide angle end. Further, the values of the focal lengths are values when expressed in mm of the numerical embodiment to be described later. The same applies to the subsequent numerical embodiments.

In FIG. 2, in order from the object side to the image side, there is provided the first lens unit (focus lens unit) U1 having a positive refractive power which is configured to move during focusing. Further, there is provided a second lens unit (variator) U2 having a negative refractive power which is configured to move to the image side during zooming from the wide angle end to a telephoto end.

Further, there is provided a third lens unit (compensator) U3 having a positive refractive power which is configured to move non-linearly on the optical axis in conjunction with the movement of the second lens unit U2, and to correct an image plane variation accompanying zooming. Further, there is provided a fourth lens unit (relay lens unit) U4 having a positive refractive power and an imaging action which is configured not to move for zooming. The second lens unit U2 and the third lens unit U3 construct a magnification-varying system. An aperture stop SP is arranged on the object side of the fourth lens unit U4. A color separation optical system or an optical filter P is represented as a glass block. An image pickup surface I corresponds to an image pickup surface of a solid-state image pickup element.

In each longitudinal aberration diagram, the straight line and the two-dot chain line of spherical aberration correspond to the e-line and the g-line, respectively. Further, the dotted line and the solid line of astigmatism correspond to a meridional image plane and a sagittal image plane, respectively. The two-dot chain line of lateral chromatic aberration corresponds to the g-line. A half angle of field is represented by ω and an F-number is represented by Fno. In each longitudinal aberration diagram, a spherical aberration, an astigmatism, a distortion, and a lateral chromatic aberration are illustrated on the scales of 0.5 mm, 0.5 mm, 10%, and 0.1 mm, respectively. The aberration diagrams are illustrated on similar scales in other Embodiments to be described later, but in Embodiment 15 (FIG. 34) of the present invention, the spherical aberration, the astigmatism, the distortion, and the lateral chromatic aberration are illustrated on the scales of 1.0 mm, 1.0 mm, 10%, and 0.2 mm, respectively. The flange surface of the mount of the interchangeable lens is arranged at a position away from a 55th surface by 1.832 mm on the object side, and the flange back in air is 48 mm. The interchangeable lens is the ⅔-inch format interchangeable lens, and has an image circle IC of 11 mm.

Figure 4:
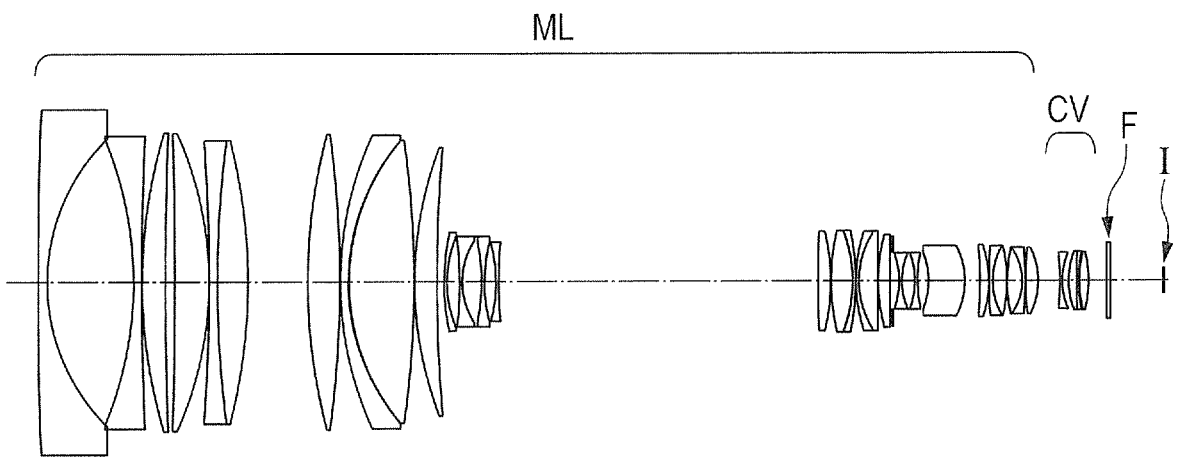
FIG. 4 is a lens cross-sectional view under a state in which the interchangeable lens is mounted to an image pickup apparatus according to Embodiment 1.

FIG. 4 is a lens cross-sectional view under a state in which the interchangeable lens is mounted to the image pickup apparatus according to this Embodiment. In FIG. 4, there are illustrated an interchangeable lens ML, an optical system CV arranged within the image pickup apparatus, and an optical filter F, e.g., an ND filter, a low-pass filter, or an IR cut filter. There is also illustrated the image pickup surface I, which corresponds to the image pickup surface of the solid-state image pickup element.

Figure 5:
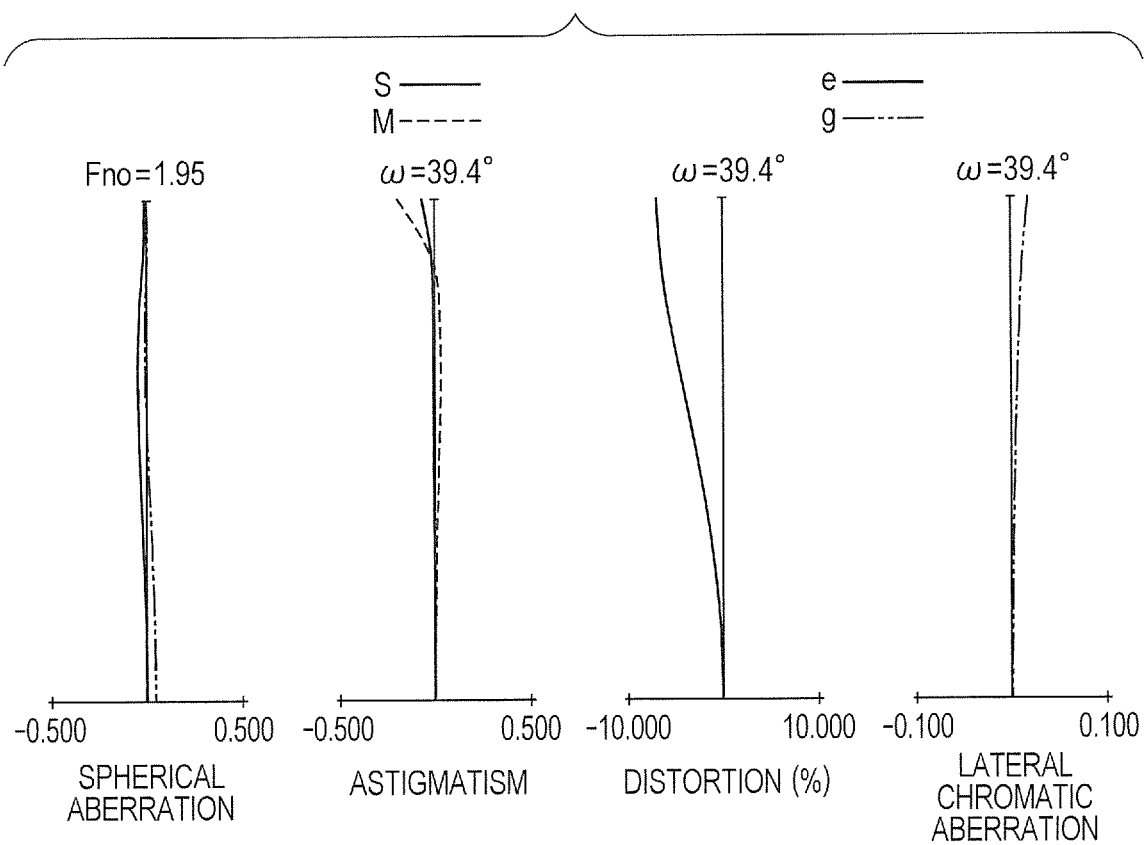
FIG. 5 is longitudinal aberration diagrams when the interchangeable lens is focused on the object at infinity at the wide angle end under the state in which the interchangeable lens is mounted to the image pickup apparatus according to Embodiment 1.

FIG. 5 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 12 mm on the image side.

Next, the optical system according to this Embodiment is described. The optical system includes, in order from the object side to the image side, a biconcave lens G1, a cemented lens obtained by cementing a meniscus positive lens G2 having a concave surface on the image side and a meniscus negative lens G3 having a convex surface on the object side, and a biconvex lens G4. In the image pickup apparatus according to this Embodiment, the optical filter F is arranged between the optical system and the image pickup surface.

The front lens unit, the rear lens unit, and the first lens unit according to this Embodiment correspond to the lens G1, the lenses G2 to G4, and the lenses G1 to G3, respectively. Through use of this system as the image pickup system in which the interchangeable lens is mounted to the image pickup apparatus according to this Embodiment, the image circle of the interchangeable lens is magnified by 1.3 times. The image pickup apparatus according to this Embodiment includes the image pickup element having a diagonal length of 14.3 mm.

Numerical values corresponding to the respective conditional expressions according to this Embodiment are shown in Table 1. The image pickup apparatus according to this Embodiment satisfies Conditional Expression (1) to Conditional Expression (9), and thus has a function of increasing the focal length of the interchangeable lens and achieves reduction in size of the photographing system.

Embodiment 2

Figure 6:
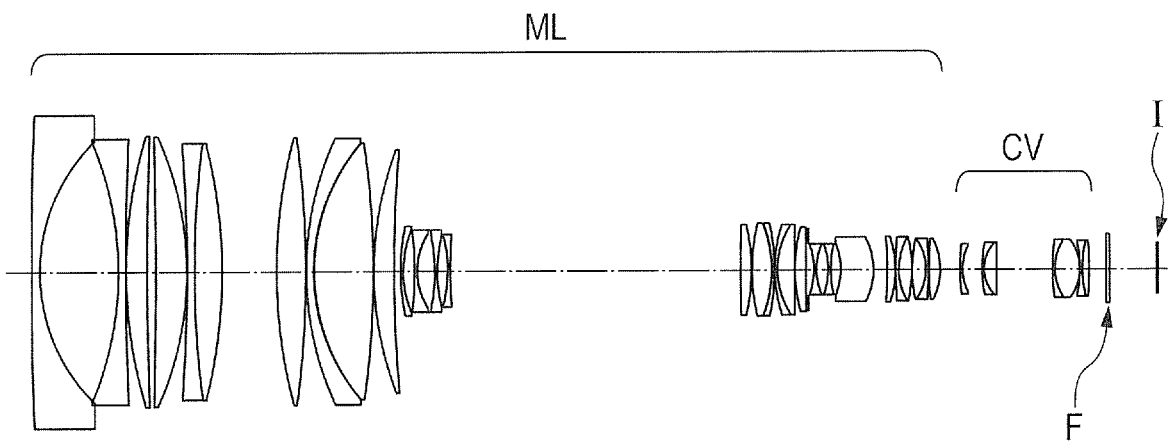
FIG. 6 is a lens cross-sectional view under a state in which the interchangeable lens is mounted to an image pickup apparatus according to Embodiment 2 of the present invention.

FIG. 6 is a lens cross-sectional view under a state in which the interchangeable lens is mounted to an image pickup apparatus according to Embodiment 2 of the present invention. The basic configuration of the image pickup apparatus is the same as that of Embodiment 1. In FIG. 6, there are illustrated the interchangeable lens ML, the optical system CV arranged within the image pickup apparatus, and the optical filter F, e.g., an ND filter, a low-pass filter, or an IR cut filter. There is also illustrated the image pickup surface I, which corresponds to the image pickup surface of the solid-state image pickup element.

Figure 7:
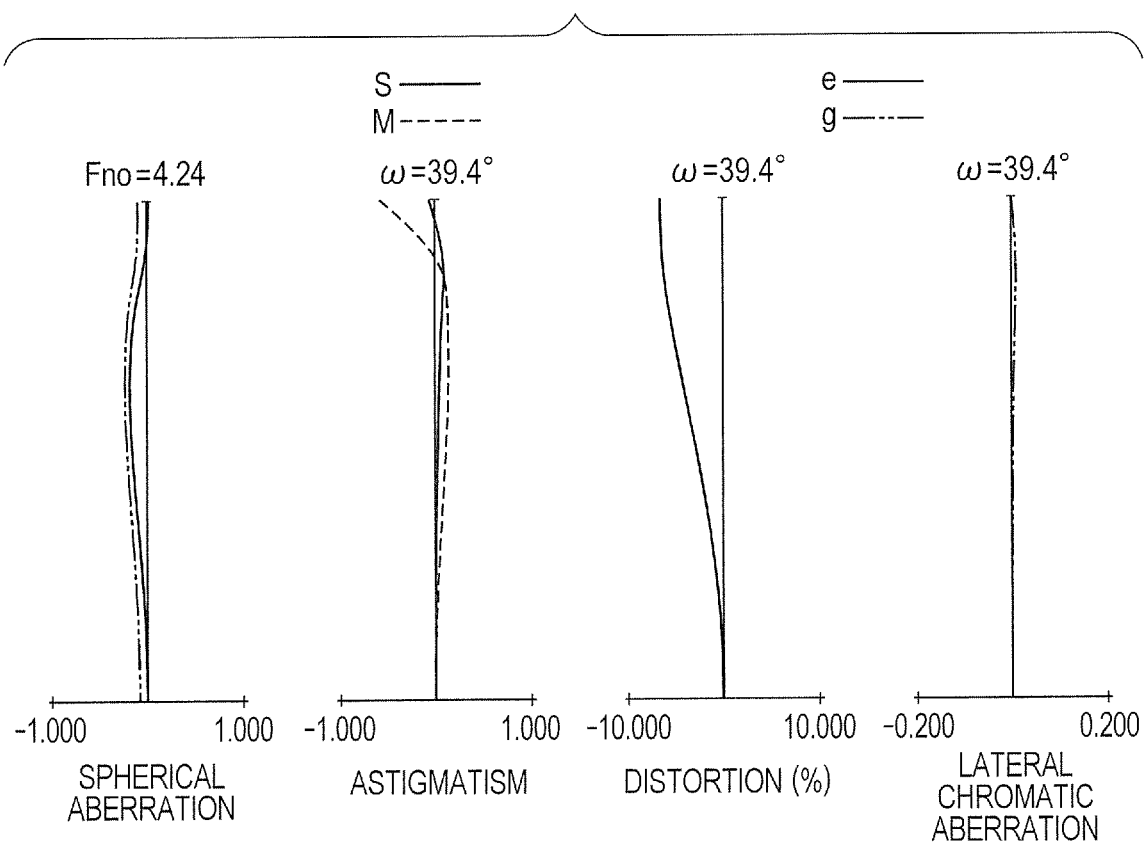
FIG. 7 is longitudinal aberration diagrams when the interchangeable lens is focused on the object at infinity at the wide angle end under the state in which the interchangeable lens is mounted to the image pickup apparatus according to Embodiment 2.

FIG. 7 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 12 mm on the image side.

Next, the optical system according to this Embodiment is described. The optical system includes, in order from the object side to the image side, a meniscus negative lens G1 having a convex surface on the object side, and a cemented lens 1 obtained by cementing a meniscus negative lens G2 having a convex surface on the object side and a meniscus positive lens G3 having a concave surface on the image side. The optical system further includes a cemented lens 2 obtained by cementing a meniscus negative lens G4 having a convex surface on the object side and a biconvex lens G5, and a cemented lens 3 obtained by cementing a biconcave lens G6 and a biconvex lens G7.

The front lens unit, the rear lens unit, and the first lens unit according to this Embodiment correspond to the lenses G1 to G3, the lenses G4 to G7, and the lenses G1 to G3, respectively. Through mounting the interchangeable lens to the image pickup apparatus according to this Embodiment, the image circle of the interchangeable lens is magnified by 2.83 times. The image pickup apparatus according to this Embodiment includes the image pickup element having a diagonal length of 31.1 mm.

Numerical values corresponding to the respective conditional expressions according to this Embodiment are shown in Table 1. The image pickup apparatus according to this Embodiment satisfies Conditional Expression (1) to Conditional Expression (9), and thus has a function of increasing the focal length of the interchangeable lens and achieves reduction in size of the photographing system.

Embodiment 3

Figure 8:
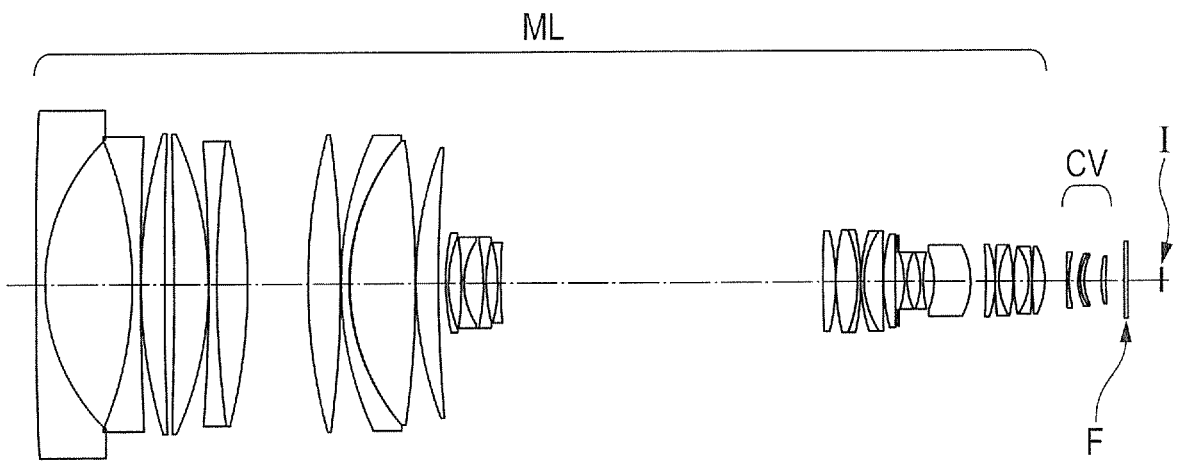
FIG. 8 is a lens cross-sectional view under a state in which the interchangeable lens is mounted to an image pickup apparatus according to Embodiment 3 of the present invention.

FIG. 8 is a lens cross-sectional view under a state in which the interchangeable lens is mounted to an image pickup apparatus according to Embodiment 3 of the present invention. The basic configuration of the image pickup apparatus is the same as that of Embodiment 1. In FIG. 8, there are illustrated the interchangeable lens ML, the optical system CV arranged within the image pickup apparatus, and the optical filter F, e.g., an ND filter, a low-pass filter, or an IR cut filter. There is also illustrated the image pickup surface I, which corresponds to the image pickup surface of the solid-state image pickup element.

Figure 9:
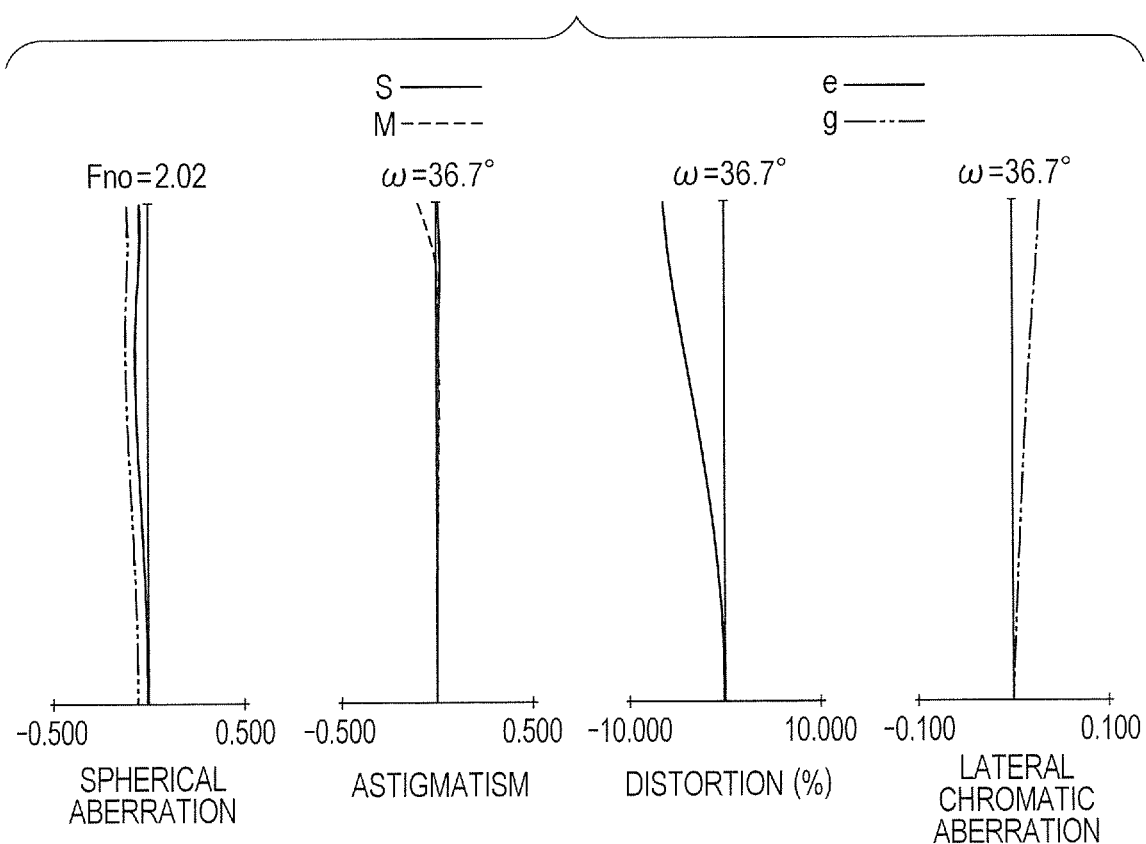
FIG. 9 is longitudinal aberration diagrams when the interchangeable lens is focused on the object at infinity at the wide angle end under the state in which the interchangeable lens is mounted to the image pickup apparatus according to Embodiment 3.

FIG. 9 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 12 mm on the image side.

Next, the optical system according to this Embodiment is described. The optical system includes, in order from the object side to the image side, a meniscus negative lens G1 having a convex surface on the object side, a cemented lens obtained by cementing a meniscus negative lens G2 having convex surface on the object side and a meniscus positive lens G3 having a concave surface on the image side, and a meniscus positive lens G4 having a concave surface on the image side.

The front lens unit, the rear lens unit, and the first lens unit according to this Embodiment correspond to the lenses G1 to G3, the lens G4, and the lenses G1 to G3, respectively. Through mounting of the interchangeable lens to the image pickup apparatus according to this Embodiment, the image circle of the interchangeable lens is magnified by 1.35 times. The image pickup apparatus according to this Embodiment includes the image pickup element having a diagonal length of 13.5 mm.

Numerical values corresponding to the respective conditional expressions according to this Embodiment are shown in Table 1. The image pickup apparatus according to this Embodiment satisfies Conditional Expression (1) to Conditional Expression (9), and thus has a function of increasing the focal length of the interchangeable lens and achieves reduction in size of the photographing system.

Embodiment 4

Figure 10:
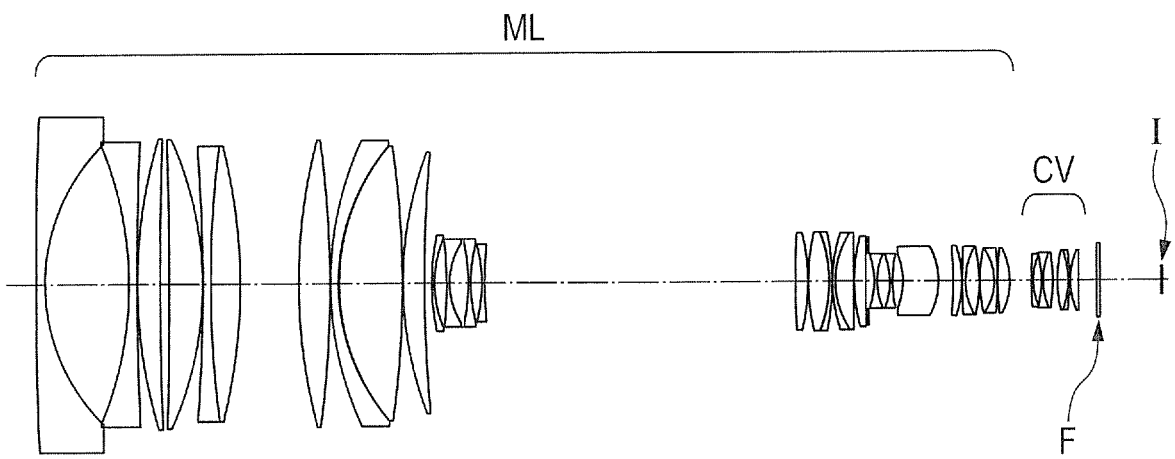
FIG. 10 is a lens cross-sectional view under a state in which the interchangeable lens is mounted to an image pickup apparatus according to Embodiment 4 of the present invention.

FIG. 10 is a lens cross-sectional view under a state in which the interchangeable lens is mounted to an image pickup apparatus according to Embodiment 4 of the present invention. The basic configuration of the image pickup apparatus is the same as that of Embodiment 1. In FIG. 10, there are illustrated the interchangeable lens ML, the optical system CV arranged within the image pickup apparatus, and the optical filter F, e.g., an ND filter, a low-pass filter, or an IR cut filter. There is also illustrated the image pickup surface I, which corresponds to the image pickup surface of the solid-state image pickup element.

Figure 11:
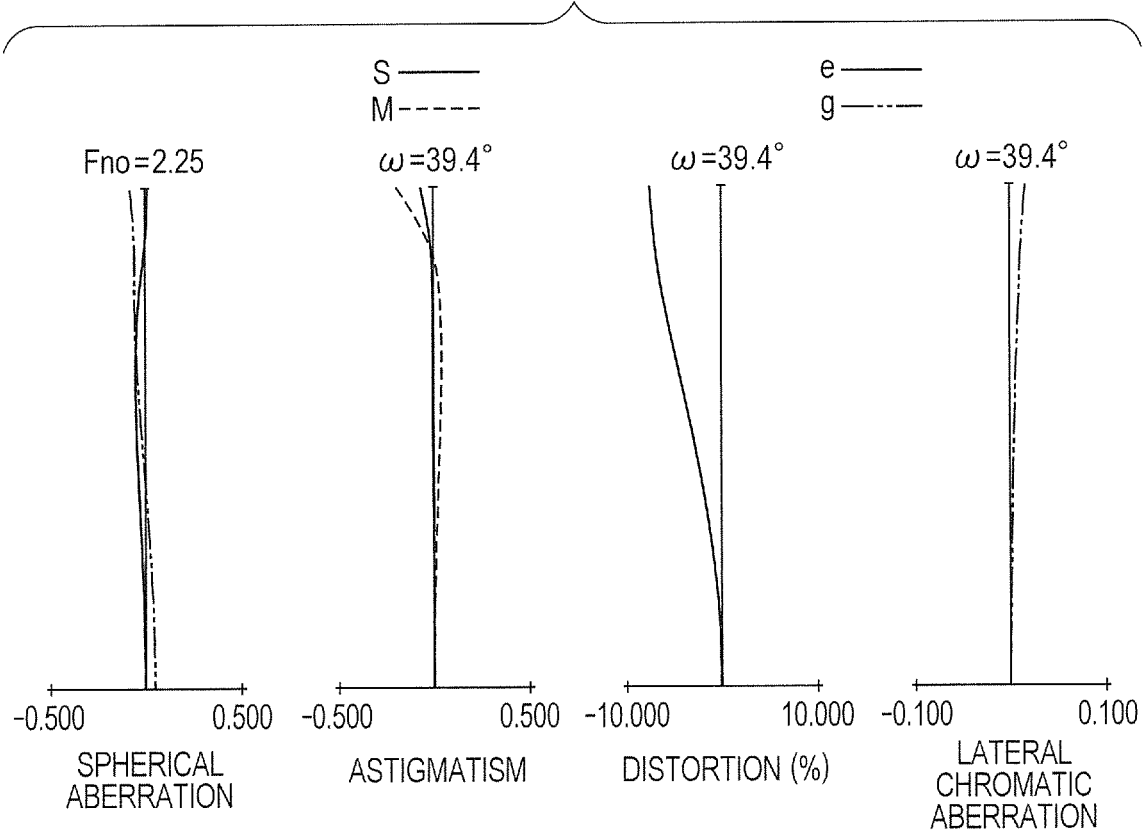
FIG. 11 is longitudinal aberration diagrams when the interchangeable lens is focused on the object at infinity at the wide angle end under the state in which the interchangeable lens is mounted to the image pickup apparatus according to Embodiment 4.

FIG. 11 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 12 mm on the image side.

Next, the optical system according to this Embodiment is described. The optical system includes, in order from the object side to the image side, a meniscus negative lens G1 having a convex surface on the object side, a cemented lens 1 obtained by cementing a biconcave lens G2 and a biconvex lens G3, a cemented lens 2 obtained by cementing a biconvex lens G4 and a meniscus negative lens G5 having a convex surface on the image side, and a meniscus positive lens G6 having a concave surface on the image side. The front lens unit, the rear lens unit, and the first lens unit according to this Embodiment correspond to the lens G1, the lenses G2 to G6, and the lenses G1 to G3, respectively. Through mounting of the interchangeable lens to the image pickup apparatus according to this Embodiment, the image circle of the interchangeable lens is magnified by 1.5 times. The image pickup apparatus according to this Embodiment includes the image pickup element having a diagonal length of 16.5 mm.

Numerical values corresponding to the respective conditional expressions according to this Embodiment are shown in Table 1. The image pickup apparatus according to this Embodiment satisfies Conditional Expression (1) to Conditional Expression (9), and thus has a function of increasing the focal length of the interchangeable lens and achieves reduction in size of the photographing system.

Embodiment 5

Figure 12:
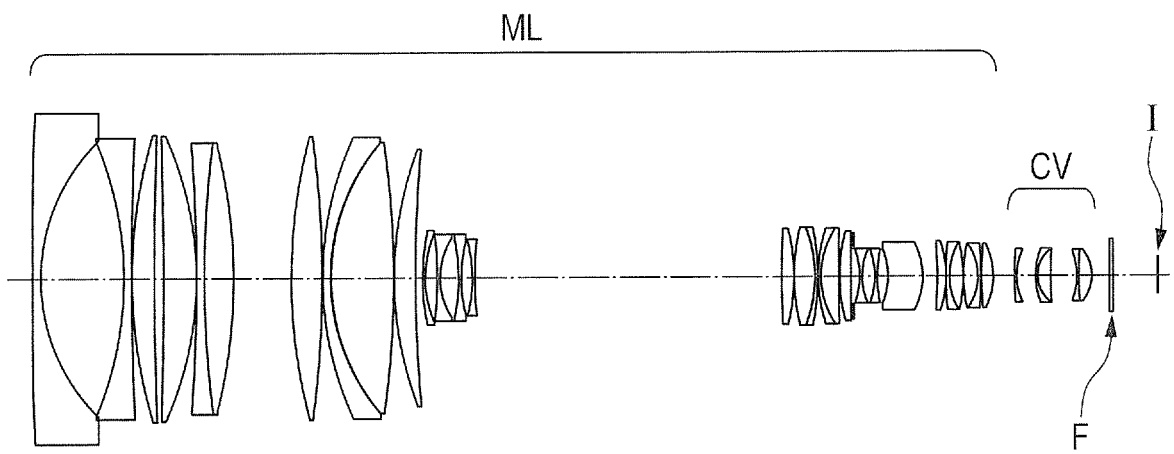
FIG. 12 is a lens cross-sectional view under a state in which the interchangeable lens is mounted to an image pickup apparatus according to Embodiment 5 of the present invention.

FIG. 12 is a lens cross-sectional view under a state in which the interchangeable lens is mounted to an image pickup apparatus according to Embodiment 5 of the present invention. The basic configuration of the image pickup apparatus is the same as that of Embodiment 1. In FIG. 12, there are illustrated the interchangeable lens ML, the optical system CV arranged within the image pickup apparatus, and the optical filter F, e.g., an ND filter, a low-pass filter, or an IR cut filter. There is also illustrated the image pickup surface I, which corresponds to the image pickup surface of the solid-state image pickup element.

Figure 13:
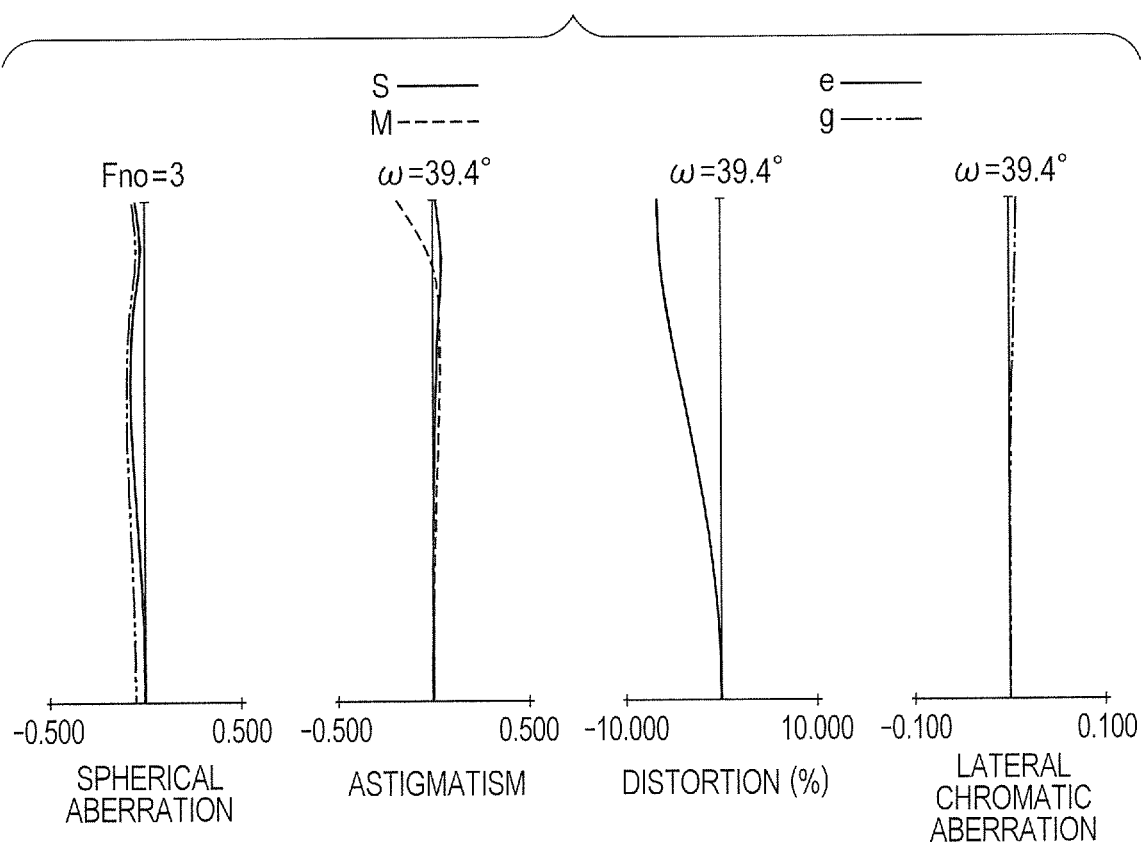
FIG. 13 is longitudinal aberration diagrams when the interchangeable lens is focused on the object at infinity at the wide angle end under the state in which the interchangeable lens is mounted to the image pickup apparatus according to Embodiment 5.

FIG. 13 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 12 mm on the image side.

Next, the optical system according to this Embodiment is described. The optical system includes, in order from the object side to the image side, a meniscus negative lens G1 having a convex surface on the object side, a cemented lens 1 obtained by cementing a meniscus negative lens G2 having a convex surface on the object side and a meniscus positive lens G3 having a concave surface on the image side, and a cemented lens 2 obtained by cementing a biconcave lens G4 and a biconvex lens G5. The front lens unit, the rear lens unit, and the first lens unit according to this Embodiment correspond to the lenses G1 to G3, the lenses G4 to G6, and the lenses G1 to G3, respectively. Through mounting of the interchangeable lens to the image pickup apparatus according to this Embodiment, the image circle of the interchangeable lens is magnified by 2.0 times. The image pickup apparatus according to this Embodiment includes the image pickup element having a diagonal length of 22 mm.

Numerical values corresponding to the respective conditional expressions according to this Embodiment are shown in Table 1. The image pickup apparatus according to this Embodiment satisfies Conditional Expression (1) to Conditional Expression (9), and thus has a function of increasing the focal length of the interchangeable lens and achieves reduction in size of the photographing system.

Embodiment 6

Figure 14:
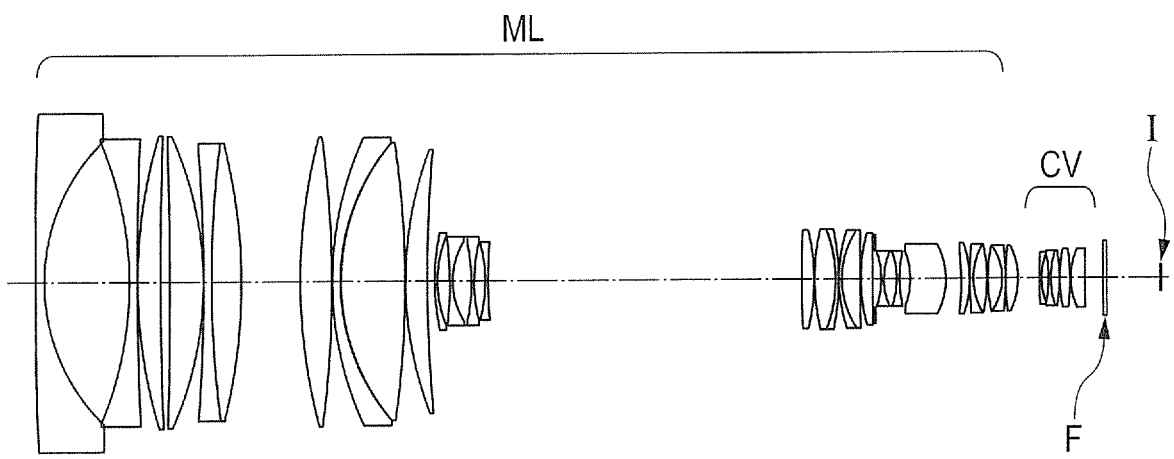
FIG. 14 is a lens cross-sectional view under a state in which the interchangeable lens is mounted to an image pickup apparatus according to Embodiment 6 of the present invention.

FIG. 14 is a lens cross-sectional view under a state in which the interchangeable lens is mounted to an image pickup apparatus according to Embodiment 6 of the present invention. The basic configuration of the image pickup apparatus is the same as that of Embodiment 1. In FIG. 14, there are illustrated the interchangeable lens ML, the optical system CV arranged within the image pickup apparatus, and the optical filter F, e.g., an ND filter, a low-pass filter, or an IR cut filter. There is also illustrated the image pickup surface I, which corresponds to the image pickup surface of the solid-state image pickup element.

Figure 15:
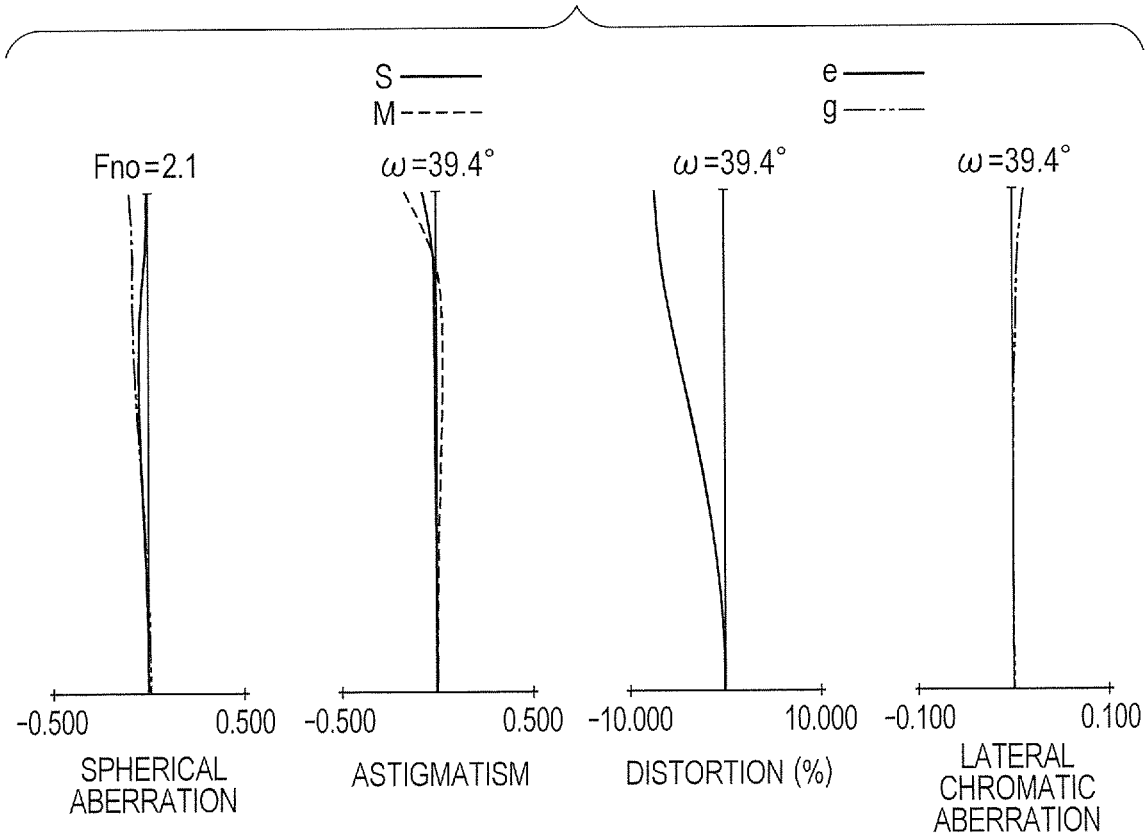
FIG. 15 is longitudinal aberration diagrams when the interchangeable lens is focused on the object at infinity at the wide angle end under the state in which the interchangeable lens is mounted to the image pickup apparatus according to Embodiment 6.

FIG. 15 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 12 mm on the image side.

Next, the optical system according to this Embodiment is described. The optical system includes, in order from the object side to the image side, a meniscus negative lens G1 having a convex surface on the object side, a cemented lens 1 obtained by cementing a biconcave lens G2 and a biconvex lens G3, a biconvex lens G4, and a biconvex lens G5. The front lens unit, the rear lens unit, and the first lens unit according to this Embodiment correspond to the lens G1, the lenses G2 to G5, and the lenses G1 to G3, respectively. Through mounting of the interchangeable lens to the image pickup apparatus according to this Embodiment, the image circle of the interchangeable lens is magnified by 1.4 times. The image pickup apparatus according to this Embodiment includes the image pickup element having a diagonal length of 15.4 mm.

Numerical values corresponding to the respective conditional expressions according to this Embodiment are shown in Table 1. The image pickup apparatus according to this Embodiment satisfies Conditional Expression (1) to Conditional Expression (9), and thus has a function of increasing the focal length of the interchangeable lens and achieves reduction in size of the photographing system.

Embodiment 7

Figure 16:
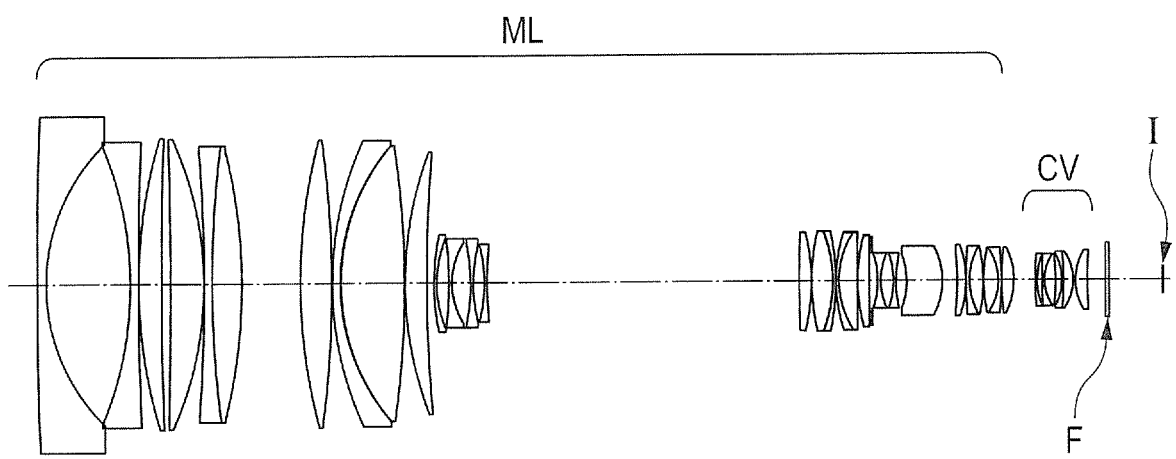
FIG. 16 is a lens cross-sectional view under a state in which the interchangeable lens is mounted to an image pickup apparatus according to Embodiment 7 of the present invention.

FIG. 16 is a lens cross-sectional view under a state in which the interchangeable lens is mounted to the image pickup apparatus according to Embodiment 7 of the present invention. The basic configuration of the image pickup apparatus is the same as that of Embodiment 1. In FIG. 16, there are illustrated the interchangeable lens ML, the optical system CV arranged within the image pickup apparatus, and the optical filter F, e.g., an ND filter, a low-pass filter, or an IR cut filter. There is also illustrated the image pickup surface I, which corresponds to the image pickup surface of the solid-state image pickup element.

Figure 17:
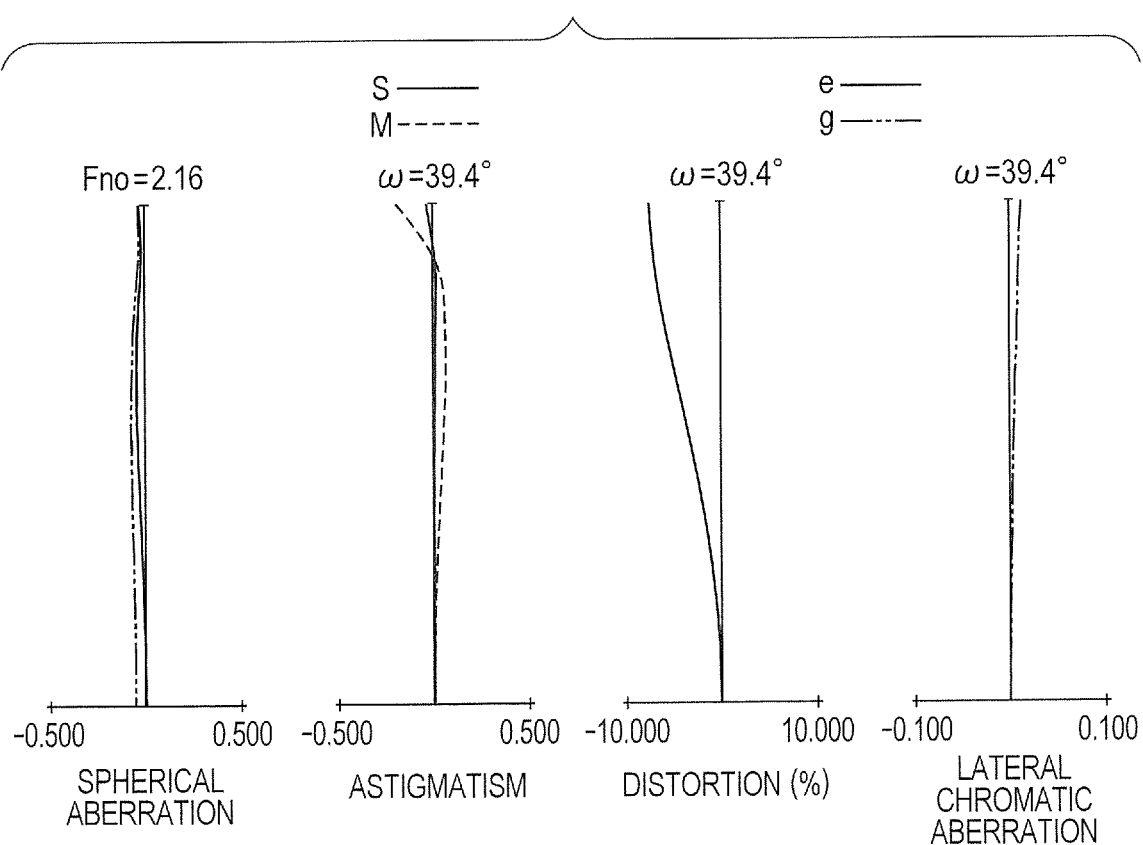
FIG. 17 is longitudinal aberration diagrams when the interchangeable lens is focused on the object at infinity at the wide angle end under the state in which the interchangeable lens is mounted to the image pickup apparatus according to Embodiment 7.

FIG. 17 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 12 mm on the image side.

Next, the optical system according to this Embodiment is described. The optical system includes, in order from the object side to the image side, a meniscus negative lens G1 having a convex surface on the object side, a cemented lens 1 obtained by cementing a meniscus negative lens G2 having a convex surface on the object side and a biconvex lens G3, a cemented lens 2 obtained by cementing a meniscus negative lens G4 having a convex surface on the image side and a meniscus positive lens G5 having a concave surface on the object side, and a meniscus positive lens G6 having a concave surface on the image side.

The front lens unit, the rear lens unit, and the first lens unit according to this Embodiment correspond to the lenses G1 to G3, the lenses G4 to G6, and the lenses G1 to G3, respectively. Through mounting of the interchangeable lens to the image pickup apparatus according to this Embodiment, the image circle of the interchangeable lens is magnified by 1.44 times. The image pickup apparatus according to this Embodiment includes the image pickup element having a diagonal length of 15.84 mm.

Numerical values corresponding to the respective conditional expressions according to this Embodiment are shown in Table 1. The image pickup apparatus according to this Embodiment satisfies Conditional Expression (1) to Conditional Expression (9), and thus has a function of increasing the focal length of the interchangeable lens and achieves reduction in size of the photographing system.

Embodiment 8

Figure 18:
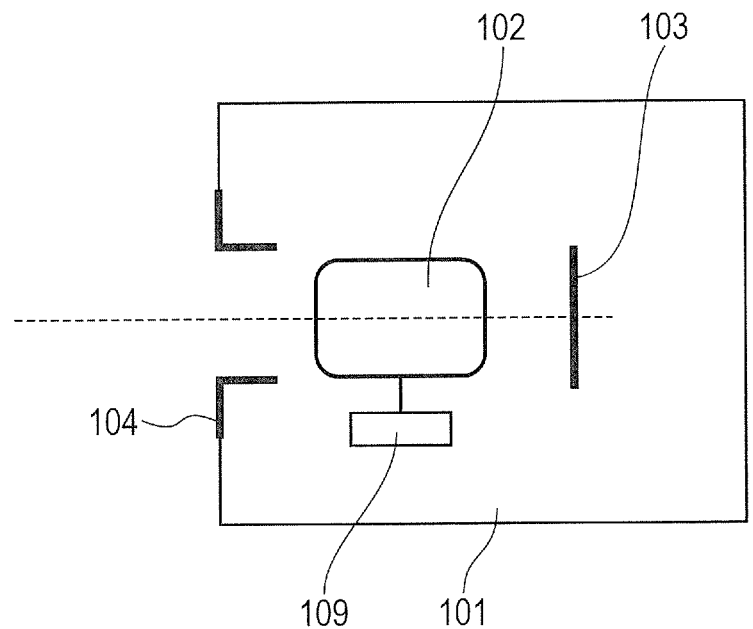
FIG. 18 is a basic configuration diagram according to Embodiment 8 of the present invention.

An image pickup apparatus illustrated in FIG. 18 includes a movable mechanism 109 capable of moving the optical system 102 in the optical axis direction. An imaging position of the optical system 102 may shift due to manufacturing errors, such as errors in interval and thickness and an error in curvature of the lenses included in the optical system 102. The optical system 102 is moved in the optical axis direction when the optical system 102 and the image pickup element 103 are arranged within the image pickup apparatus 101. With this configuration, the imaging position of the optical system 102 can be positioned onto the image pickup element 103.

Embodiment 9

Figure 19:
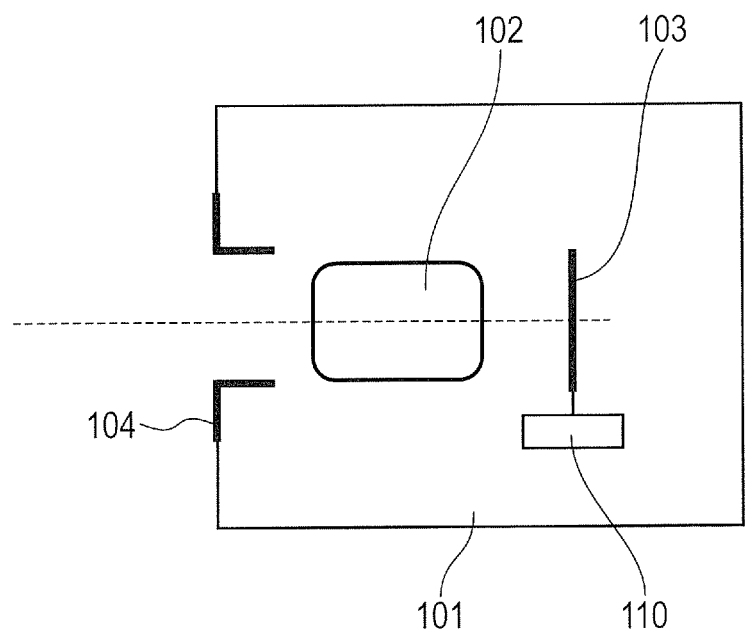
FIG. 19 is a basic configuration diagram according to Embodiment 9 of the present invention.

An image pickup apparatus illustrated in FIG. 19 includes a movable mechanism 110 capable of moving the image pickup element 103 in the optical axis direction. An imaging position of the optical system 102 may shift due to manufacturing errors, such as errors in interval and thickness and an error in curvature of the lenses included in the optical system 102. The image pickup element 103 is moved in the optical axis direction when the optical system 102 and the image pickup element 103 are arranged within the image pickup apparatus 101. With this configuration, the imaging position of the optical system 102 can be positioned onto the image pickup element 103.

Embodiment 10

Figure 21:
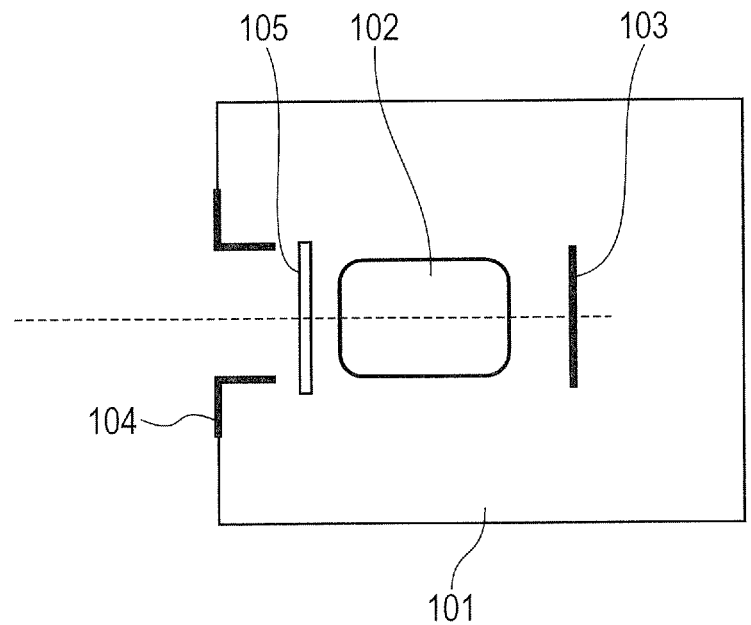
FIG. 21 is a basic configuration diagram according to Embodiment 10 of the present invention.

FIG. 21 is a basic configuration diagram according to Embodiment 10 of the present invention. The image pickup apparatus 101 according to the present invention includes the optical system 102, the image pickup element 103, and the mount 104 to which the interchangeable lens is mountable. The optical system 102 is configured to image an object point, which is located on the image side of the surface of the optical system 102 that is closest to the object side, onto the image pickup element 103. The object point is an imaging point of the interchangeable lens when the interchangeable lens is mounted to the mount 104 and the image side of the interchangeable lens is air. That is, the optical system 102 is configured to image the imaging point of the interchangeable lens (object point of the optical system 102) onto the image pickup element 103. The optical system 102 is configured to change the focal length of the interchangeable lens, to thereby enlarge or reduce the image circle of the interchangeable lens.

Now, a case is considered in which an external attachment configured to change the focal length of the interchangeable lens is mounted between the interchangeable lens and the image pickup apparatus to enlarge or reduce the image circle of the interchangeable lens. In general, in the image pickup apparatus, a mechanism for inserting and removing an optical filter, e.g., an ND filter, a low-pass filter, or an IR cut filter is arranged in front of the image pickup element. Therefore, the external attachment needs to secure a long backfocus in order to secure a space for arranging the optical filter and others. In addition, in order to reduce a total length of the attachment while securing a long backfocus, a lens of the external attachment needs to be arranged near the last surface of the interchangeable lens.

In contrast, in this Embodiment 10, the optical system configured to change the focal length is arranged within the image pickup apparatus, and a space for arranging the optical filter and others is secured on the object side of the optical system. With this configuration, the optical system can shorten the backfocus, and the lenses included in the optical system can be arranged closer to the image pickup element side than in the case of using the external attachment. Through arrangement of the optical system closer to the image pickup element, an axialmarginal ray and an off-axis principal ray can be separated from each other, and it becomes easy to correct an off-axis aberration. Thus, the image pickup system can achieve satisfactory optical performance.

Figure 36:
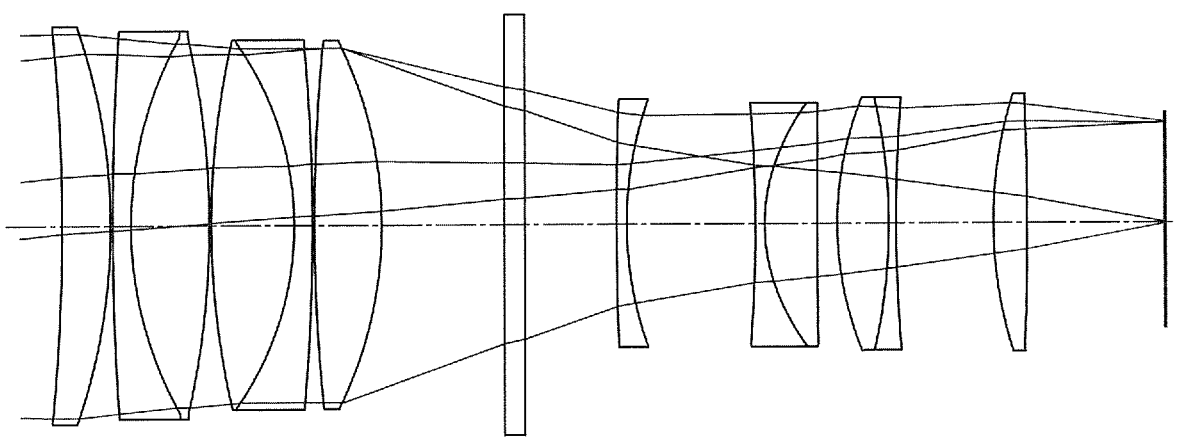
FIG. 36 is an optical path diagram of the optical system within the image pickup apparatus according to Embodiment 10 when the interchangeable lens is focused on the object at infinity at the wide angle end under the state in which the interchangeable lens is mounted to the image pickup apparatus.

A further effect achieved by shortening the backfocus is as follows. That is, because the distance from the last surface of the interchangeable lens is increased in order to secure a space for allowing the optical filter to be arranged, as illustrated in FIG. 36, the lenses can be arranged at positions where an on-axis light flux and an off-axis light flux are low. Thus, outer diameters of the lenses can be reduced. As a result, reduction in the size and weight of the image pickup system can be achieved.

A still further effect is as follows. That is, the lenses can be arranged at positions where the axial marginal ray is relatively low, and the refractive powers of the lenses included in the optical system can be increased easily, which is advantageous for correction of the Petzval sum. As a result, the field curvature of the peripheral portions of the image can be corrected.

When an external attachment is used to enlarge or reduce the image circle, the external attachment is mounted between the mount of the image pickup apparatus and the mount of the interchangeable lens. Therefore, there arises a problem in rigidity of the entire image pickup system. In addition, the optical axes of the image pickup element, the external attachment, and the interchangeable lens may be out of alignment due to manufacturing errors. Thus, performance of the image pickup system may be disadvantageously affected.

In the image pickup apparatus according to the present invention, the optical system configured to enlarge or reduce the image circle is arranged within the image pickup apparatus. Thus, as compared with the case of using the external attachment, the rigidity of the entire image pickup system becomes larger, and the influence of manufacturing errors becomes smaller.

The image pickup apparatus according to the present invention, which includes the mount to which the interchangeable lens is mountable and the image pickup element, has arranged therein the optical system configured to change the focal length of the interchangeable lens. When a distance from a vertex of a lens surface of the optical system that is closest to the object side to the image pickup element is represented by Ls and a distance from the image pickup element to a vertex of a lens surface of a lens closest to the image side among lenses of the optical system that have a refractive power is represented by SK, Conditional Expression (10) is satisfied.

$$0.1 < SK/Ls < 0.7 \qquad (10)$$

Conditional Expression (10) defines a ratio of the distance SK from the image pickup element to the vertex of the lens surface of the lens of the optical system that is closest to the image side, to the distance Ls from the image pickup element to the vertex of the lens surface of the lens that is closest to the object side among the lenses of the optical system that have a refractive power. The distance Ls includes a glass block including the optical filter and others, and the distance SK does not include the glass block including the optical filter and others. Through satisfaction of Conditional Expression (10), the backfocus of the optical system is set appropriately relative to the total length of the optical system. As a result, both reduction in size and weight of the photographing system and satisfactory optical performance are achieved.

When the upper limit of Conditional Expression (10) is not satisfied, the distance SK becomes too long, and in order to increase the distance SK, the refractive powers of the respective lenses need to be weakened. Thus, it becomes difficult to reduce the size and weight of the image pickup system. In another case, the distance Ls becomes too short, and the refractive powers of the respective lenses become too strong. Thus, it becomes difficult to achieve satisfactory optical performance.

When the lower limit of Conditional Expression (10) is not satisfied, the distance SK becomes too short, and in order to reduce the distance SK, the refractive powers of the respective lenses need to be enhanced. Thus, it becomes difficult to achieve satisfactory optical performance. In another case, the distance Ls becomes too long, and hence it becomes difficult to reduce the size and weight of the image pickup system.

It is further preferred that Conditional Expression (10) be set as follows.

$$0.16 < SK/Ls < 0.4 \quad (10a)$$

In the present invention, when a diagonal length of the image pickup element is represented by I, it is preferred that Conditional Expression (11) be satisfied.

$$2.0 < Ls/I < 4.0 \quad (11)$$

Conditional Expression (11) defines a ratio of the distance from the diagonal length of the image pickup element to the optical system configured to change the image size and length of the image pickup element, to thereby define a condition for achieving both high optical performance and reduction in size.

When the upper limit of Conditional Expression (11) is not satisfied, the distance from the optical system to the image pickup element becomes too short relative to the diagonal length of the image pickup element. Thus, it becomes difficult to achieve satisfactory optical performance. When the lower limit of Conditional Expression (11) is not satisfied, the diagonal length of the image pickup element becomes too long relative to the distance from the optical system to the image pickup element. Thus, it becomes difficult to achieve reduction in size.

It is further preferred that Conditional Expression (11) be set as follows.

$$2.5 < Ls/I < 3.5 \quad (11a)$$

In the present invention, when an air-equivalent back focus of the interchangeable lens to be mounted to the image pickup apparatus is represented by BF, it is preferred that Conditional Expression (12) be satisfied.

$$0.1 < SK/FB < 0.7 \quad (12)$$

Conditional Expression (12) defines a condition for the flange back in air of the interchangeable lens and the distance from the image pickup element to the vertex of the lens surface of the optical system configured to change the focal length of the interchangeable lens that is closest to the image side and has the refractive power. Through satisfaction of Conditional Expression (12), both reduction in size and weight of the photographing system and satisfactory optical performance are achieved. When the upper limit of Conditional Expression (12) is not satisfied, the distance SK becomes too large. Thus, it becomes difficult to reduce the size and weight of the image pickup system and to correct the off-axis aberration.

In another case, the back focus BF becomes too small, and hence the lens surface of the interchangeable lens that is closest to the image side and the surface of the optical system arranged within the image pickup apparatus that is closest to the object side disadvantageously interfere with each other. When the lower limit of Conditional Expression (12) is not satisfied, the distance SK becomes too small, and the refractive powers of the respective lenses become stronger. Thus, it becomes difficult to achieve satisfactory optical performance.

It is further preferred that Conditional Expression (12) be set as follows.

$$0.15 < SK/BF < 0.6 \quad (12a)$$

In the present invention, the largest air interval within the optical system of the image pickup apparatus is represented by La and the distance from the vertex of the lens surface that is closest to the object side to the vertex of the lens surface that is closest to the image side and has the refractive power is represented by Lc, it is preferred that Conditional Expression (13) be satisfied.

$$0.1 < La/Lc < 0.7 \quad (13)$$

Conditional Expression (13) defines a ratio of the largest air interval within the optical system, to the total thickness of the optical system. In the largest air interval within the optical system, the glass block including the optical filter and others is air-converted, and the glass block including the filter and others arranged behind the optical system is not included in the total thickness of the optical system. Through appropriate setting of the total thickness of the optical system and the air interval, both high optical performance and reduction in weight are achieved.

When the upper limit of Conditional Expression (13) is not satisfied, the air interval becomes too long relative to the total thickness of the optical system, and the number of glasses that can be used to achieve the same total thickness of the optical system decreases. Thus, it becomes difficult to correct aberrations and achieve high optical performance. When the lower limit of Conditional Expression (13) is not satisfied, the air interval becomes too short relative to the total thickness of the optical system, and the number of glasses required for correcting aberrations increases. Thus, it becomes difficult to achieve reduction in weight.

It is further preferred that Conditional Expression (13) be set as follows.

$$0.3 < La/Lc < 0.6 \quad (13a)$$

In the present invention, the optical system of the image pickup apparatus includes the front lens unit having the negative refractive power on the object side of the largest air interval within the optical system and the rear lens unit having the positive refractive power on the image side of the largest air interval. When the focal length of the optical system is represented by f and the focal length of the front lens unit is represented by ff, it is preferred that Conditional Expression (14) be satisfied.

$$0.05 < |ff/f| < 1.5 \quad (14)$$

Conditional Expression (14) defines a ratio of the focal length of the front lens unit ff on the object side of the largest air interval, to the focal length f of the optical system of the image pickup apparatus. This enables the interval between the optical system 102 and the image pickup element 103 to be set appropriately. When the upper limit of Conditional Expression (14) is not satisfied, the refractive power of the front lens unit becomes weaker relative to the refractive power of the optical system, and hence the largest air interval within the optical system becomes too large. Thus, it becomes difficult to reduce the total length of the optical system. When the lower limit of Conditional Expression (14) is not satisfied, the refractive power of the front lens unit becomes too strong relative to the refractive power of the optical system, and the number of glasses required for correcting aberrations increases. Thus, it becomes difficult to achieve reduction in weight.

It is further preferred that Conditional Expression (14) be set as follows.

$$0.1<|f\!f\!/\!f|<1.1 \tag{14a}$$

In the present invention, when an average refractive index of the lenses of the optical system of the image pickup apparatus that have a negative refractive power is represented by nnav, it is preferred that Conditional Expression (15) be satisfied.

$$1.8<nnav \tag{15}$$

It is further preferred that Conditional Expression (15) be set as follows.

$$1.85<nnav \tag{15a}$$

Through satisfaction of Conditional Expression (15), the curvature of the negative lens decreases as a result of use of a material having a high refractive index for the negative lens having a strong refractive power. Thus, it becomes easy to correct the spherical aberration. A further effect is that this configuration is advantageous for correction of the Petzval sum, which enables correction of the field curvature of the peripheral portions of the image. When the lower limit of Conditional Expression (15) is not satisfied, the refractive index of the negative lens becomes too small, and it becomes difficult to correct the Petzval sum. Thus, it becomes difficult to achieve high optical performance.

In the present invention, the lens of the image pickup apparatus that is closest to the object side is the negative lens, and when curvature radii of the negative lens on the object side and on the image side are represented by r1 and r2, respectively, it is preferred that Conditional Expression (16) be satisfied.

$$0.01<|r2/r1|<0.9 \tag{16}$$

Conditional Expression (16) defines a relationship between the curvature radii of the negative lens of the optical system that are closest to the object side.

At a position where the axial marginal ray is highest, the refractive power of the surface on the image side is made larger than the refractive power of the surface on the object side, to thereby correct the spherical aberration.

It is further preferred that Conditional Expression (16) be set as follows.

$$0.05<|r2/r1|<0.75 \tag{16a}$$

In the present invention, when a distance from a paraxial object point position of the optical system of the image pickup apparatus to a vertex of a surface on the image side of the strongest negative lens (single lens or negative cemented lens) within the optical system is represented by Lo, it is preferred that Conditional Expression (17) be satisfied.

$$-0.4<Lo/Ls<0.4 \tag{17}$$

Conditional Expression (17) defines a relationship for the distance from the paraxial object point position of the optical system to the position of the vertex of the surface on the image side of the strongest negative lens within the optical system. Through satisfaction of Conditional Expression (17), an effective diameter of the negative lens having a strong refractive power within the optical system can be reduced. Thus, correction of the Petzval sum and reduction in size of the apparatus can be achieved.

It is further preferred that Conditional Expression (17) be set as follows.

$$-0.2<Lo/Ls<0.4 \tag{17a}$$

The optical system according to the present invention has a feature in that the optical system includes three or more and seven or less lenses, and that the lenses include a positive lens and a negative lens.

Now, a specific configuration of the image pickup apparatus according to the present invention is described by way of features of the optical system of Numerical Embodiment 10 corresponding to Embodiment 10.

Figure 22:
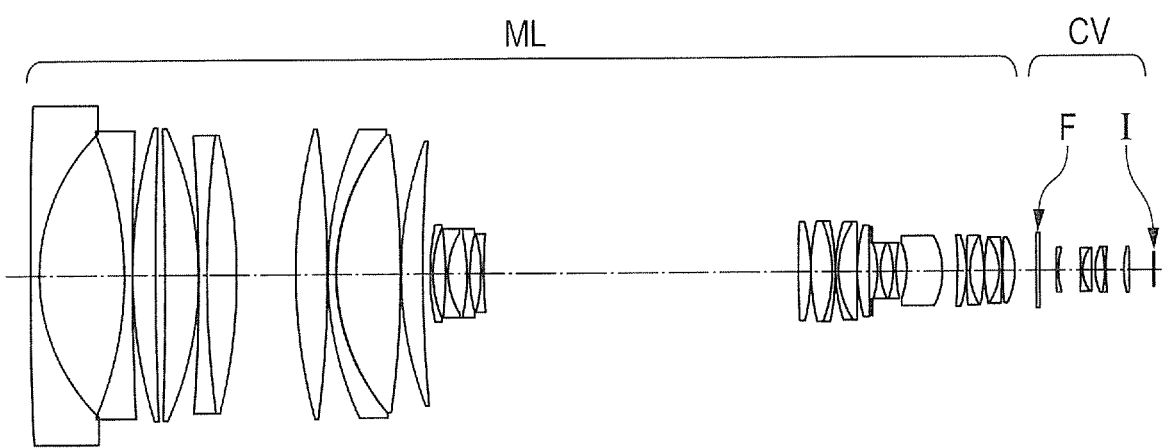
FIG. 22 is a lens cross-sectional view under a state in which the interchangeable lens is mounted to an image pickup apparatus according to Embodiment 10.

FIG. 22 is a lens cross-sectional view under a state in which the interchangeable lens is mounted to the image pickup apparatus according to this Embodiment. In FIG. 22, there are illustrated the interchangeable lens ML, the optical system CV arranged within the image pickup apparatus, and the optical filter F, e.g., an ND filter, a low-pass filter, or an IR cut filter. There is also illustrated the image pickup surface I, which corresponds to the image pickup surface of the solid-state image pickup element.

Figure 23:
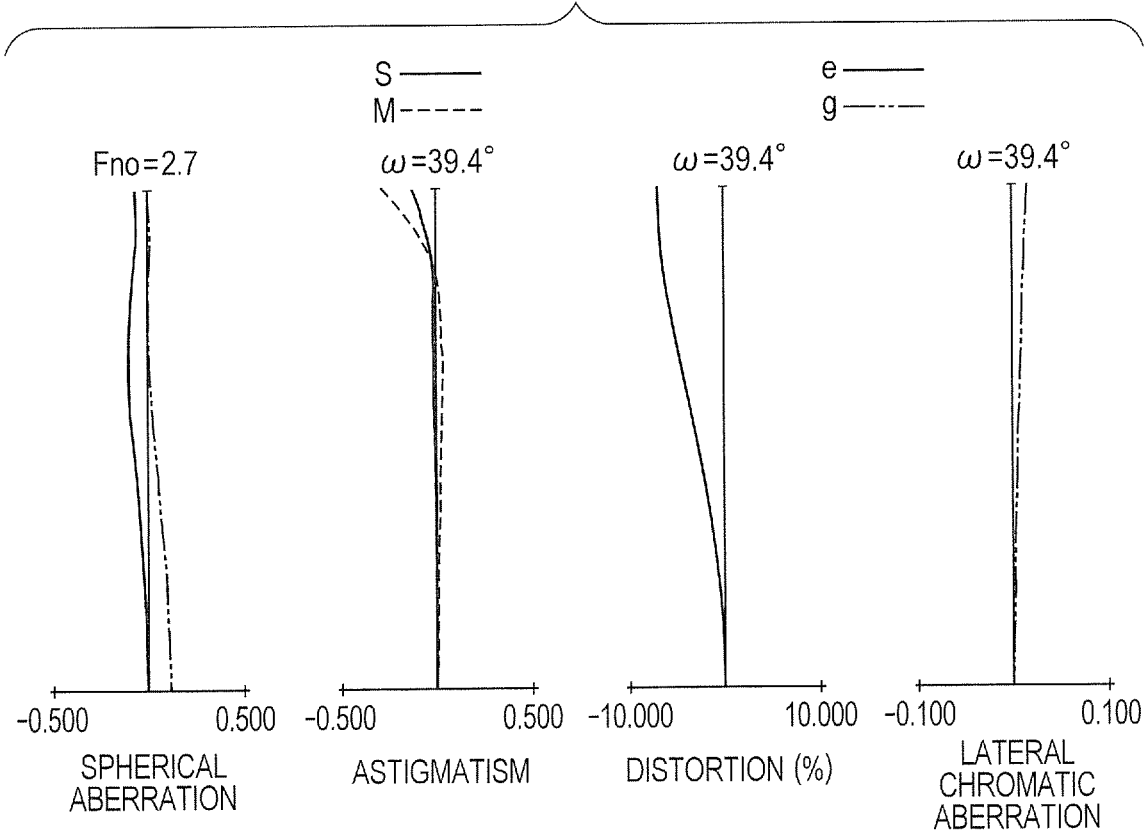
FIG. 23 is longitudinal aberration diagrams when the interchangeable lens is focused on the object at infinity at the wide angle end under the state in which the interchangeable lens is mounted to the image pickup apparatus according to Embodiment 10.

FIG. 23 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 12 mm on the image side.

Next, the optical system according to this Embodiment is described. The optical system includes, in order from the object side to the image side, a meniscus negative lens having a concave surface on the image side, a cemented lens obtained by cementing a biconcave negative lens G2 and a meniscus positive lens G3 having a convex surface on the object side, a cemented lens obtained by cementing a biconvex positive lens G4 and a biconcave negative lens G5, and a biconvex positive lens G6.

In the image pickup apparatus according to this Embodiment, the optical filter F is arranged between the interchangeable lens and the optical system. The front lens unit and the rear lens unit according to this Embodiment correspond to the lens G1 and the lenses G2 to G6, respectively. Through mounting of the interchangeable lens to the image pickup apparatus according to this Embodiment, the image circle of the interchangeable lens is magnified by 1.8 times. The image pickup apparatus according to this Embodiment includes the image pickup element having a diagonal length of 19.8 mm.

Numerical values corresponding to the respective conditional expressions according to this Embodiment are shown in Table 2. The image pickup apparatus according to this Embodiment satisfies Conditional Expression (10) to Conditional Expression (17), and thus has a function of increasing the focal length of the interchangeable lens and achieves reduction in size of the photographing system.

Embodiment 11

Figure 26:
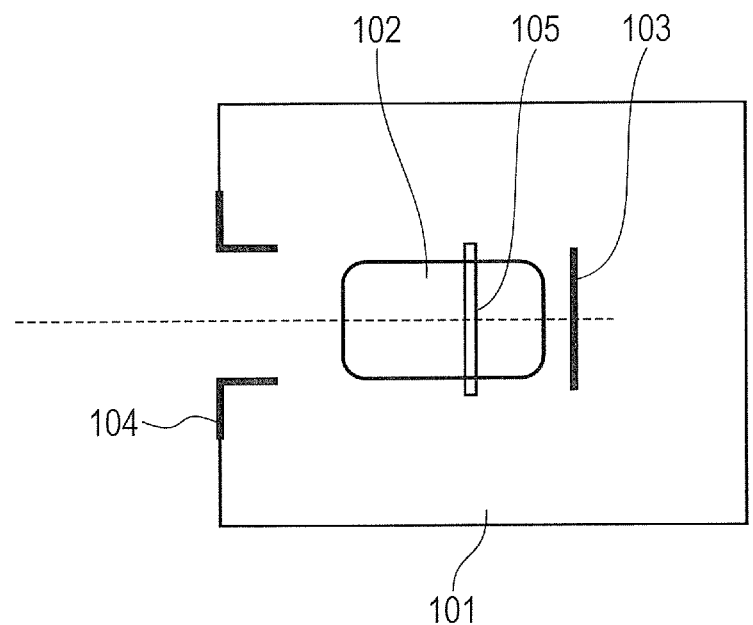
FIG. 26 is a basic configuration diagram according to Embodiment 11 of the present invention.

FIG. 26 is a basic configuration diagram according to Embodiment 11 of the present invention. The image pickup apparatus 101 according to the present invention includes the optical system 102, the image pickup element 103, and the mount 104 to which the interchangeable lens is mountable. The optical system 102 is configured to image an object point, which is located on the image side of the surface of the optical system 102 that is closest to the object side, onto the image pickup element 103. The optical system 102 is configured to increase the focal length of the interchangeable lens and enlarge the image circle of the interchangeable lens.

In addition, a space for arranging the optical filter 105 is secured in the optical system 102. Therefore, as compared with Embodiment 10, through arrangement of the negative lenses on both sides of the largest air interval, the refractive power of each of the negative lenses can be reduced. As a result, it becomes easier to correct aberrations.

Figure 24:
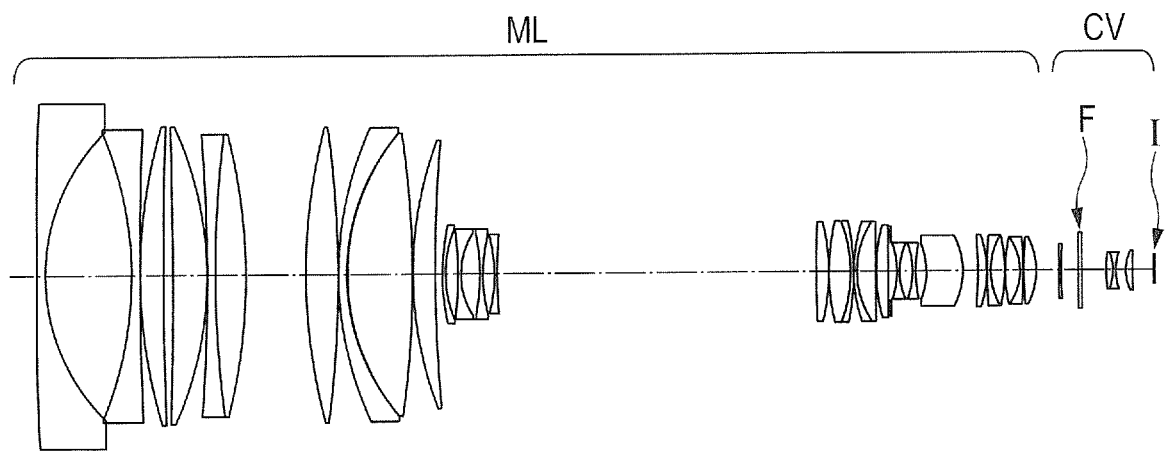
FIG. 24 is a lens cross-sectional view under a state in which the interchangeable lens is mounted to an image pickup apparatus according to Embodiment 11 of the present invention.

FIG. 24 is a lens cross-sectional view under a state in which the interchangeable lens is mounted to the image pickup apparatus according to this Embodiment. In FIG. 24, there are illustrated the interchangeable lens ML, the optical system CV arranged within the image pickup apparatus, and the optical filter F, e.g., an ND filter, a low-pass filter, or an IR cut filter r. There is also illustrated the image pickup surface I, which corresponds to the image pickup surface of the solid-state image pickup element.

Figure 25:
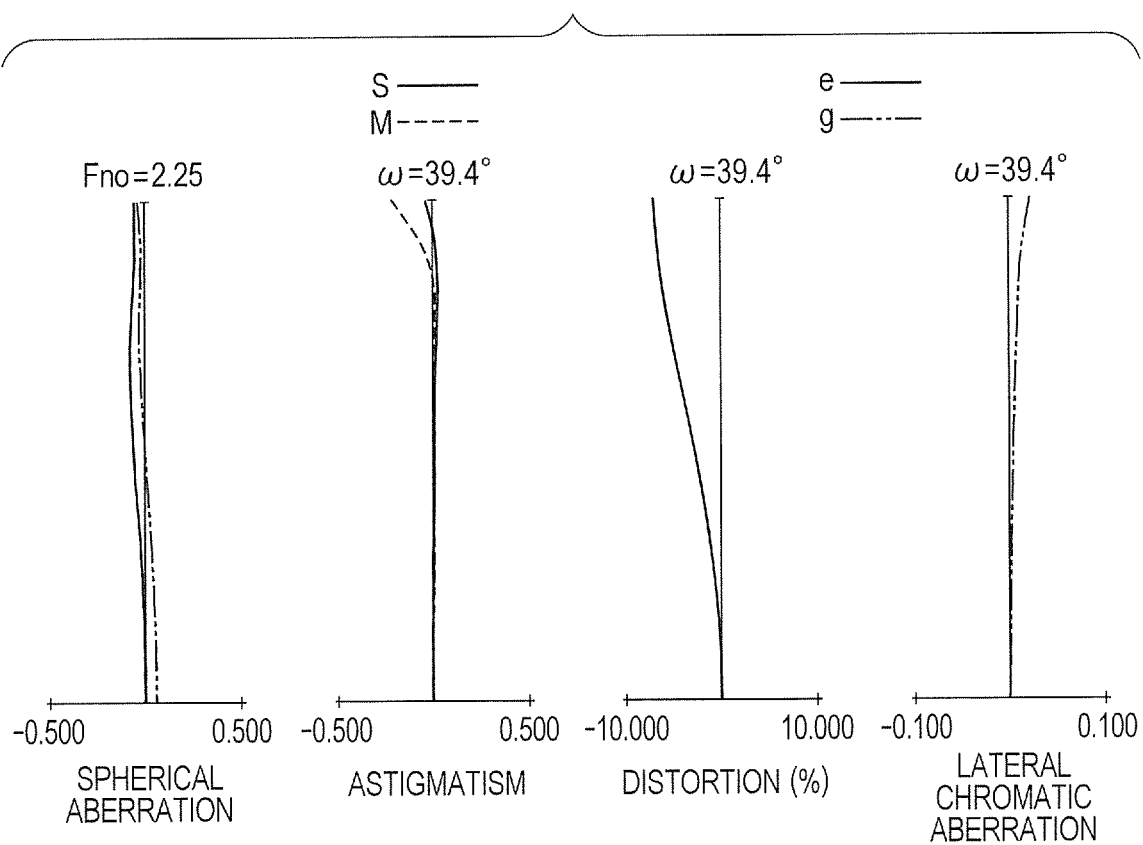
FIG. 25 is longitudinal aberration diagrams when the interchangeable lens is focused on the object at infinity at the wide angle end under the state in which the interchangeable lens is mounted to the image pickup apparatus according to Embodiment 11.

FIG. 25 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 12 mm on the image side.

Next, the optical system according to this Embodiment is described. The optical system includes, in order from the object side to the image side, a meniscus negative lens G1 having a convex surface on the object side, a cemented lens obtained by cementing a biconvex positive lens G2 and a biconcave negative lens G3, and a biconvex positive lens G4. The front lens unit and the rear lens unit according to this Embodiment correspond to the lens G1 and the lenses G2 to G4, respectively. Through mounting of the interchangeable lens to the image pickup apparatus according to this Embodiment, the image circle of the interchangeable lens is magnified by 1.5 times. The image pickup apparatus according to this Embodiment includes the image pickup element having a diagonal length of 16.5 mm.

Numerical values corresponding to the respective conditional expressions according to this Embodiment are shown in Table 2. The image pickup apparatus according to this Embodiment satisfies Conditional Expression (10) to Conditional Expression (17), and thus has a function of increasing the focal length of the interchangeable lens and achieves reduction in size and weight of the photographing system.

Embodiment 12

The basic configuration of Embodiment 12 of the present invention is the same as that of Embodiment 10, and a space for arranging the optical filter is secured between the interchangeable lens and the optical system.

Figure 27:
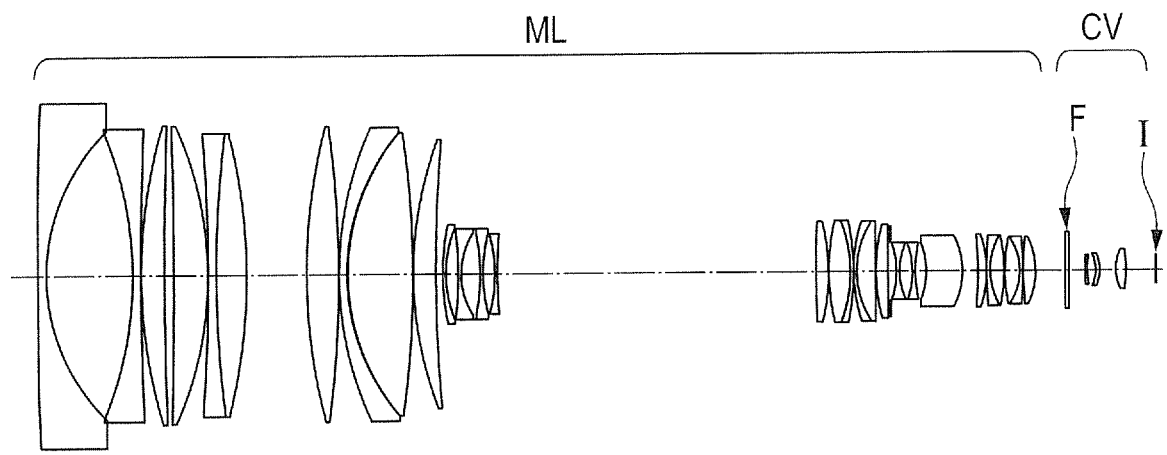
FIG. 27 is a lens cross-sectional view under a state in which the interchangeable lens is mounted to an image pickup apparatus according to Embodiment 12 of the present invention.

FIG. 27 is a lens cross-sectional view under a state in which the interchangeable lens is mounted to an image pickup apparatus according to this Embodiment. In FIG. 27, there are illustrated the interchangeable lens ML, the optical system CV arranged within the image pickup apparatus, and the optical filter F, e.g., an ND filter, a low-pass filter, or an IR cut filter. There is also illustrated the image pickup surface I, which corresponds to the image pickup surface of the solid-state image pickup element.

Figure 28:
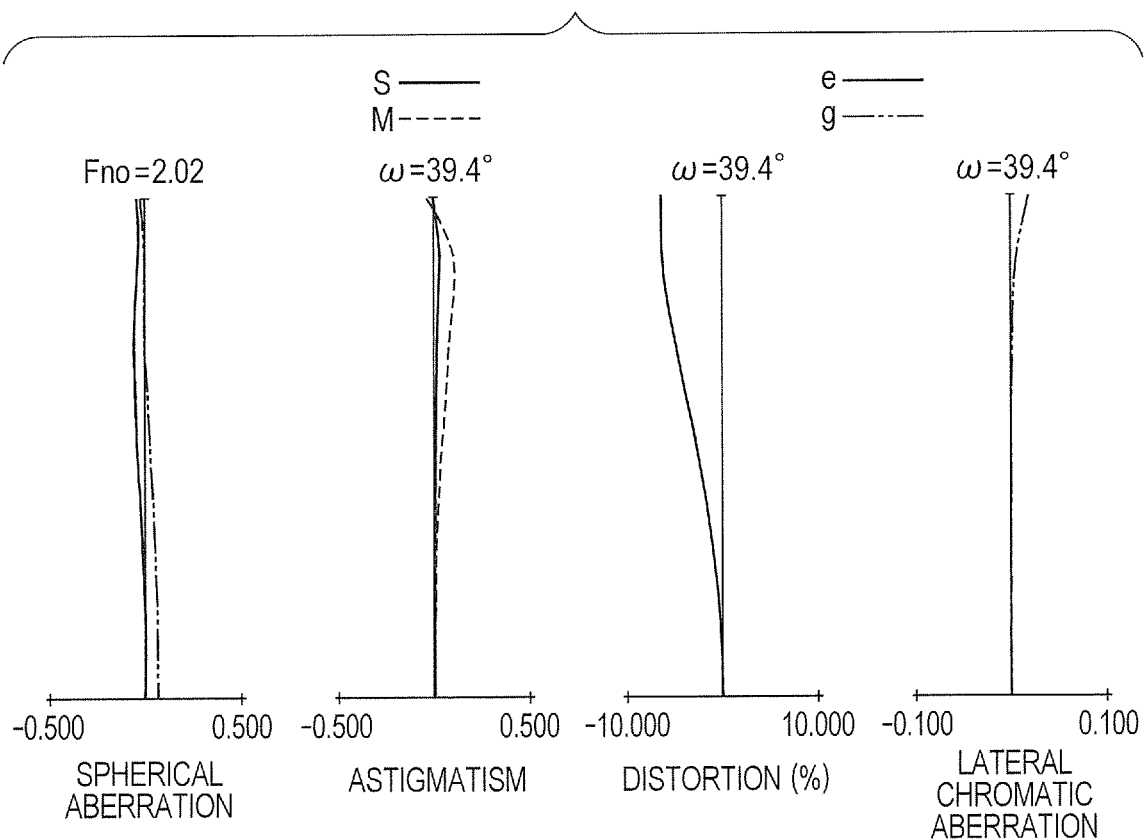
FIG. 28 is longitudinal aberration diagrams when the interchangeable lens is focused on the object at infinity at the wide angle end under the state in which the interchangeable lens is mounted to the image pickup apparatus according to Embodiment 12.

FIG. 28 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 16.78 mm on the image side.

Next, the optical system according to this Embodiment is described. The optical system includes, in order from the object side to the image side, a biconcave negative lens G1, a meniscus positive lens G2 having a convex surface on the image side, and a biconvex positive lens G3. The optical filter is arranged between the interchangeable lens and the lens G1. The front lens unit and the rear lens unit according to this Embodiment correspond to the lenses G1 and G2 and the lens G3, respectively. Through mounting of the interchangeable lens to the image pickup apparatus according to this Embodiment, the image circle of the interchangeable lens is magnified by 1.35 times. The image pickup apparatus according to this Embodiment includes the image pickup element having a diagonal length of 14.9 mm.

Numerical values corresponding to the respective conditional expressions according to this Embodiment are shown in Table 2. The image pickup apparatus according to this Embodiment satisfies Conditional Expression (10) to Conditional Expression (16), and thus has a function of increasing the focal length of the interchangeable lens and achieves reduction in size and weight of the photographing system.

Embodiment 13

The basic configuration of Embodiment 13 of the present invention is the same as that of Embodiment 10, and a space for arranging the optical filter is secured between the interchangeable lens and the optical system.

Figure 29:
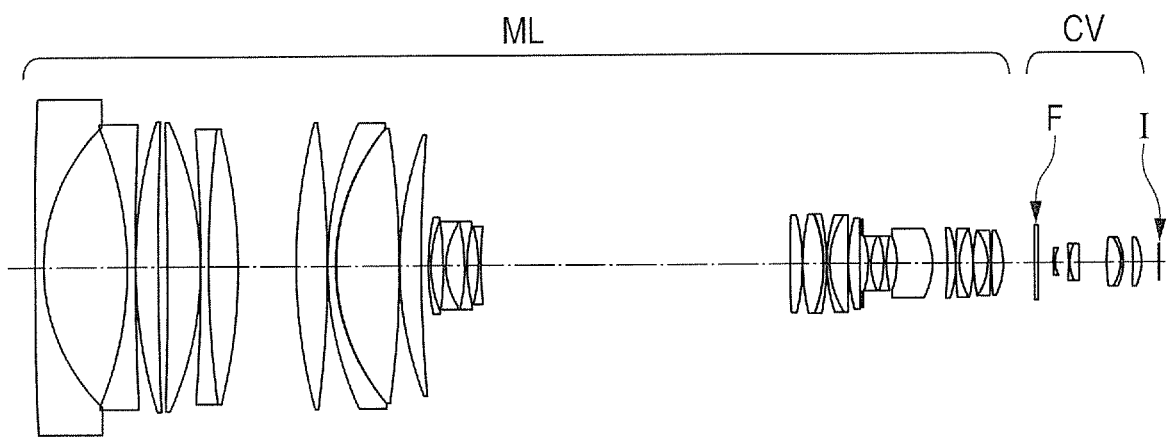
FIG. 29 is a lens cross-sectional view under a state in which the interchangeable lens is mounted to an image pickup apparatus according to Embodiment 13 of the present invention.

FIG. 29 is a lens cross-sectional view under a state in which the interchangeable lens is mounted to the image pickup apparatus according to this Embodiment. In FIG. 29, there are illustrated the interchangeable lens ML, the optical system CV arranged within the image pickup apparatus, and the optical filter F, e.g., an ND filter, a low-pass filter, or an IR cut filter. There is also illustrated the image pickup surface I, which corresponds to the image pickup surface of the solid-state image pickup element.

Figure 30:
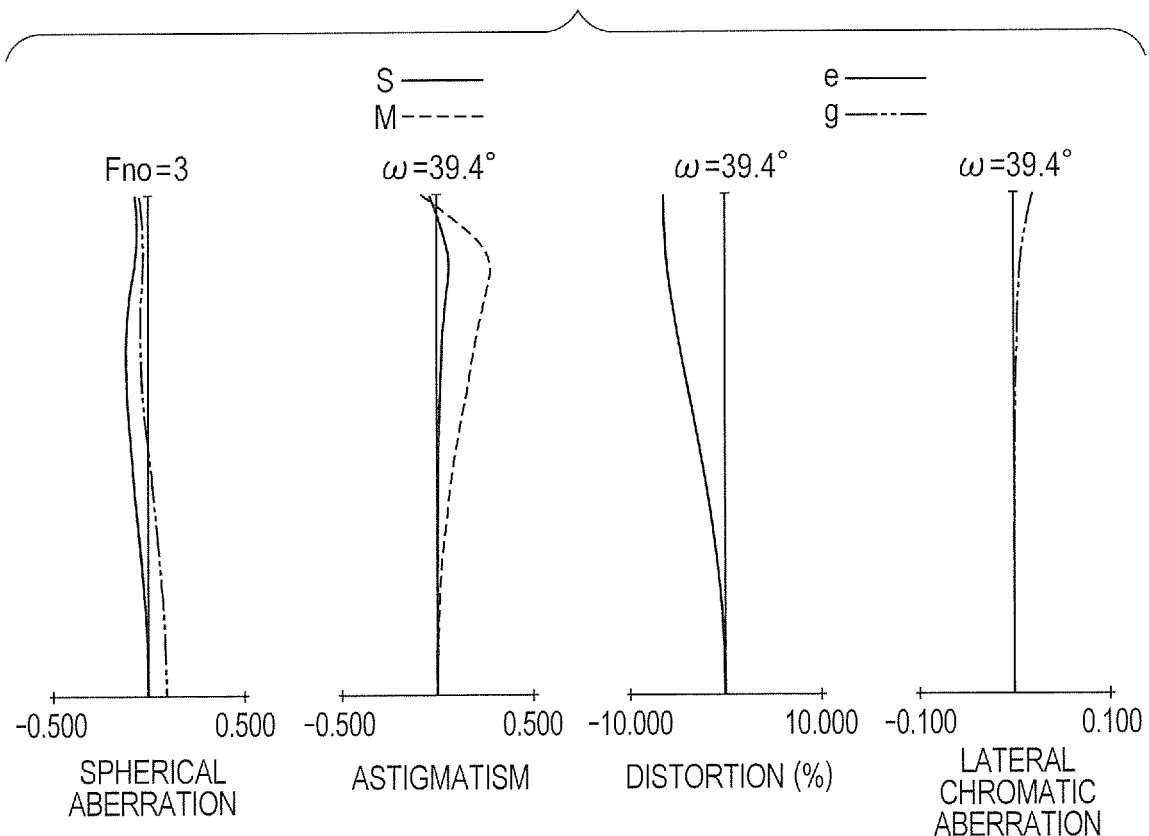
FIG. 30 is longitudinal aberration diagrams when the interchangeable lens is focused on the object at infinity at the wide angle end under the state in which the interchangeable lens is mounted to the image pickup apparatus according to Embodiment 13.

FIG. 30 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 16.91 mm on the image side.

Next, the optical system according to this Embodiment is described. The optical system includes, in order from the object side to the image side, a biconcave negative lens G1, a cemented lens obtained by cementing a meniscus negative lens G2 having a concave surface on the image side and a biconvex positive lens G3, a cemented lens obtained by cementing a biconvex positive lens G4 and a meniscus negative lens G5 having a concave surface on the object side, and a meniscus positive lens having a convex surface on the image side.

The optical filter is arranged between the interchangeable lens and the lens G1. The front lens unit and the rear lens unit according to this Embodiment correspond to the lenses G1 to G3 and the lenses G4 to G6, respectively. Through mounting of the interchangeable lens to the image pickup apparatus according to this Embodiment, the image circle of the interchangeable lens is magnified by 2.0 times. The image pickup apparatus according to this Embodiment includes the image pickup element having a diagonal length of 22.0 mm.

Numerical values corresponding to the respective conditional expressions according to this Embodiment are shown in Table 2. The image pickup apparatus according to this Embodiment satisfies Conditional Expression (10) to Conditional Expression (17), and thus has a function of increasing the focal length of the interchangeable lens and achieves reduction in size and weight of the photographing system.

Embodiment 14

The basic configuration of Embodiment 14 of the present invention is the same as that of Embodiment 11, and a space for arranging the optical filter is secured within the optical system.

Figure 31:
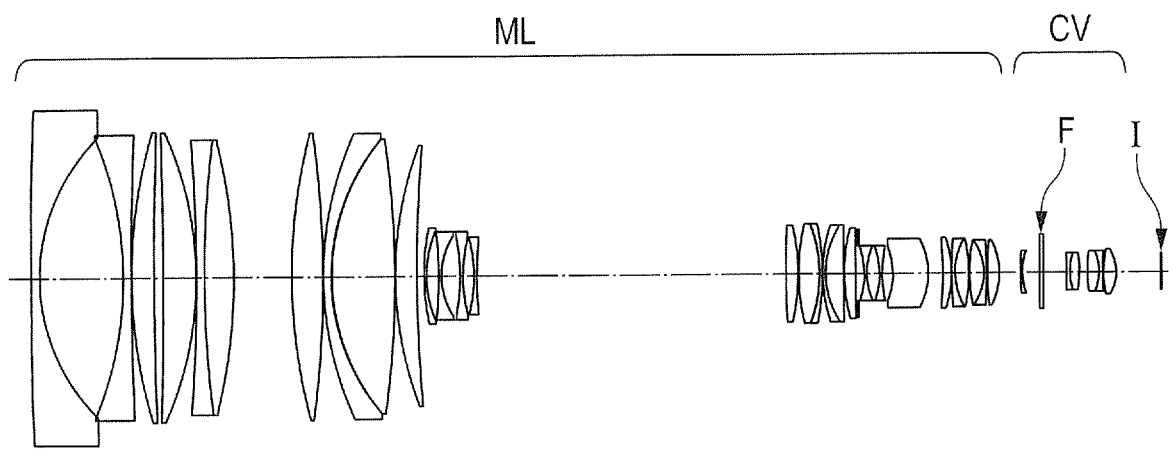
FIG. 31 is a lens cross-sectional view under a state in which the interchangeable lens is mounted to an image pickup apparatus according to Embodiment 14 of the present invention.

FIG. 31 is a lens cross-sectional view under a state in which the interchangeable lens is mounted to an image pickup apparatus according to this Embodiment. In FIG. 31, there are illustrated the interchangeable lens ML, the optical system CV arranged within the image pickup apparatus, and the optical filter F, e.g., an ND filter, a low-pass filter, or an IR cut filter. There is also illustrated the image pickup surface I, which corresponds to the image pickup surface of the solid-state image pickup element.

Figure 32:
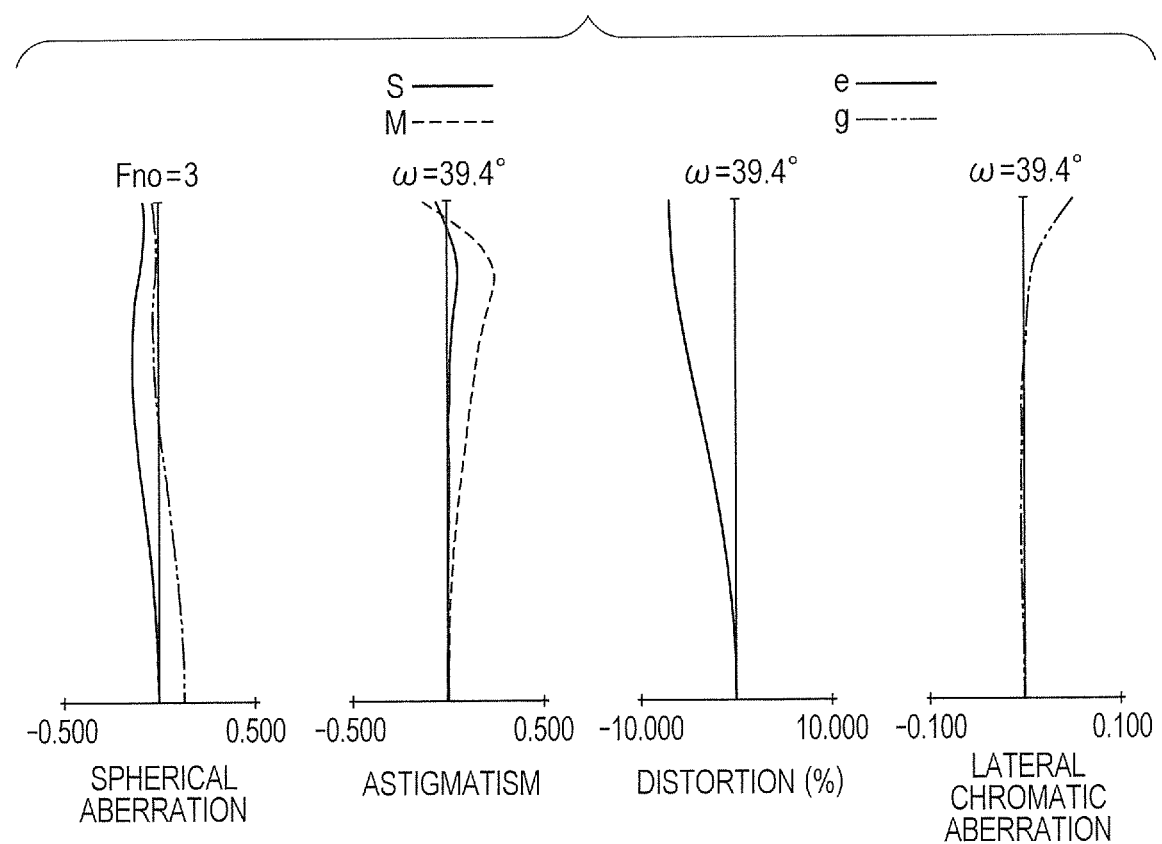
FIG. 32 is longitudinal aberration diagrams when the interchangeable lens is focused on the object at infinity at the wide angle end under the state in which the interchangeable lens is mounted to the image pickup apparatus according to Embodiment 14.

FIG. 32 is longitudinal aberration diagrams when the interchangeable lens is focused on the object at infinity at the wide angle end under the state in which the interchangeable lens is mounted to the image pickup apparatus according to this Embodiment. The optical system according to this Embodiment is arranged at a position away from the 55th surface, which is the surface of the interchangeable lens that is closest to the image side, by 12.78 mm on the image side.

Next, the optical system according to this Embodiment is described. The optical system includes, in order from the object side to the image side, a meniscus negative lens G1 having a convex surface on the object side, a cemented lens obtained by cementing a biconcave negative lens G2 and a biconvex positive lens G3, a cemented lens obtained by cementing a biconvex positive lens G4 and a biconcave negative lens G5, and a biconvex positive lens. The optical filter is arranged between the lenses G1 and G2. The front lens unit and the rear lens unit according to this Embodiment correspond to the lens G1 and the lenses G2 to G6, respectively. Through mounting of the interchangeable lens to the image pickup apparatus according to this Embodiment, the image circle of the interchangeable lens is magnified by 2.0 times. The image pickup apparatus according to this Embodiment includes the image pickup element having a diagonal length of 22.0 mm.

Numerical values corresponding to the respective conditional expressions according to this Embodiment are shown in Table 2. The image pickup apparatus according to this Embodiment satisfies Conditional Expression (10) to Conditional Expression (17), and thus has a function of increasing the focal length of the interchangeable lens and achieves reduction in size and weight of the photographing system.

Embodiment 15

The basic configuration of Embodiment 15 of the present invention is the same as that of Embodiment 10, and a space for arranging the optical filter is secured between the interchangeable lens and the lens G1.

Figure 33:
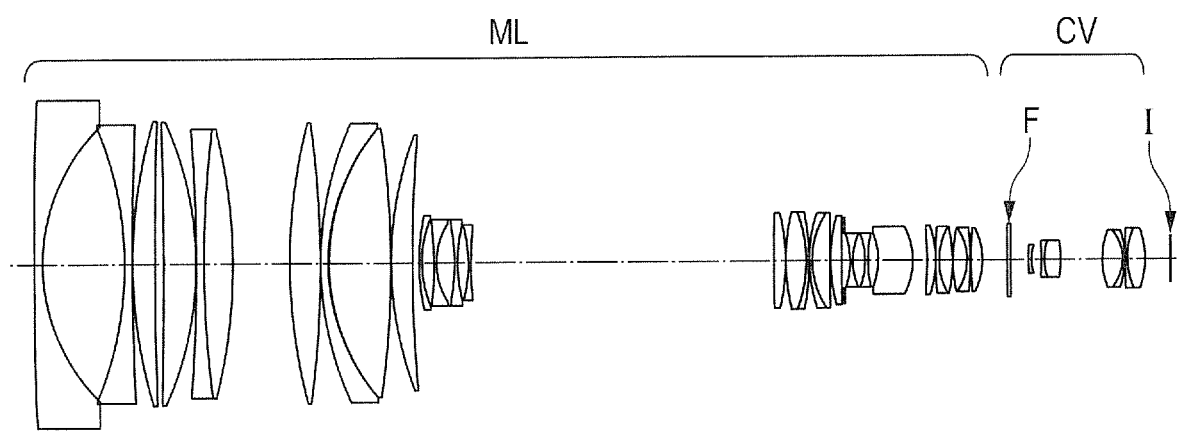
FIG. 33 is a lens cross-sectional view under a state in which the interchangeable lens is mounted to an image pickup apparatus according to Embodiment 15 of the present invention.

FIG. 33 is a lens cross-sectional view under a state in which the interchangeable lens is mounted to the image pickup apparatus according to this Embodiment.

In FIG. 33, there are illustrated the interchangeable lens ML, the optical system CV arranged within the image pickup apparatus, and the optical filter F, e.g., an ND filter, a low-pass filter, or an IR cut filter. There is also illustrated the image pickup surface I, which corresponds to the image pickup surface of the solid-state image pickup element.

Figure 34:
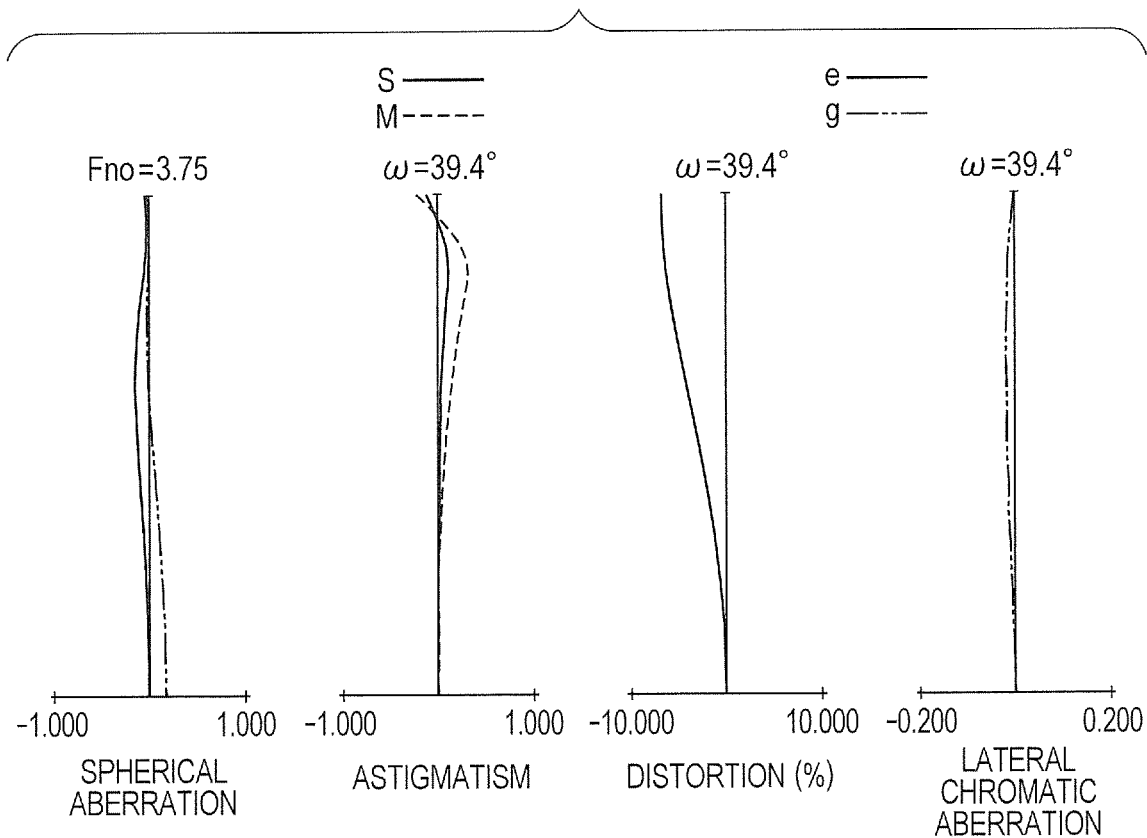
FIG. 34 is longitudinal aberration diagrams when the interchangeable lens is focused on the object at infinity at the wide angle end under the state in which the interchangeable lens is mounted to the image pickup apparatus according to Embodiment 15.

FIG. 34 is longitudinal aberration diagrams when the interchangeable lens is focused on the object at infinity at the wide angle end under the state in which the interchangeable lens is mounted to the image pickup apparatus according to this Embodiment and the optical system is in a reference state.

Figure 35:
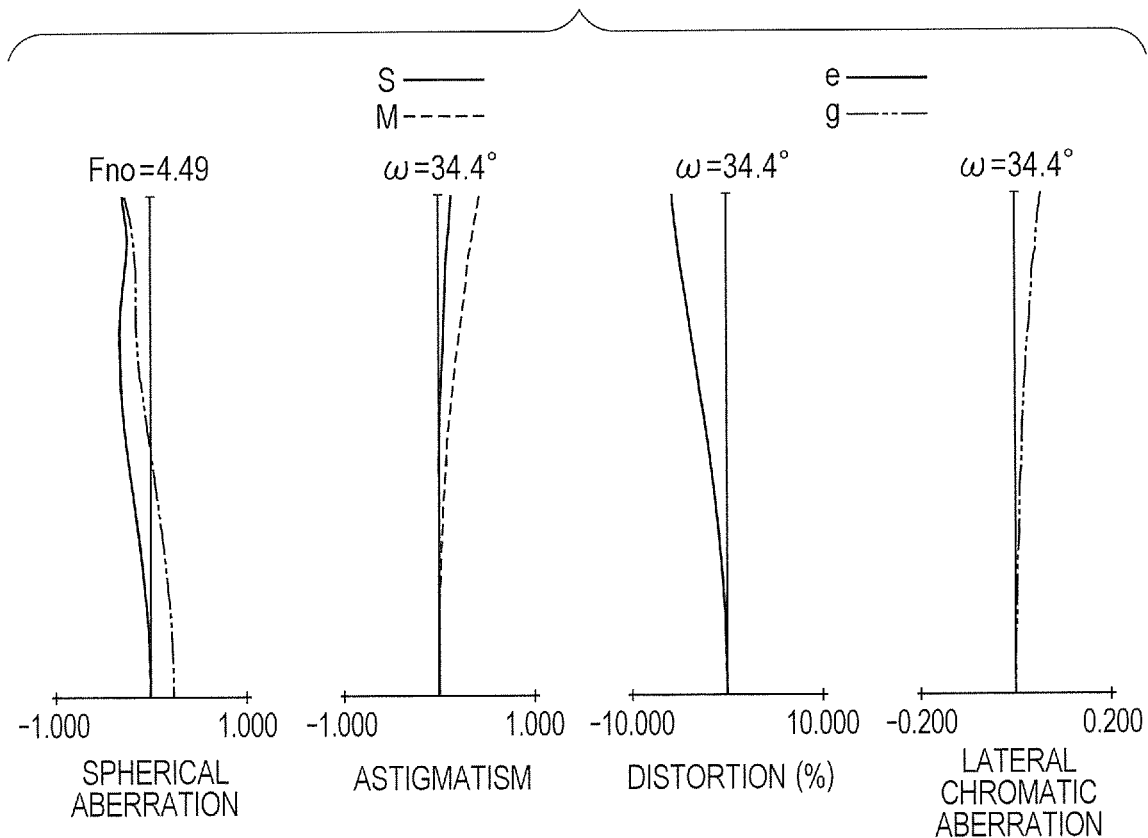
FIG. 35 is longitudinal aberration diagrams when the optical system within the image pickup apparatus according to Embodiment 15 varies a magnification on a long focal length side and when the interchangeable lens is focused on the object at infinity at the wide angle end under the state in which the interchangeable lens is mounted to the image pickup apparatus.

FIG. 35 is longitudinal aberration diagrams when the interchangeable lens is focused on the object at infinity at the wide angle end, and when the optical system shifts a magnification-varying range of the interchangeable lens on a long focal length side by 1.2 times, under the state in which the interchangeable lens is mounted to the image pickup apparatus according to this Embodiment. The optical system according to this Embodiment is arranged at a position away from the 55th surface, which is the surface of the interchangeable lens that is closest to the image side, by 14.59 mm on the image side.

Next, the optical system according to this Embodiment is described. The optical system includes, in order from the object side to the image side, a biconcave lens G1, a cemented lens obtained by cementing a biconcave negative lens G2 and a biconvex positive lens G3, a biconvex positive lens G4, a meniscus negative lens G5 having a concave surface on the object side, and a cemented lens obtained by cementing a meniscus negative lens G6 having a convex surface on the image side and a biconvex positive lens G7. The optical filter is arranged between the interchangeable lens and the lens G1. The front lens unit and the rear lens unit according to this Embodiment correspond to the lenses G1 to G3 and the lenses G4 to G7, respectively. Through mounting of the interchangeable lens to the image pickup apparatus according to this Embodiment, the image circle of the interchangeable lens is magnified by 2.5 times.

The image pickup apparatus according to this Embodiment includes the image pickup element having a diagonal length of 27.5 mm. In addition, in this Embodiment, the front lens unit and the rear lens unit are configured to move on the optical axis, to thereby shift the magnification-varying range of the interchangeable lens on the long focal length side by 1.2 times. Through shifting of the focal length of the interchangeable lens on the long focal length side, a powerful image that is more focused on a subject can be captured.

Numerical values corresponding to the respective conditional expressions according to this Embodiment are shown in Table 2. The image pickup apparatus according to this Embodiment satisfies Conditional Expression (10) to Conditional Expression (17), and thus has a function of increasing the focal length of the interchangeable lens and achieves reduction in size and weight of the photographing system.

Embodiment 16

A rear attachment lens according to the present invention has a feature in that a refractive power and a lens configuration of each lens are defined in order to have an action of changing a focal length of an interchangeable lens toward a magnification side and achieve all of reduction in size of an optical system, securement of a backfocus, and high optical performance.

According to one embodiment of the present invention, the rear attachment lens and an image pickup apparatus including the same are provided. The rear attachment lens is configured to change a focal length of an interchangeable lens toward a magnification side by being mounted to an image side of the interchangeable lens. The rear attachment lens includes, in order from an object side, a negative lens portion, an intermediate lens portion, and a positive lens portion. The intermediate lens portion includes one positive lens and one negative lens.

When focal lengths of the negative lens portion and the rear attachment lens are represented by fn and f, respectively, a distance on an optical axis from a surface of the rear attachment lens that is closest to the object side to a surface thereof that is closest to the image side is represented by Lc, and a backfocus in air when the rear attachment lens is mounted to the interchangeable lens is represented by BFair, the following expressions are satisfied.

$$0.01 < |fn/f| < 0.25 \quad (18)$$

$$1.8 < BFair/Lc < 3.5 \quad (19)$$

Herein, the negative lens portion represents one negative lens or a cemented lens having a negative refractive power, and the positive lens portion represents one positive lens or a cemented lens having a positive refractive power.

An optical action of the present invention obtained by arranging, in order from the object side, the negative lens portion, the intermediate lens portion, and the positive lens portion is described. Arrangement of the negative lens portion closest to the object side and the positive lens portion closest to the image side results in so-called retrofocus arrangement, and thus a principal point of the rear attachment lens on the image side can be set on the image side. As a result, this configuration is advantageous for increasing the backfocus when the rear attachment lens is mounted. In addition, through arrangement of the intermediate lens portion including one positive lens and one negative lens between the negative lens portion and the positive lens portion, a chromatic aberration and a spherical aberration generated by the negative lens portion and the positive lens portion can be corrected satisfactorily.

Further, through satisfaction of Expression (18) and Expression (19), the rear attachment lens capable of achieving all of reduction in size of the optical system, securement of the backfocus, and high optical performance can be effectively implemented. Expression (18) defines a ratio of the focal length of the negative lens portion to the focal length of the rear attachment lens. Through satisfaction of Expression (18), both securement of the backfocus and high optical performance are achieved.

When the condition of the upper limit of Expression (18) is not satisfied, the refractive power of the negative lens portion becomes weaker relative to the refractive power of the rear attachment lens. Thus, the backfocus is reduced when the rear attachment lens is mounted, and it becomes difficult to secure a sufficient backfocus.

When the condition of the lower limit of Expression (18) is not satisfied, the refractive power of the negative lens portion becomes stronger. Thus, a spherical aberration and a field curvature generated by the negative lens portion become larger. As a result, the aberrations generated by the negative lens portion cannot be sufficiently corrected by the intermediate lens portion, and it becomes difficult to achieve high optical performance. It is further preferred that Expression (18) be set as follows.

$$0.02 < |fn/f| < 0.22 \quad (18a)$$

Expression (19) defines a ratio of the backfocus in air when the rear attachment lens is mounted to the interchangeable lens, to the distance on the optical axis from the surface of the rear attachment lens that is closest to the object side to the surface thereof that is closest to the image side. Through satisfaction of Expression (19), securement of the backfocus, reduction in size of the rear attachment lens, and high optical performance are all satisfied.

When the condition of the upper limit of Expression (19) is not satisfied, the total thickness of the rear attachment lens becomes smaller. Thus, the refractive powers of the negative lens portion and the positive lens portion become stronger, and it becomes difficult to correct a Petzval sum. As a result, the field curvature deteriorates, and it becomes difficult to achieve high optical performance.

When the condition of the lower limit of Expression (19) is not satisfied, it becomes difficult to secure the backfocus. Thus, the rear attachment lens cannot be mounted to a camera supporting the interchangeable lens. It is further preferred that Expression (19) be set as follows.

$$2.0 < BFair/Lc < 3.0 \quad (19a)$$

A further aspect of the rear attachment lens according to the present invention has a feature in that the negative lens portion includes one negative lens and the positive lens portion includes one positive lens.

As a further aspect of the rear attachment lens according to the present invention, refractive indices of optical materials forming the rear attachment lens are defined. When a refractive index of the negative lens forming the negative lens portion is represented by Nn and an average value of refractive indices of the negative lenses forming the rear attachment lens is represented by Nave, the following expressions are satisfied.

$$1.85 < Nn \quad (20)$$

$$1.80 < Nave \quad (21)$$

Through satisfaction of Expression (20) and Expression (21), both reduction in size of the rear attachment lens and high optical performance are achieved.

Expression (20) defines the refractive index of the negative lens forming the negative lens portion. The use of a material having a high refractive index for the negative lens portion having a high refractive power is advantageous for correction of the Petzval sum, which enables correction of the field curvature of the peripheral portions of the image. When the condition of the lower limit of Expression (20) is not satisfied, it becomes difficult to correct the Petzval sum. Thus, it becomes difficult to achieve high optical performance. In addition, a curvature of the negative lens forming the negative lens portion becomes larger, and the spherical aberration cannot be corrected satisfactorily.

Expression (21) defines the average value of the refractive indices of the negative lenses forming the rear attachment lens. When the condition of the lower limit of Expression (21) is not satisfied, curvatures of the negative lenses forming the rear attachment lens become larger, and the thicknesses of the lenses become larger. As a result, it becomes difficult to reduce the size of the rear attachment lens. It is further preferred that Expression (20) and Expression (21) be set as follows.

$$1.88 < Nn < 2.20 \quad (20a)$$

$$1.85 < Nave < 2.10 \quad (21a)$$

As a further aspect of the rear attachment lens according to the present invention, Abbe numbers with respect to the d-line and partial dispersion ratios of optical materials to be used for the intermediate lens portion are defined. When the Abbe numbers with respect to the d-line of the positive lens and the negative lens forming the intermediate lens portion are represented by $vp$ and $vn$, respectively, and the partial dispersion ratios thereof are represented by $\theta p$ and $\theta n$, respectively, the following expression is satisfied.

$$-3.5 \times 10^{-3} < (\theta p - \theta n)/(vp - vn) < -1.0 \times 10^{-3} \quad (22)$$

In this connection, an Abbe number $vd$ with respect to the d-line and a partial dispersion ratio $\theta gF$ of a material of an optical element (lens) used in the present invention are as follows. When refractive indices at the g-line (435.8 nm), the F-line (486.1 nm), the d-line (587.6 nm), and the C-line (656.3 nm) of the Fraunhofer lines are represented by Ng, NF, Nd, and NC, respectively, the Abbe number $vd$ with respect to the d-line and the partial dispersion ratio $\theta gF$ at the g-line and the F-line are as follows.

$$vd = (Nd - 1)/(NF - NC) \quad (a)$$

$$\theta gF = (Ng - NF)/(NF - NC) \quad (b)$$

The partial dispersion ratio $\theta gF$ of an existing optical material is present in a narrow range relative to the Abbe number $vd$ with respect to the d-line. In addition, the existing optical material has a tendency that its partial dispersion ratio $\theta gF$ becomes larger as its Abbe number $vd$ becomes smaller, and its refractive index becomes smaller as its Abbe number $vd$ becomes larger.

A condition for correcting a chromatic aberration in a thin contact lens system including two lenses 1 and 2 having refractive powers $\varphi 1$ and $\varphi 2$ and Abbe numbers $v1$ and $v2$, respectively, is expressed by the following expression.

$$\varphi 1/v1 + \varphi 2/v2 = E \quad (c)$$

A combined refractive power c of the lenses 1 and 2 is expressed by the following expression.

$$\varphi = \varphi 1 + \varphi 2 \quad (d)$$

When E=0 is satisfied in Expression (c), in the chromatic aberration, imaging positions of the C-line and the F-line match each other. At this time, $\varphi 1$ and $\varphi 2$ are expressed by the following expressions, respectively.

$$\varphi 1 = \varphi \times v1/(v1 - v2) \quad (e)$$

$$\varphi 2 = \varphi \times v2/(v1 - v2) \quad (f)$$

Figure 51:
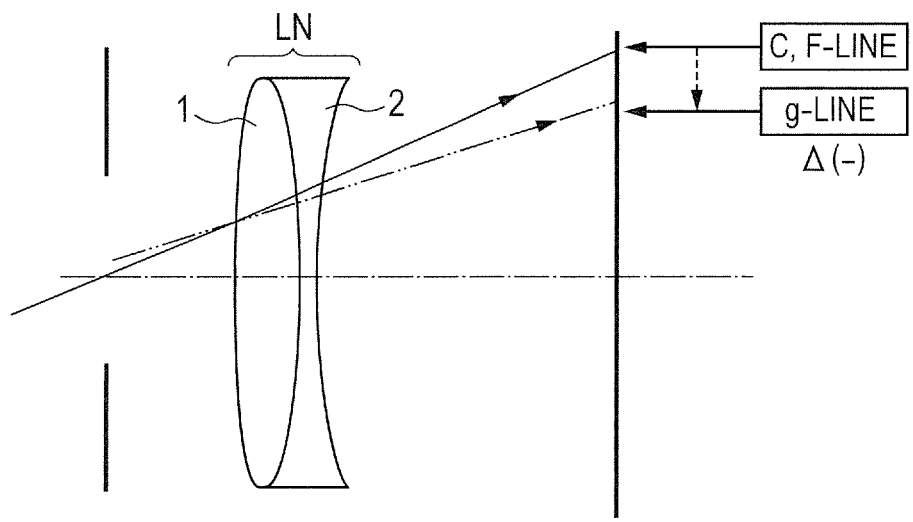
FIG. 51 is a schematic diagram for illustrating primary chromatic aberration correction and a residual secondary spectrum of a lateral chromatic aberration by a negative lens unit.

FIG. 51 is a schematic diagram for illustrating primary chromatic aberration correction and a residual secondary spectrum of a lateral chromatic aberration by a lens unit LN having a negative refractive power, which is arranged between an image surface and the aperture stop. In the chromatic aberration correction by the negative lens unit LN as illustrated in FIG. 51, a material having a small Abbe number v1 is used for a positive lens 1, and a material having a large Abbe number v2 is used for a negative lens 2. Therefore, the positive lens 1 has a large partial dispersion ratio θ1, and the negative lens 2 has a small partial dispersion ratio θ2.

When a primary lateral chromatic aberration is corrected for the C-line and the F-line, an imaging point of the g-line is deviated to be closer to the optical axis. When a deviation amount of the lateral chromatic aberration of the g-line with respect to the C-line and the F-line is defined as a secondary spectrum amount $\Delta Y$, $\Delta Y$ is expressed by the following expression.

$$\Delta Y = (1/\varphi) \times (\theta 1 - \theta 2)/(v1 - v2) \quad (g)$$

In order to satisfactorily correct a secondary spectrum of the lateral chromatic aberration generated by the rear attachment lens, such a glass material as to reduce the secondary spectrum amount $\Delta Y$ generated by the intermediate lens portion needs to be selected.

The condition of Expression (22) is defined in order to satisfactorily correct the lateral chromatic aberration generated by the rear attachment lens.

When the condition of the upper limit of Expression (22) is not satisfied, the denominator of Expression (22) becomes larger. Thus, an optical material having a larger Abbe number $vn$ needs to be used for a concave lens forming the intermediate lens portion. An existing optical material has a tendency that its refractive index becomes smaller as its Abbe number becomes larger, and hence it becomes difficult to satisfy Expression (21).

When the condition of the lower limit of Expression (22) is not satisfied, an absolute value of the numerator of Expression (g) becomes larger. Thus, it becomes difficult to satisfactorily correct the secondary spectrum of the lateral chromatic aberration generated by the rear attachment lens. It is further preferred that Expression (22) be set as follows.

$$-3.2 \times 10^{-3} < (\theta p - \theta n)/(vp - vn) < -1.2 \times 10^{-3} \quad (22a)$$

As a further aspect of the rear attachment lens according to the present invention, a shape of the negative lens forming the negative lens portion is defined. When a curvature radius on the object side of the negative lens forming the negative lens portion is represented by R1 and a curvature radius on the image side of the negative lens is represented by R2, the following expression is satisfied.

$$0.4 < (R1 + R2)/(R1 - R2) < 1.2 \quad (23)$$

Through satisfaction of Expression (23), both securement of the backfocus and high optical performance are achieved. As described above, in order to increase the backfocus at the time of mounting of the rear attachment lens, the refractive power of the negative lens forming the negative lens portion needs to be increased. Meanwhile, rays enter the surface of the negative lens portion that is closest to the object side while converging, and hence when a concave surface having a large curvature is used for the surface of the negative lens on the object side, a spherical aberration is generated by a large amount.

When the condition of the upper limit of Expression (23) is not satisfied, the curvature on the object side of the surface of the negative lens becomes smaller. Thus, the refractive power of the negative lens becomes smaller, and it becomes difficult to secure the backfocus at the time of mounting of the rear attachment lens. When the condition of the lower limit of Expression (23) is not satisfied, the curvature on the object side of the surface of the negative lens becomes larger. Thus, it becomes difficult to correct the spherical aberration, and hence it becomes difficult to achieve high optical performance. It is further preferred that Expression (23) be set as follows.

$$0.5<(R1+R2)/(R1-R2)<1.0 \tag{23a}$$

As a further aspect of the rear attachment lens according to the present invention, a magnification ratio of the rear attachment lens is defined. When a lateral magnification of the rear attachment lens under a state in which the rear attachment lens is mounted to the interchangeable lens is represented by β, the following expression is satisfied.

$$1.2<\beta<1.5 \tag{24}$$

When the condition of the upper limit of Expression (24) is not satisfied, magnification ratios of various aberrations become larger, and the number of lenses needs be increased in order to correct those aberrations. Thus, it becomes difficult to reduce the size of the rear attachment lens. When the condition of the lower limit of Expression (24) is not satisfied, the magnification ratios of the rear attachment lens become smaller. Thus, the action of changing the focal length of the interchangeable lens toward the magnification side becomes weaker.

The image pickup apparatus according to the present invention has a feature in that the image pickup apparatus further includes a solid-state image pickup element having a predetermined effective image pickup range, which is configured to receive light of an image formed by the interchangeable lens and the rear attachment lens of each of Embodiments.

Figure 37:
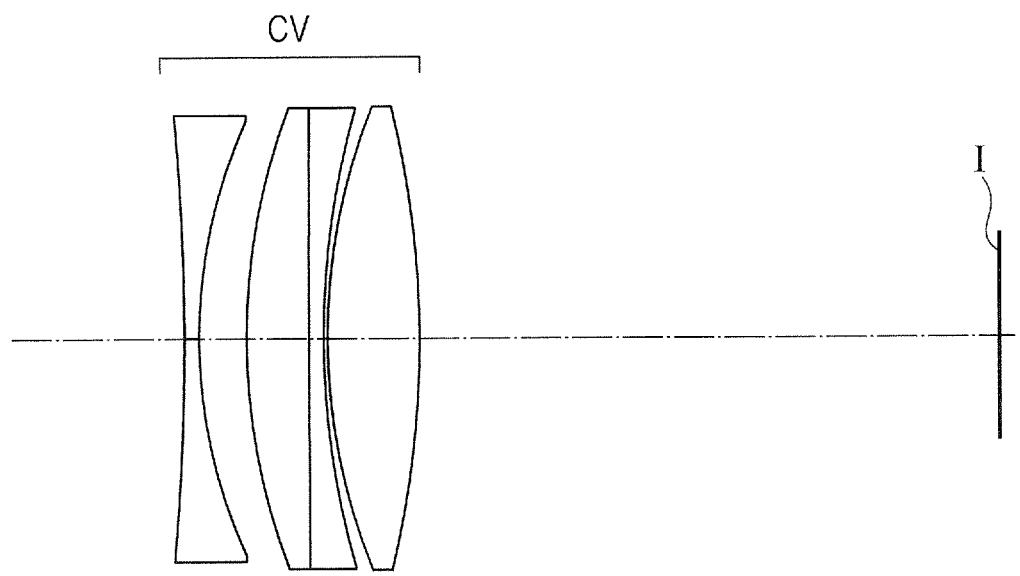
FIG. 37 is a lens cross-sectional view according to Embodiment 16 (Numerical Embodiment 16) of the present invention.
Figure 38:
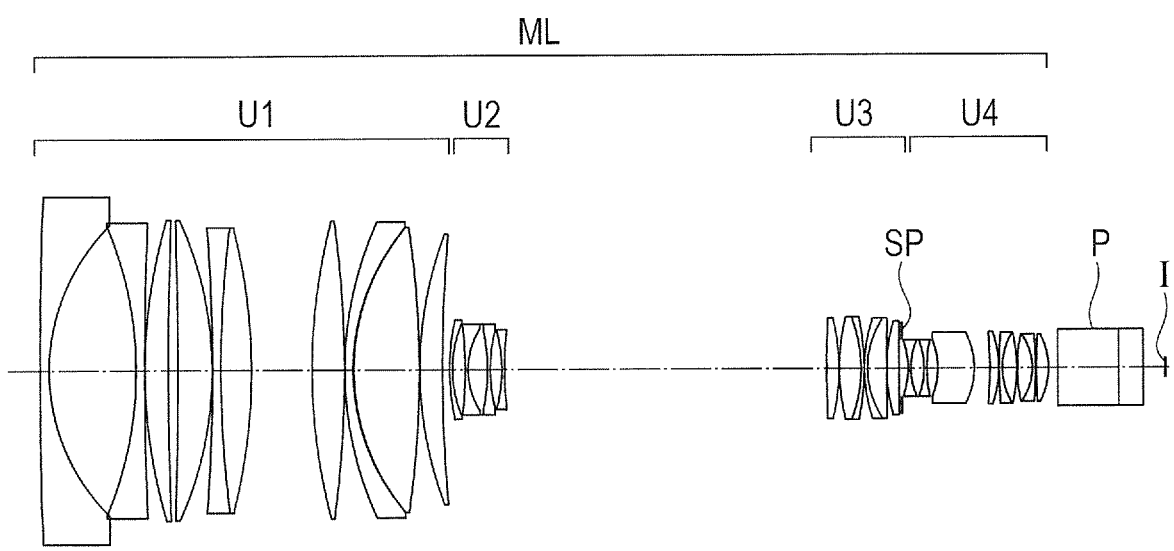
FIG. 38 is a lens cross-sectional view of the interchangeable lens when focused on the object at infinity at the wide angle end.
Figure 39:
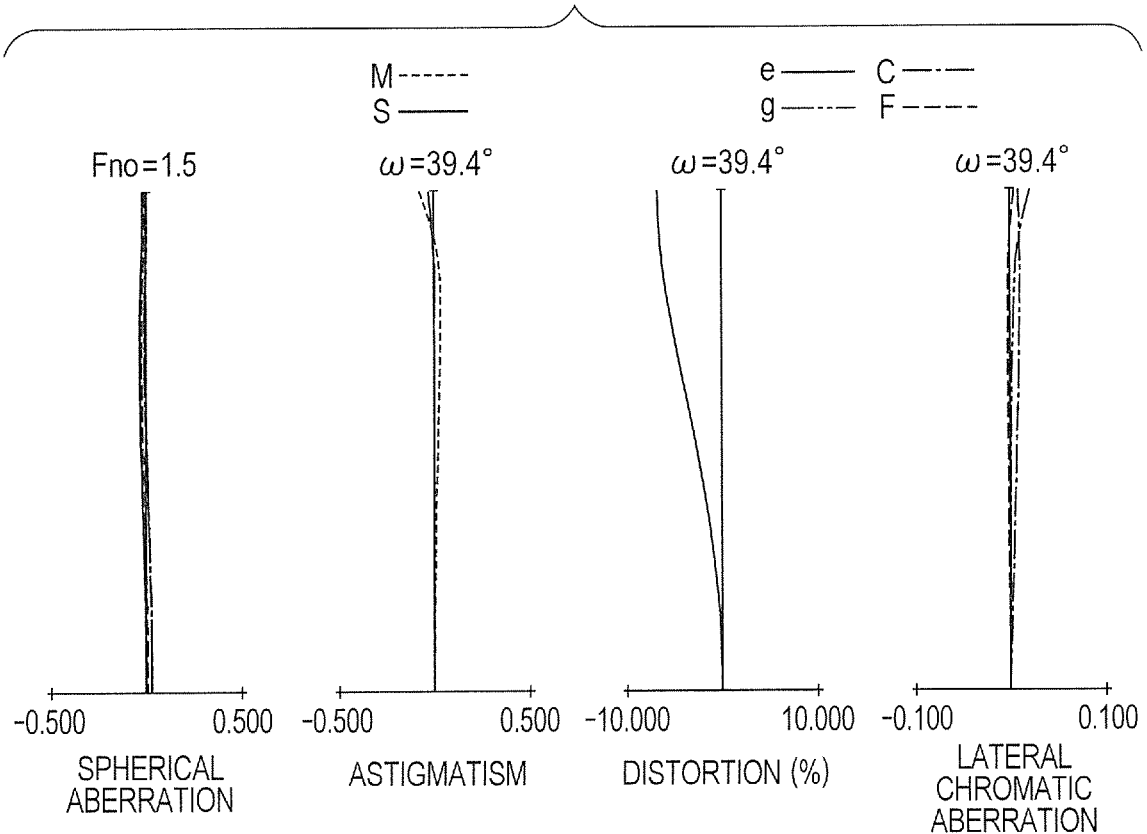
FIG. 39 is longitudinal aberration diagrams of the interchangeable lens when focused on the object at infinity at the wide angle end.

FIG. 37 is a lens cross-sectional view of the rear attachment lens according to Embodiment 16 (Numerical Embodiment 16) of the present invention. FIG. 38 is a lens cross-sectional view of the interchangeable lens to be mounted to the image pickup apparatus according to Embodiments 16 to 19 of the present invention when, as an embodiment, focused on the object at infinity at the wide angle end. FIG. 39 is longitudinal aberration diagrams of the interchangeable lens when focused on the object at infinity at the wide angle end. Further, the values of the focal lengths are values when expressed in mm of the numerical embodiment to be described later. The same applies to the subsequent numerical embodiments.

In FIG. 38, in order from the object side, there is provided the first lens unit (focus lens unit) U1 for focusing having the positive refractive power. Further, there is provided the second lens unit (variator) U2 for zooming having the negative refractive power which is configured to move to the image side during zooming from the wide angle end to the telephoto end. Further, there is provided the third lens unit (compensator) U3 having the positive refractive power which is configured to move non-linearly on the optical axis in conjunction with the movement of the second lens unit U2, and to correct the image plane variation accompanying zooming.

Further, there is provided the fourth lens unit (relay lens unit) U4 having the positive refractive power and the imaging action which is configured not to move for zooming. The second lens unit U2 and the third lens unit U3 construct the magnification-varying system. The aperture stop SP is arranged on the object side of the fourth lens unit U4. The color separation optical system or optical filter P is represented as a glass block. The image pickup surface I corresponds to the image pickup surface of the solid-state image pickup element.

Figure 40:
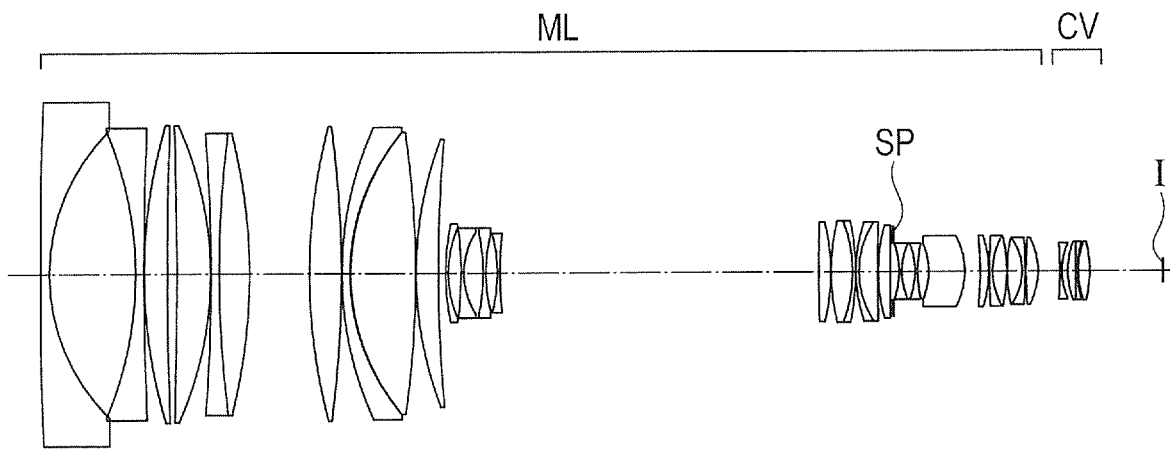
FIG. 40 is a lens cross-sectional view under a state in which a rear attachment lens according to Numerical Embodiment 16 is mounted to the interchangeable lens.

FIG. 40 is a lens cross-sectional view under a state in which the rear attachment lens according to this Embodiment is mounted to the image side of the interchangeable lens. In FIG. 40, there are illustrated the interchangeable lens ML and the rear attachment lens CV. There is also illustrated the image pickup surface I, which corresponds to the image pickup surface of the solid-state image pickup element.

Figure 41:
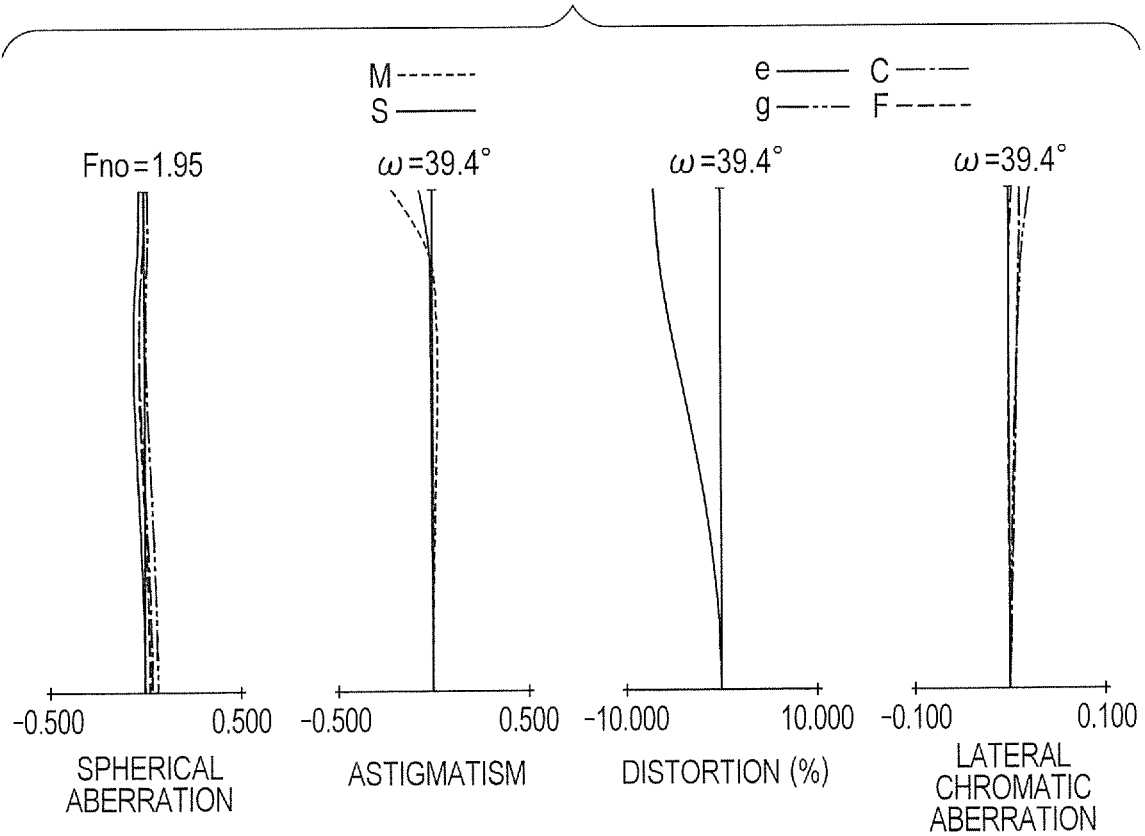
FIG. 41 is longitudinal aberration diagrams when the interchangeable lens is focused on the object at infinity at the wide angle end under the state in which the rear attachment lens according to Numerical Embodiment 16 is mounted to the interchangeable lens.

FIG. 41 is longitudinal aberration diagrams when the interchangeable lens is focused on the object at infinity at the wide angle end under the state in which the rear attachment lens according to this Embodiment is mounted to the interchangeable lens. The rear attachment lens according to this Embodiment is arranged at a position away from the 55th surface, which is the surface of the interchangeable lens that is closest to the image side, by 12 mm on the image side.

Next, the rear attachment lens according to this Embodiment is described. The rear attachment lens includes, in order from the object side, a first lens G1 that is a biconcave lens, a cemented lens obtained by cementing a second lens G2 that is a meniscus convex lens having a concave surface on the image side and a third lens G3 that is a meniscus concave lens having a convex surface on the object side, and a fourth lens G4 that is a biconvex lens. The negative lens portion, the intermediate lens portion, and the positive lens portion according to this Embodiment correspond to the first lens G1, the second lens G2 and the third lens G3, and the fourth lens G4, respectively. Through mounting of the rear attachment lens according to this Embodiment to the interchangeable lens, the image circle of the interchangeable lens is magnified by 1.3 times.

Numerical values corresponding to the respective conditional expressions according to this Embodiment are shown in Table 3. The rear attachment lens according to this Embodiment satisfies Conditional Expression (18) to Conditional Expression (24), and thus has the action of changing the focal length of the interchangeable lens toward the magnification side and achieves all of reduction in size of the optical system, securement of the backfocus, and high optical performance. However, although the zoom lens according to the present invention needs to satisfy Expression (18) and Expression (19), the zoom lens according to the present invention does not need to satisfy Expression (20) to Expression (24). Note that, when at least one of Expression (20) to Expression (24) is satisfied, a more advantageous effect can be achieved. This applies to other Embodiments.

Embodiment 17

Figure 42:
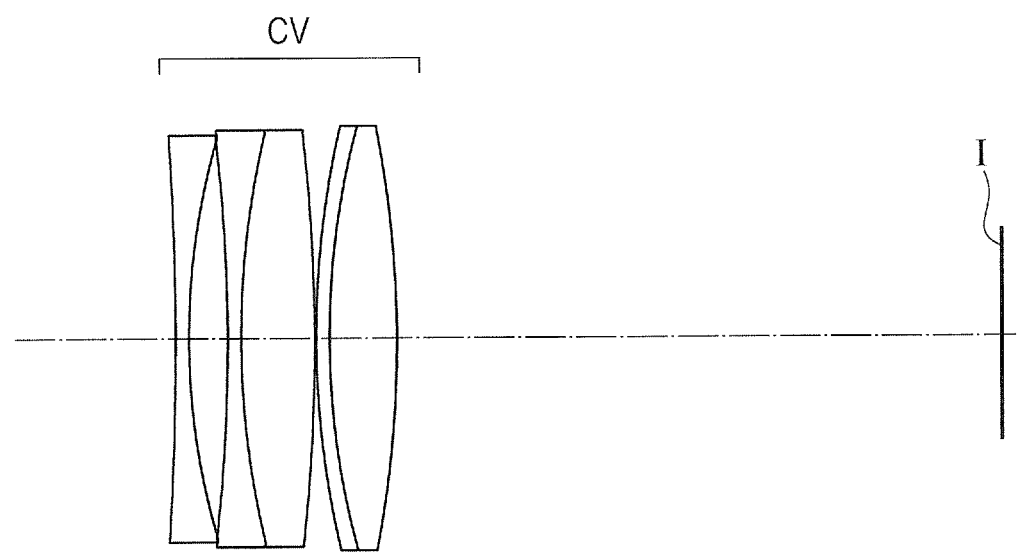
FIG. 42 is a lens cross-sectional view according to Embodiment 17 (Numerical Embodiment 17) of the present invention.
Figure 43:
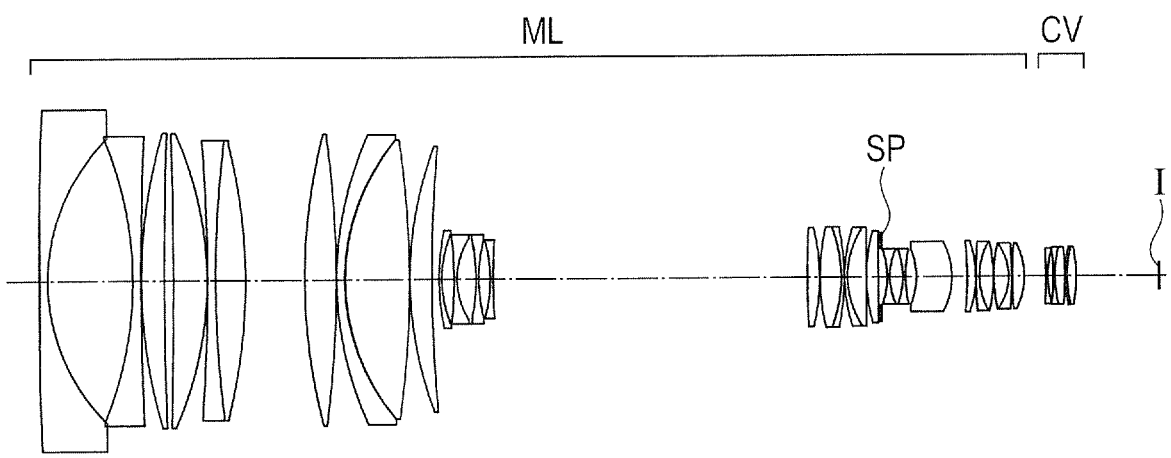
FIG. 43 is a lens cross-sectional view under a state in which a rear attachment lens according to Numerical Embodiment 17 is mounted to the interchangeable lens.

FIG. 42 is a lens cross-sectional view of the rear attachment lens according to Embodiment 17 (Numerical Embodiment 17) of the present invention. FIG. 43 is a lens cross-sectional view under a state in which the rear attachment lens according to this Embodiment is mounted to the image side of the interchangeable lens. In FIG. 43, there are illustrated the interchangeable lens ML and the rear attachment lens CV. There is also illustrated the image pickup surface I, which corresponds to the image pickup surface of the solid-state image pickup element.

Figure 44:
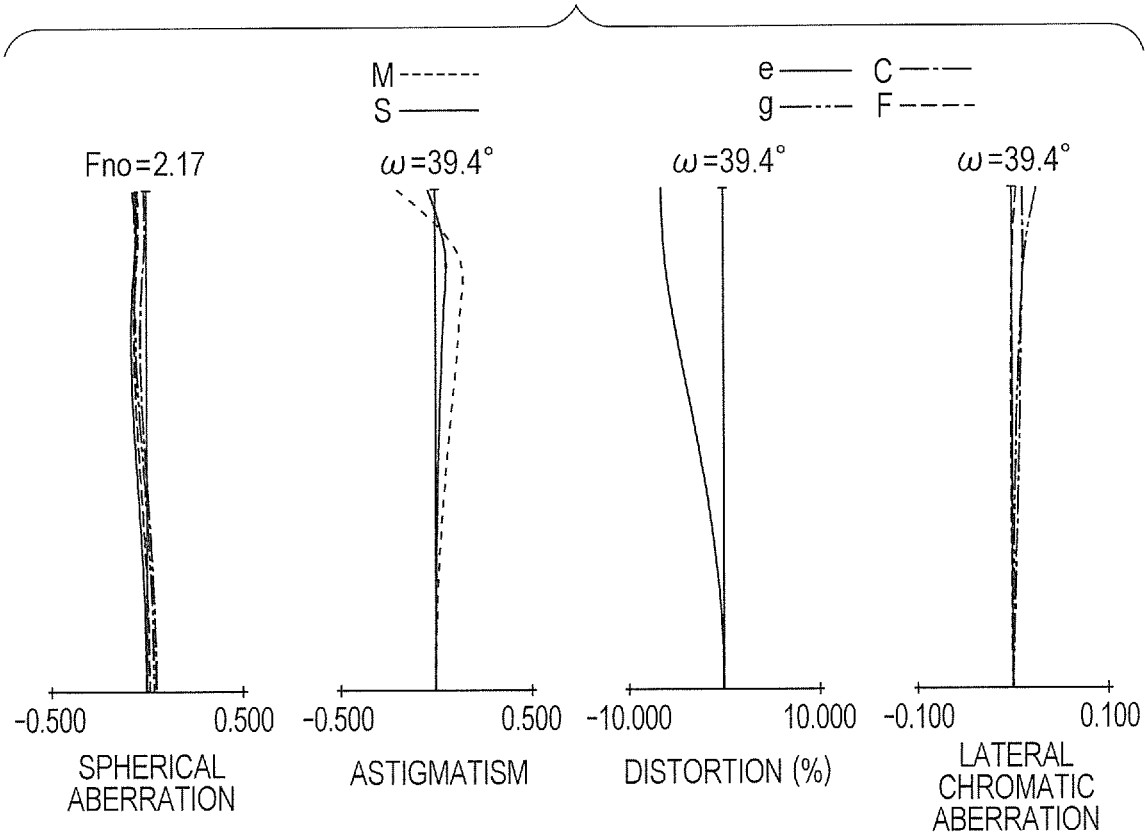
FIG. 44 is longitudinal aberration diagrams when the interchangeable lens is focused on the object at infinity at the wide angle end under the state in which the rear attachment lens according to Numerical Embodiment 17 is mounted to the interchangeable lens.

FIG. 44 is longitudinal aberration diagrams when the interchangeable lens is focused on the object at infinity at the wide angle end under the state in which the rear attachment lens according to this Embodiment is mounted to the interchangeable lens. The rear attachment lens according to this Embodiment is arranged at a position away from the 55th surface, which is the surface of the interchangeable lens that is closest to the image side, by 12 mm on the image side.

Next, the rear attachment lens according to this Embodiment is described. The rear attachment lens includes, in order from the object side, a first lens G1 that is a biconcave lens, a cemented lens obtained by cementing a second lens G2 that is a biconcave lens and a third lens G3 that is a biconvex lens, and a cemented lens obtained by cementing a fourth lens G4 that is a meniscus concave lens having a convex surface on the object side and a fifth lens G5 that is a biconvex lens. The negative lens portion, the intermediate lens portion, and the positive lens portion according to this Embodiment correspond to the first lens G1, the second lens G2 and the third lens G3, and the fourth lens G4 and the fifth lens G5, respectively. Through mounting of the rear attachment lens according to this Embodiment to the interchangeable lens, the image circle of the interchangeable lens is magnified by 1.45 times.

Numerical values corresponding to the respective conditional expressions according to this Embodiment are shown in Table 3. The rear attachment lens according to this Embodiment satisfies Conditional Expression (18) to Conditional Expression (24), and thus has the action of changing the focal length of the interchangeable lens toward the magnification side and achieves all of reduction in size of the optical system, securement of the backfocus, and high optical performance.

Embodiment 18

Figure 45:
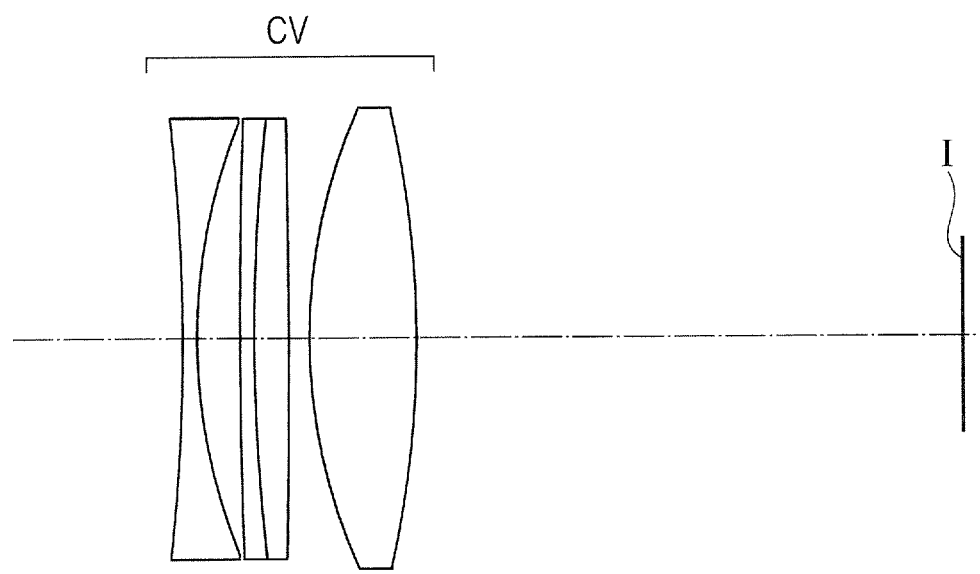
FIG. 45 is a lens cross-sectional view according to Embodiment 18 (Numerical Embodiment 18) of the present invention.
Figure 46:
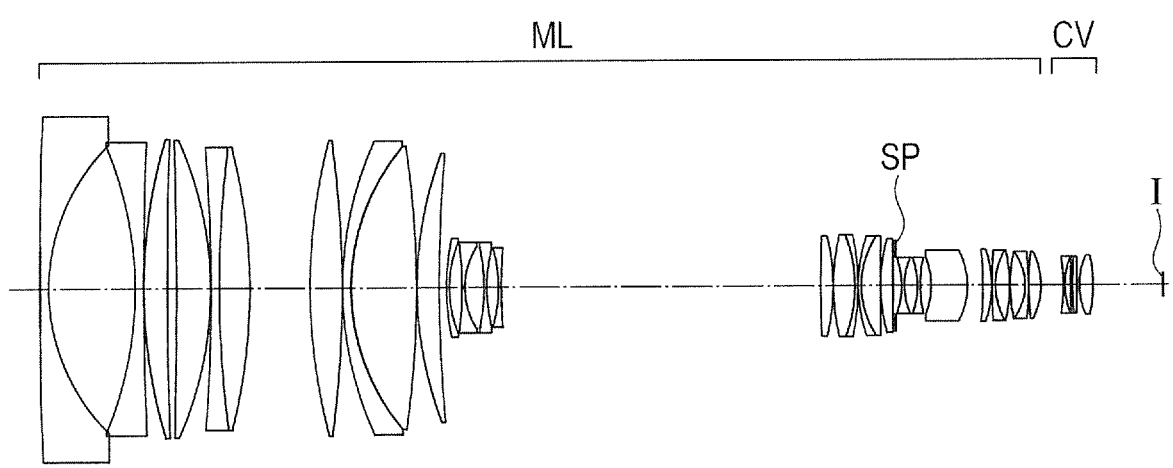
FIG. 46 is a lens cross-sectional view under a state in which a rear attachment lens according to Numerical Embodiment 18 is mounted to the interchangeable lens.
Figure 47:
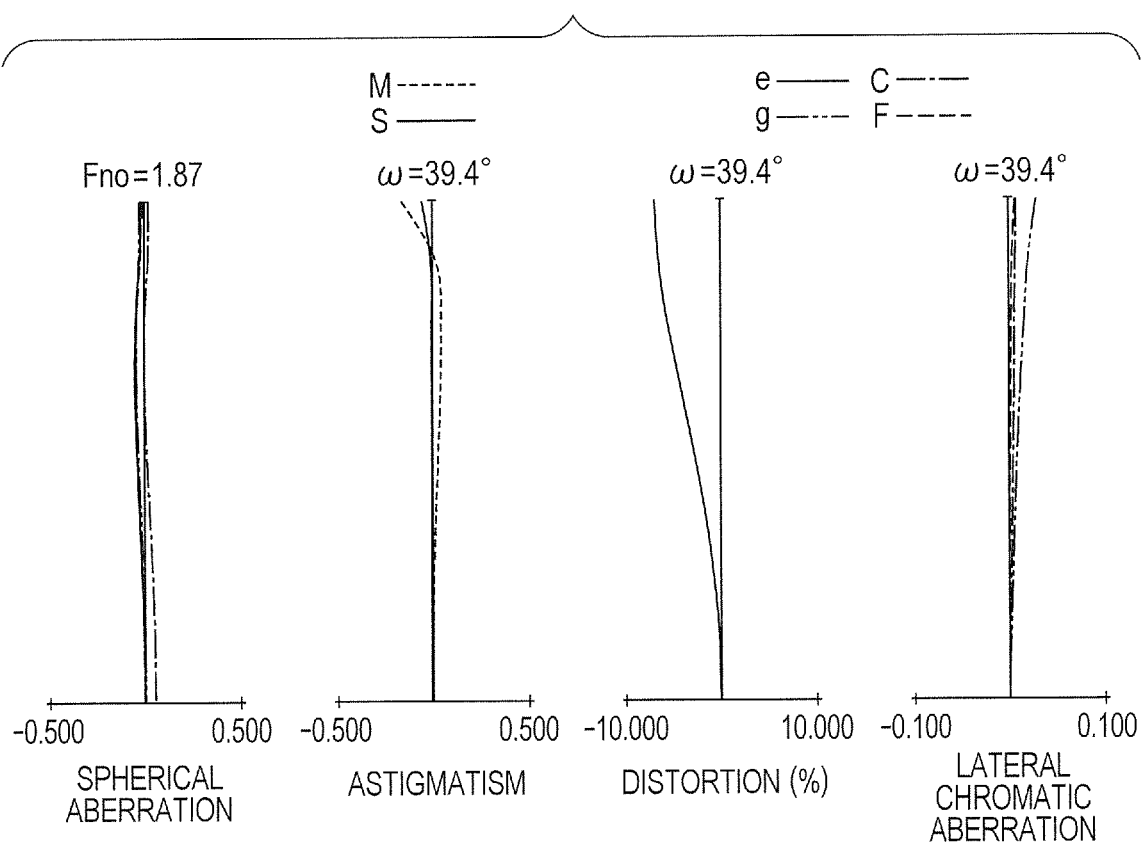
FIG. 47 is longitudinal aberration diagrams when the interchangeable lens is focused on the object at infinity at the wide angle end under the state in which the rear attachment lens according to Numerical Embodiment 18 is mounted to the interchangeable lens.

FIG. 45 is a lens cross-sectional view of the rear attachment lens according to Embodiment 18 (Numerical Embodiment 18) of the present invention. FIG. 46 is a lens cross-sectional view under a state in which the rear attachment lens according to this Embodiment is mounted to the image side of the interchangeable lens. In FIG. 47, there are illustrated the interchangeable lens ML and the rear attachment lens CV. There is also illustrated the image pickup surface I, which corresponds to the image pickup surface of the solid-state image pickup element.

FIG. 47 is longitudinal aberration diagrams when the interchangeable lens is focused on the object at infinity at the wide angle end under the state in which the rear attachment lens according to this Embodiment is mounted to the interchangeable lens. The rear attachment lens according to this Embodiment is arranged at a position away from the 55th surface, which is the surface of the interchangeable lens that is closest to the image side, by 12 mm on the image side.

Next, the rear attachment lens according to this Embodiment is described. The rear attachment lens includes, in order from the object side, a first lens G1 that is a biconcave lens, a cemented lens obtained by cementing a second lens G2 that is a meniscus concave lens having a convex surface on the object side and a third lens G3 that is a biconvex lens, and a fourth lens G4 that is a biconvex lens. The negative lens portion, the intermediate lens portion, and the positive lens portion according to this Embodiment correspond to the first lens G1, the second lens G2 and the third lens G3, and the fourth lens G4, respectively. Through mounting of the rear attachment lens according to this Embodiment to the interchangeable lens, the image circle of the interchangeable lens is magnified by 1.25 times.

Numerical values corresponding to the respective conditional expressions according to this Embodiment are shown in Table 3. The rear attachment lens according to this Embodiment satisfies Conditional Expression (18) to Conditional Expression (24), and thus has the action of changing the focal length of the interchangeable lens toward the magnification side and achieves all of reduction in size of the optical system, securement of the backfocus, and high optical performance.

Embodiment 19

Figure 48:
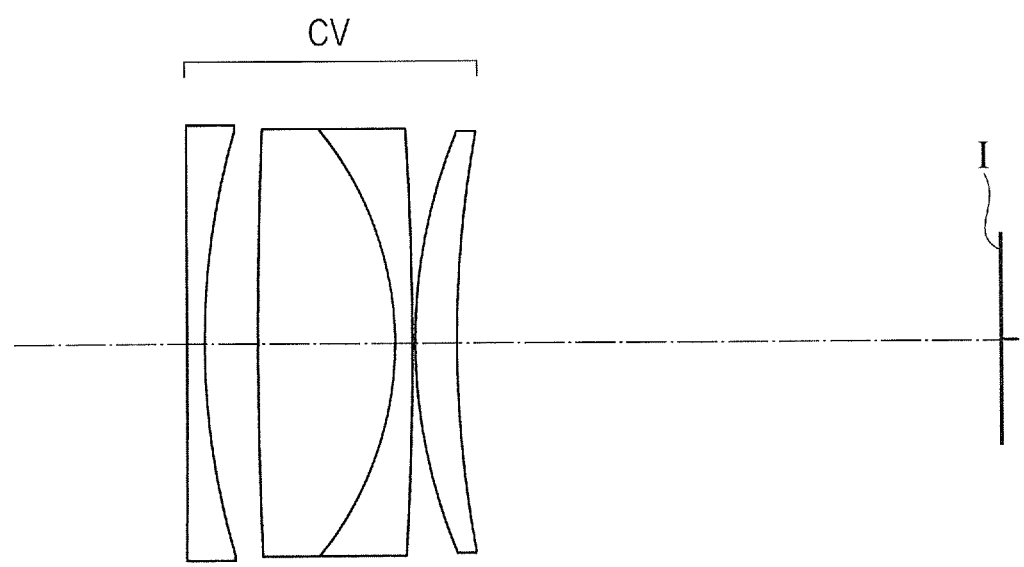
FIG. 48 is a lens cross-sectional view according to Embodiment 19 (Numerical Embodiment 19) of the present invention.
Figure 49:
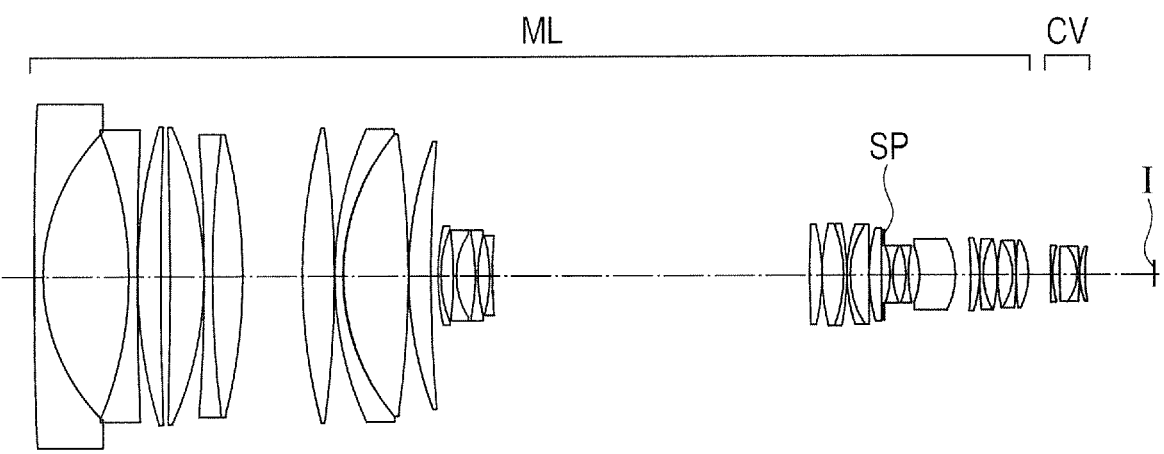
FIG. 49 is a lens cross-sectional view under a state in which a rear attachment lens according to Numerical Embodiment 19 is mounted to the interchangeable lens.

FIG. 48 is a lens cross-sectional view of the rear attachment lens according to Embodiment 19 (Numerical Embodiment 19) of the present invention. FIG. 49 is a lens cross-sectional view under a state in which the rear attachment lens according to this Embodiment is mounted to the image side of the interchangeable lens. In FIG. 49, there are illustrated the interchangeable lens ML and the rear attachment lens CV. There is also illustrated the image pickup surface I, which corresponds to the image pickup surface of the solid-state image pickup element.

Figure 50:
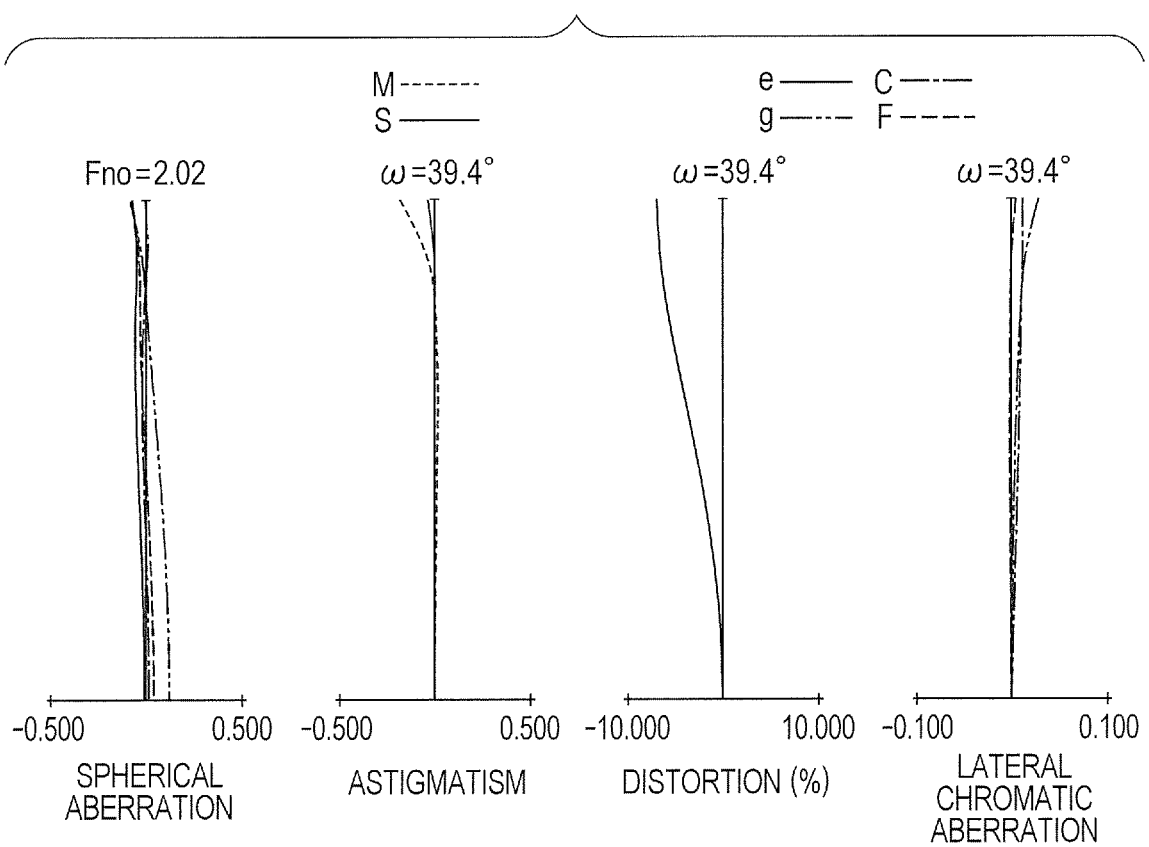
FIG. 50 is longitudinal aberration diagrams when the interchangeable lens is focused on the object at infinity at the wide angle end under the state in which the rear attachment lens according to Numerical Embodiment 19 is mounted to the interchangeable lens.

FIG. 50 is longitudinal aberration diagrams when the interchangeable lens is focused on the object at infinity at the wide angle end under the state in which the rear attachment lens according to this Embodiment is mounted to the interchangeable lens. The rear attachment lens according to this Embodiment is arranged at a position away from the 55th surface, which is the surface of the interchangeable lens that is closest to the image side, by 12 mm on the image side. Next, the rear attachment lens according to this Embodiment is described.

The rear attachment lens includes, in order from the object side, a first lens G1 that is a biconcave lens, a cemented lens obtained by cementing a second lens G2 that is a biconvex lens and a third lens G3 that is a meniscus concave lens having a convex surface on the image side, and a fourth lens G4 that is a meniscus convex lens having a concave surface on the image side. The negative lens portion, the intermediate lens portion, and the positive lens portion according to this Embodiment correspond to the first lens G1, the second lens G2 and the third lens G3, and the fourth lens G4, respectively. Through mounting of the rear attachment lens according to this Embodiment to the interchangeable lens, the image circle of the interchangeable lens is magnified by 1.35 times.

Numerical values corresponding to the respective conditional expressions according to this Embodiment are shown in Table 3. The rear attachment lens according to this Embodiment satisfies Conditional Expression (18) to Conditional Expression (24), and thus has the action of changing the focal length of the interchangeable lens toward the magnification side and achieves all of reduction in size of the optical system, securement of the backfocus, and high optical performance.

Figure 52:
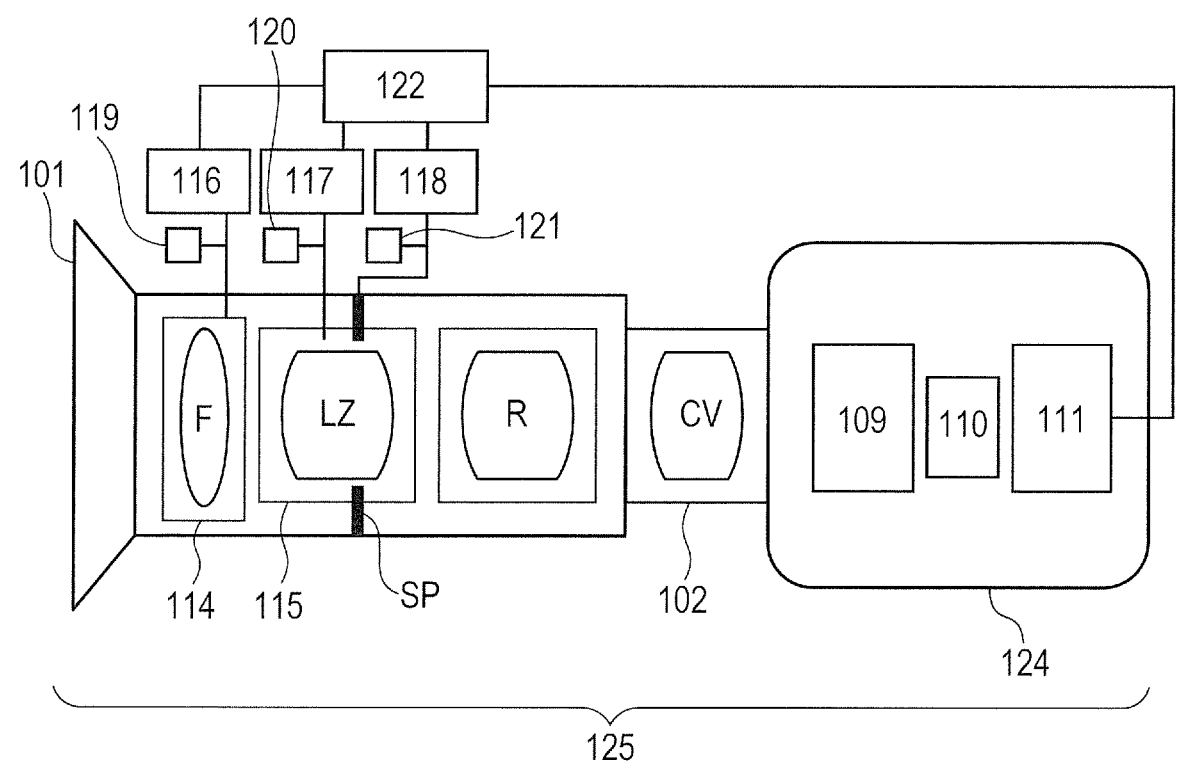
FIG. 52 is a schematic diagram for illustrating a main part of an image pickup apparatus according to the present invention.

FIG. 52 is a schematic diagram of the image pickup apparatus (television camera system) in which the interchangeable lens and the rear attachment lens according to each Embodiment are used as a photographing optical system. In FIG. 52, there are illustrated an interchangeable lens 101, a rear attachment lens 102 according to any one of Embodiments 1 to 19, and a camera 124. The interchangeable lens 101 is removably mounted to the rear attachment lens 102, and the rear attachment lens 102 is removably mounted to the camera 124.

There is also illustrated an image pickup apparatus 125 constructed by mounting the interchangeable lens 101 and the rear attachment lens 102 to the camera 124. The interchangeable lens 101 includes a first lens unit F, a magnification-varying portion LZ, and a fourth lens unit R for imaging. The first lens unit F includes a lens unit for focusing. The magnification-varying portion LZ includes a second lens unit configured to move on the optical axis for zooming and a third lens unit configured to move on the optical axis in order to correct an image plane variation accompanying zooming.

There are also illustrated the aperture stop SP, drive mechanisms 114 and 115, e.g., a helicoid or a cam, which are configured to drive the first lens unit F and the magnification-varying portion LZ in the optical axis direction, respectively, motors (drive units) 116, 117, and 118 configured to electrically drive the drive mechanism 114, the drive mechanism 115, and the aperture stop SP, respectively, and detectors 119, 120, and 121, e.g., an encoder, a potentiometer, or a photosensor, which are configured to detect a position on the optical axis of the first lens unit F, a position on the optical axis of the magnification-varying portion LZ, and a diameter of the aperture stop SP, respectively.

The rear attachment lens 102 includes the optical system CV. The camera 124 includes a glass block 109 corresponding to an optical filter within the camera 124, and a solid-state image pickup element (photoelectric conversion element) 110, e.g., a CCD sensor or a CMOS sensor, which is configured to receive light of an object image formed by the interchangeable lens 101 and the rear attachment lens 102. There is also illustrated CPUs 111 and 122 configured to control various types of drive of the camera 124 and the interchangeable lens 101, respectively.

Numerical Embodiments, respectively corresponding to Embodiments of the present invention, are shown below. In each of the numerical embodiments, i represents the order of a surface from the object side, ri represents a curvature radius of an i-th surface from the object side, di represents an interval between the i-th surface and the (i+1)th surface from the object side, and ndi and υdi respectively represent a refractive index and an Abbe number of an optical member having the i-th surface. BF represents an air-equivalent back focus. The final three surfaces comprise a glass block such as a filter.

The aspherical shape is expressed in the following expression where an X axis corresponds to the optical axis direction, an H axis corresponds to a direction perpendicular to the optical axis, a travelling direction of light corresponds to a positive direction, R represents a paraxial radius of curvature, k represents a conic constant, and each of A4, A6, A8, and A10 represents an aspherical coefficient. Further, e-Z means ×10$^{-Z}$.

$$X = \frac{H^2/R}{1 + \sqrt{1 - (1+k)(H/R)^2}} + A4H^4 + A6H^6 + A8H^8 + A10H^{10}$$

The exemplary embodiments of the present invention are described above, but the present invention is not limited to those embodiments and can be modified and changed variously within the scope of the gist thereof.

<Interchangeable Lens>

Unit mm

Surface data

| Surface number i | ri | di | ndi | υdi | Effective diameter |
|---|---|---|---|---|---|
| 1* | 17,634.271 | 4.70 | 1.69680 | 55.5 | 183.19 |
| 2 | 109.899 | 46.92 | | | 152.38 |
| 3 | −201.325 | 4.50 | 1.69680 | 55.5 | 151.93 |
| 4 | 1,829.577 | 0.15 | | | 155.00 |
| 5 | 283.523 | 12.64 | 1.80518 | 25.4 | 158.03 |
| 6 | 2,167.464 | 5.15 | | | 157.76 |
| 7 | −2,805.896 | 18.49 | 1.48749 | 70.2 | 157.47 |
| 8 | −196.467 | 0.20 | | | 157.29 |
| 9 | −1,000.469 | 4.40 | 1.80518 | 25.4 | 149.49 |
| 10 | 603.998 | 16.55 | 1.48749 | 70.2 | 146.78 |
| 11 | −307.782 | 32.56 | | | 146.03 |
| 12 | 315.156 | 17.48 | 1.48749 | 70.2 | 155.94 |
| 13 | −596.320 | 0.15 | | | 156.09 |
| 14 | 191.137 | 4.40 | 1.80518 | 25.4 | 155.18 |
| 15 | 118.065 | 0.39 | | | 149.21 |
| 16 | 119.291 | 35.44 | 1.48749 | 70.2 | 149.24 |
| 17 | −534.941 | 0.15 | | | 148.58 |
| 18* | 200.940 | 12.13 | 1.62041 | 60.3 | 141.59 |
| 19 | 826.607 | (Variable) | | | 140.30 |
| 20 | 129.425 | 1.50 | 1.88300 | 40.8 | 52.29 |
| 21 | 64.705 | 6.90 | | | 48.69 |
| 22 | −200.592 | 1.50 | 1.72916 | 54.7 | 47.84 |
| 23 | 41.776 | 10.46 | 1.84666 | 23.8 | 43.43 |
| 24 | −106.134 | 1.50 | 1.72916 | 54.7 | 42.53 |
| 25 | 86.715 | 6.25 | | | 41.00 |
| 26 | −81.264 | 1.50 | 1.88300 | 40.8 | 40.91 |
| 27 | 227.627 | (Variable) | | | 41.93 |
| 28 | 600.754 | 6.75 | 1.62041 | 60.3 | 51.99 |
| 29 | −114.148 | 0.15 | | | 52.85 |
| 30 | 117.668 | 11.71 | 1.48749 | 70.2 | 53.85 |
| 31 | −75.558 | 0.09 | | | 53.66 |
| 32 | −76.874 | 1.60 | 1.80518 | 25.4 | 53.57 |
| 33 | −134.820 | 0.15 | | | 53.89 |
| 34 | 86.226 | 1.60 | 1.80518 | 25.4 | 52.65 |
| 35 | 48.805 | 10.30 | 1.48749 | 70.2 | 50.88 |
| 36 | 2,324.271 | 0.15 | | | 50.18 |
| 37 | 94.553 | 6.65 | 1.62041 | 60.3 | 49.18 |
| 38 | −6,865.358 | (Variable) | | | 47.86 |
| 39 (Stop) | ∞ | 3.42 | | | 29.98 |
| 40 | −46.195 | 1.50 | 1.77250 | 49.6 | 29.29 |
| 41 | 36.572 | 7.11 | 1.78472 | 25.7 | 28.98 |
| 42 | −43.549 | 1.50 | 1.77250 | 49.6 | 28.89 |
| 43 | 69.864 | 5.93 | | | 28.57 |
| 44 | −41.024 | 19.74 | 1.77250 | 49.6 | 28.98 |
| 45 | −41.228 | 8.40 | | | 37.08 |
| 46 | −195.562 | 4.78 | 1.62041 | 60.3 | 37.58 |
| 47 | −59.391 | 0.20 | | | 37.84 |
| 48 | 277.984 | 1.80 | 1.88300 | 40.8 | 36.81 |
| 49 | 37.998 | 7.73 | 1.48749 | 70.2 | 35.68 |
| 50 | −82.491 | 0.20 | | | 35.71 |
| 51 | 81.354 | 8.17 | 1.48749 | 70.2 | 34.96 |
| 52 | −31.106 | 1.80 | 1.83400 | 37.2 | 34.70 |
| 53 | −201.103 | 0.20 | | | 35.02 |
| 54 | 180.091 | 6.65 | 1.48749 | 70.2 | 34.93 |
| 55 | −40.373 | 5.00 | | | 34.74 |
| 56 | ∞ | 33.00 | 1.60859 | 46.4 | 40.00 |
| 57 | ∞ | 13.20 | 1.51633 | 64.2 | 40.00 |
| 58 | ∞ | 12.00 | | | 40.00 |
| Image surface | ∞ | | | | |

Aspherical surface data

First surface

K = 1.68492e+004   A4 = 2.64785e−008   A6 = −1.47610e−012
A8 = 8.96960e−017   A10 = −3.30657e−021

Eighteenth surface

K = −1.44619e−001   A4 = −7.46282e−009   A6 = −2.04300e−013
A8 = 1.70939e−017   A10 = −3.75331e−021

Various data

| | |
|---|---|
| Focal length | 6.70 |
| F-number | 1.50 |
| Half angle of field | 39.38 |
| Image height | 5.50 |
| Total lens length | 606.22 |
| BF | 12.00 |

-continued

| Unit mm | |
|---|---|
| d19 | 3.93 |
| d27 | 173.49 |
| d38 | 1.30 |
| Entrance pupil position | 107.96 |
| Exit pupil position | 328.64 |
| Front principal point position | 114.80 |
| Rear principal point position | 5.30 |

Zoom lens unit data

| Unit | First surface | Focal length | Lens structure length | Front principal point position | Rear principal point position |
|---|---|---|---|---|---|
| 1 | 1 | 120.59 | 216.39 | 131.11 | 72.76 |
| 2 | 20 | −30.00 | 29.61 | 13.82 | −6.54 |
| 3 | 28 | 50.00 | 39.16 | 11.50 | −15.21 |
| 4 | 39 | 40.05 | 130.33 | 45.82 | 10.33 |

Numerical Embodiment 1

Unit mm

Surface data

| Surface number i | ri | di | ndi | vdi | Effective diameter |
|---|---|---|---|---|---|
| 56 | −157.317 | 1.10 | 2.00100 | 29.1 | 29.36 |
| 57 | 38.170 | 3.50 | | | 28.62 |
| 58 | 43.949 | 4.48 | 1.80809 | 22.8 | 30.45 |
| 59 | 377.668 | 1.10 | 1.88300 | 40.8 | 30.32 |
| 60 | 87.306 | 0.20 | | | 30.19 |
| 61 | 62.000 | 5.06 | 1.58144 | 40.8 | 30.34 |
| 62 | −68.247 | 10.00 | | | 30.25 |
| 63 | ∞ | 2.00 | 1.51633 | 64.1 | 40.00 |
| 64 | ∞ | 28.83 | | | 40.00 |
| Image surface | ∞ | | | | |

Various data

| | |
|---|---|
| Focal length | 8.71 |
| F-number | 1.95 |
| Half angle of field | 39.38 |
| Image height | 7.15 |
| BF | 28.83 |

Numerical Embodiment 2

Unit mm

Surface data

| Surface number i | ri | di | ndi | vdi | Effective diameter |
|---|---|---|---|---|---|
| 56 | 148.228 | 1.20 | 2.00100 | 29.1 | 28.69 |
| 57 | 30.603 | 11.76 | | | 27.34 |
| 58 | 77.609 | 1.10 | 1.88300 | 40.8 | 30.03 |
| 59 | 22.099 | 7.65 | 1.80809 | 22.8 | 29.78 |
| 60 | 762.559 | 33.61 | | | 29.83 |
| 61 | 135.306 | 1.20 | 1.95375 | 32.3 | 32.40 |
| 62 | 31.326 | 15.07 | 1.53172 | 48.8 | 32.03 |
| 63 | −28.937 | 0.20 | | | 33.31 |
| 64 | −70.515 | 1.20 | 2.00100 | 29.1 | 31.80 |
| 65 | 69.867 | 4.31 | 1.85478 | 24.8 | 31.98 |
| 66 | −169.728 | 10.00 | | | 32.10 |

-continued

| Unit mm | | | | | |
|---|---|---|---|---|---|
| 67 | ∞ | 2.00 | 1.51633 | 64.1 | 40.00 |
| 68 | ∞ | 28.70 | | | 40.00 |
| Image surface | ∞ | | | | |

Various data

| | |
|---|---|
| Focal length | 18.94 |
| F-number | 4.24 |
| Half angle of field | 39.38 |
| Image height | 15.55 |
| BF | 28.70 |

Numerical Embodiment 3

Unit mm

Surface data

| Surface number i | ri | di | ndi | vdi | Effective diameter |
|---|---|---|---|---|---|
| 56 | 472.643 | 1.10 | 1.88300 | 40.8 | 28.93 |
| 57 | 62.360 | 5.00 | | | 28.17 |
| 58 | 33.563 | 1.10 | 1.88300 | 40.8 | 27.08 |
| 59 | 26.045 | 2.14 | 1.80518 | 25.4 | 26.20 |
| 60 | 31.109 | 9.34 | | | 25.57 |
| 61 | 56.850 | 2.40 | 1.60342 | 38.0 | 24.46 |
| 62 | 173.352 | 10.00 | | | 24.08 |
| 63 | ∞ | 2.00 | 1.51633 | 64.1 | 40.00 |
| 64 | ∞ | 17.98 | | | 40.00 |
| Image surface | ∞ | | | | |

Various data

| | |
|---|---|
| Focal length | 9.05 |
| F-number | 2.02 |
| Half angle of field | 36.73 |
| Image height | 6.75 |
| BF | 17.98 |

Numerical Embodiment 4

Unit mm

Surface data

| Surface number i | ri | di | ndi | vdi | Effective diameter |
|---|---|---|---|---|---|
| 56 | 146.968 | 1.00 | 2.04976 | 27.1 | 28.50 |
| 57 | 34.550 | 4.57 | | | 27.38 |
| 58 | −62.037 | 1.00 | 1.95375 | 32.3 | 27.42 |
| 59 | 38.828 | 5.48 | 1.92286 | 18.9 | 29.07 |
| 60 | −104.388 | 2.63 | | | 29.59 |
| 61 | 71.901 | 5.85 | 1.51742 | 52.4 | 31.56 |
| 62 | −49.878 | 1.00 | 1.84666 | 23.8 | 31.68 |
| 63 | −113.287 | 0.20 | | | 32.12 |
| 64 | 41.365 | 4.79 | 1.51823 | 58.9 | 32.55 |
| 65 | 2,879.165 | 10.00 | | | 32.21 |
| 66 | ∞ | 2.00 | 1.51633 | 64.1 | 40.00 |
| 67 | ∞ | 34.48 | | | 40.00 |
| Image surface | ∞ | | | | |

Various data

| | |
|---|---|
| Focal length | 10.05 |
| F-number | 2.25 |
| Half angle of field | 39.38 |

-continued

Unit mm

| | |
|---|---|
| Image height | 8.25 |
| Total lens length | 628.02 |
| BF | 34.48 |

Numerical Embodiment 5

Unit mm

Surface data

| Surface number i | ri | di | ndi | vdi | Effective diameter |
|---|---|---|---|---|---|
| 56 | 162.179 | 1.20 | 2.00100 | 29.1 | 28.70 |
| 57 | 33.030 | 10.69 | | | 27.44 |
| 58 | 40.334 | 1.10 | 1.95375 | 32.3 | 29.54 |
| 59 | 18.712 | 7.51 | 1.80809 | 22.8 | 28.21 |
| 60 | 247.670 | 14.85 | | | 28.00 |
| 61 | −38.115 | 1.20 | 1.95375 | 32.3 | 26.08 |
| 62 | 204.648 | 7.12 | 1.51742 | 52.4 | 27.17 |
| 63 | −23.400 | 10.00 | | | 27.97 |
| 64 | ∞ | 2.00 | 1.51633 | 64.1 | 40.00 |
| 65 | ∞ | 25.56 | | | 40.00 |
| Image surface | ∞ | | | | |

Various data

| | |
|---|---|
| Focal length | 13.40 |
| F-number | 3.00 |
| Half angle of field | 39.38 |
| Image height | 11.00 |
| Total lens length | 636.24 |
| BF | 25.56 |

Numerical Embodiment 6

Unit mm

Surface data

| Surface number i | ri | di | ndi | vdi | Effective diameter |
|---|---|---|---|---|---|
| 56 | 400.455 | 1.00 | 2.04976 | 27.1 | 27.65 |
| 57 | 37.612 | 4.12 | | | 26.81 |
| 58 | −63.364 | 1.00 | 1.95375 | 32.3 | 26.86 |
| 59 | 48.077 | 4.76 | 1.92286 | 18.9 | 28.47 |
| 60 | −104.208 | 0.20 | | | 29.05 |
| 61 | 74.800 | 5.89 | 1.49700 | 81.5 | 30.28 |
| 62 | −106.671 | 0.20 | | | 30.75 |
| 63 | 38.750 | 8.04 | 1.48749 | 70.2 | 31.09 |
| 64 | 625.170 | 10.00 | | | 29.93 |
| 65 | ∞ | 2.00 | 1.51633 | 64.1 | 40.00 |
| 66 | ∞ | 29.99 | | | 40.00 |
| Image surface | ∞ | | | | |

Various data

| | |
|---|---|
| Focal length | 9.38 |
| F-number | 2.10 |
| Half angle of field | 39.38 |
| Image height | 7.70 |
| Total lens length | 622.22 |
| BF | 29.99 |

Numerical Embodiment 7

Unit mm

Surface data

| Surface number i | ri | di | ndi | vdi | Effective diameter |
|---|---|---|---|---|---|
| 56 | 199.269 | 1.00 | 2.04976 | 27.1 | 27.87 |
| 57 | 36.284 | 2.97 | | | 26.91 |
| 58 | 534.236 | 1.00 | 1.95375 | 32.3 | 27.02 |
| 59 | 24.998 | 6.28 | 1.89286 | 20.4 | 27.41 |
| 60 | −151.995 | 3.50 | | | 27.61 |
| 61 | −29.943 | 1.00 | 1.72825 | 28.5 | 27.66 |
| 62 | −154.031 | 5.25 | 1.48749 | 70.2 | 29.37 |
| 63 | −27.477 | 1.38 | | | 30.12 |
| 64 | 32.253 | 6.62 | 1.51823 | 58.9 | 31.69 |
| 65 | 231.036 | 10.00 | | | 30.87 |
| 66 | ∞ | 2.00 | 1.51633 | 64.1 | 40.00 |
| 67 | ∞ | 29.99 | | | 40.00 |
| Image surface | ∞ | | | | |

Various data

| | |
|---|---|
| Focal length | 9.65 |
| F-number | 2.16 |
| Half angle of field | 39.38 |
| Image height | 7.92 |
| Total lens length | 626.03 |
| BF | 29.99 |

Numerical Embodiment 10

Unit mm

Surface data

| Surface number i | ri | di | ndi | vdi | Effective diameter |
|---|---|---|---|---|---|
| 56 | ∞ | 2.00 | 1.51633 | 64.1 | 40.00 |
| 57 | ∞ | 9.00 | | | 40.00 |
| 58 | 309.413 | 1.10 | 1.95375 | 32.3 | 23.34 |
| 59 | 38.956 | 12.68 | | | 22.57 |
| 60 | −142.088 | 0.80 | 1.88300 | 40.8 | 22.33 |
| 61 | 19.287 | 5.08 | 1.84666 | 23.8 | 22.64 |
| 62 | 465.162 | 2.00 | | | 22.78 |
| 63 | 30.476 | 5.07 | 1.51633 | 64.1 | 23.67 |
| 64 | −59.957 | 0.80 | 1.88300 | 40.8 | 23.44 |
| 65 | 146.710 | 9.70 | | | 23.34 |
| 66 | 47.934 | 3.26 | 1.58913 | 61.1 | 24.01 |
| 67 | −317.061 | 13.55 | | | 23.78 |
| Image surface | ∞ | | | | |

Various data

| | |
|---|---|
| Focal length | 12.06 |
| F-number | 2.70 |
| Half angle of field | 39.38 |
| Image height | 9.90 |
| BF | 13.55 |
| Entrance pupil position | 107.96 |
| Exit pupil position | −1,570.06 |
| Front principal point position | 119.92 |
| Rear principal point position | 1.49 |

Numerical Embodiment 11

Unit mm

Surface data

| Surface number i | ri | di | ndi | vdi | Effective diameter |
|---|---|---|---|---|---|
| 56 | 233.327 | 1.10 | 1.83400 | 37.2 | 28.73 |
| 57 | 90.976 | 9.91 | | | 28.13 |
| 58 | ∞ | 2.00 | 1.51633 | 64.1 | 40.00 |
| 59 | ∞ | 13.10 | | | 40.00 |
| 60 | 344.328 | 3.40 | 1.80809 | 22.8 | 19.54 |
| 61 | −46.989 | 0.80 | 1.88300 | 40.8 | 19.02 |
| 62 | 24.027 | 6.02 | | | 18.30 |
| 63 | 20.307 | 4.30 | 1.60342 | 38.0 | 20.89 |
| 64 | 622.815 | 11.39 | | | 20.54 |
| Image surface | ∞ | | | | |

Various data

| | |
|---|---|
| Focal length | 10.05 |
| F-number | 2.25 |
| Half angle of field | 39.38 |
| Image height | 8.25 |
| BF | 11.39 |
| Entrance pupil position | 107.96 |
| Exit pupil position | −406.45 |
| Front principal point position | 117.76 |
| Rear principal point position | 1.34 |

Numerical Embodiment 12

Unit mm

Surface data

| Surface number i | ri | di | ndi | vdi | Effective diameter |
|---|---|---|---|---|---|
| 56 | ∞ | 2.00 | 1.51633 | 64.1 | 40.00 |
| 57 | ∞ | 8.68 | | | 40.00 |
| 58 | −67.258 | 1.10 | 1.95375 | 32.3 | 14.94 |
| 59 | 46.031 | 3.87 | | | 14.96 |
| 60 | −25.872 | 2.34 | 1.80809 | 22.8 | 15.65 |
| 61 | −23.076 | 9.18 | | | 16.60 |
| 62 | 33.125 | 5.27 | 1.63980 | 34.5 | 19.49 |
| 63 | −135.639 | 16.34 | | | 19.14 |
| Image surface | ∞ | | | | |

Various data

| | |
|---|---|
| Focal length | 9.04 |
| F-number | 2.02 |
| Half angle of field | 39.38 |
| Image height | 7.42 |
| BF | 16.34 |
| Entrance pupil position | 107.96 |
| Exit pupil position | 142.48 |
| Front principal point position | 117.65 |
| Rear principal point position | 7.29 |

Numerical Embodiment 13

Unit mm

Surface data

| Surface number i | ri | di | ndi | vdi | Effective diameter |
|---|---|---|---|---|---|
| 56 | ∞ | 2.00 | 1.51633 | 64.1 | 40.00 |
| 57 | ∞ | 8.68 | | | 40.00 |
| 58 | −172.556 | 1.10 | 1.95375 | 32.3 | 14.85 |
| 59 | 29.383 | 6.96 | | | 14.72 |
| 60 | 2,523.374 | 0.80 | 1.88300 | 40.8 | 17.11 |
| 61 | 23.171 | 5.92 | 1.84666 | 23.8 | 17.63 |
| 62 | −259.103 | 14.96 | | | 18.52 |
| 63 | 75.461 | 8.10 | 1.51633 | 64.1 | 24.24 |
| 64 | −25.006 | 0.80 | 1.88300 | 40.8 | 24.70 |
| 65 | −40.483 | 6.25 | | | 25.32 |
| 66 | −128.662 | 4.30 | 1.58913 | 61.1 | 25.36 |
| 67 | −39.243 | 9.99 | | | 25.57 |
| Image surface | ∞ | | | | |

Various data

| | |
|---|---|
| Focal length | 13.40 |
| F-number | 3.00 |
| Half angle of field | 39.38 |
| Image height | 11.00 |
| BF | 9.99 |
| Entrance pupil position | 107.96 |
| Exit pupil position | 122.26 |
| Front principal point position | 122.96 |
| Rear principal point position | −3.41 |

Numerical Embodiment 14

Unit mm

Surface data

| Surface number i | ri | di | ndi | vdi | Effective diameter |
|---|---|---|---|---|---|
| 56 | 103.966 | 1.10 | 1.83481 | 42.7 | 22.47 |
| 57 | 38.745 | 9.82 | | | 21.51 |
| 58 | ∞ | 2.00 | 1.51633 | 64.1 | 40.00 |
| 59 | ∞ | 13.75 | | | 40.00 |
| 60 | −38.030 | 0.80 | 1.83481 | 42.7 | 18.19 |
| 61 | 28.793 | 5.58 | 1.84666 | 23.8 | 19.05 |
| 62 | −79.869 | 4.23 | | | 19.84 |
| 63 | 47.828 | 7.49 | 1.51633 | 64.1 | 21.19 |
| 64 | −21.172 | 0.80 | 1.80610 | 40.9 | 21.15 |
| 65 | 43.007 | 1.00 | | | 22.03 |
| 66 | 42.532 | 7.50 | 1.51823 | 58.9 | 23.01 |
| 67 | −25.936 | 13.40 | | | 23.91 |

Various data

| | |
|---|---|
| Focal length | 13.40 |
| F-number | 3.00 |
| Half angle of field | 39.38 |
| Image height | 11.00 |
| BF | 24.93 |
| Entrance pupil position | 107.96 |
| Exit pupil position | −1,086.11 |
| Front principal point position | 121.19 |
| Rear principal point position | 11.53 |

Numerical Embodiment 15

Unit mm

Surface data

| Surface number i | ri | di | ndi | vdi | Effective diameter |
|---|---|---|---|---|---|
| 56 | ∞ | 2.00 | 1.51633 | 64.1 | 40.00 |
| 57 | ∞ | (Variable) | | | 40.00 |
| 58 | −490.221 | 1.00 | 2.00100 | 29.1 | 14.93 |
| 59 | 32.280 | 6.03 | | | 14.77 |

-continued

Unit mm

| | | | | | |
|---|---|---|---|---|---|
| 60 | −89.318 | 1.10 | 1.88300 | 40.8 | 16.27 |
| 61 | 19.399 | 9.79 | 1.80809 | 22.8 | 17.15 |
| 62 | −128.644 | (Variable) | | | 19.42 |
| 63 | 53.707 | 11.49 | 1.48749 | 70.2 | 31.00 |
| 64 | −28.196 | 0.15 | | | 31.35 |
| 65 | −28.051 | 1.20 | 1.84666 | 23.8 | 31.26 |
| 66 | −48.295 | 0.15 | | | 32.27 |
| 67 | −437.939 | 1.20 | 1.95375 | 32.3 | 32.24 |
| 68 | 45.346 | 10.41 | 1.75520 | 27.5 | 32.38 |
| 69 | −50.328 | (Variable) | | | 32.96 |
| Image surface | ∞ | | | | |

Various data
Zoom ratio 1.20

| | | |
|---|---|---|
| Focal length | 16.75 | 20.10 |
| F-number | 3.75 | 4.49 |
| Half angle of field | 39.38 | 34.38 |
| Image height | 13.75 | 13.75 |
| BF | 14.24 | 4.00 |
| d57 | 10.63 | 11.42 |
| d62 | 24.00 | 33.46 |
| d69 | 14.24 | 4.00 |
| Entrance pupil position | 107.96 | 107.96 |
| Exit pupil position | 135.96 | 110.39 |
| Front principal point position | 127.01 | 131.85 |
| Rear principal point position | −2.51 | −16.10 |

Numerical Embodiment 16

Unit mm

Surface data

| Surface number i | ri | di | ndi | vdi | θgFi | Effective diameter |
|---|---|---|---|---|---|---|
| 56 | −167.926 | 1.00 | 2.00100 | 29.1 | 0.5997 | 29.33 |
| 57 | 35.739 | 3.28 | | | | 28.55 |
| 58 | 44.339 | 4.31 | 1.85478 | 24.8 | 0.6122 | 30.34 |
| 59 | 3,403.677 | 1.00 | 1.76385 | 48.5 | 0.5587 | 30.26 |
| 60 | 56.959 | 0.27 | | | | 30.12 |
| 61 | 42.310 | 6.33 | 1.56732 | 42.8 | 0.5730 | 30.50 |
| 62 | −67.068 | 40.00 | | | | 30.38 |
| Image surface | ∞ | | | | | |

Various data

| | |
|---|---|
| Focal length | 8.71 |
| F-number | 1.95 |
| Half angle of field | 39.38 |
| Image height | 7.15 |
| BF | 40.00 |

Numerical Embodiment 17

Unit mm

Surface data

| Surface number i | ri | di | ndi | vdi | θgFi | Effective diameter |
|---|---|---|---|---|---|---|
| 56 | −239.002 | 1.00 | 2.04976 | 27.1 | 0.6050 | 29.31 |
| 57 | 53.833 | 2.93 | | | | 28.67 |
| 58 | −133.585 | 1.00 | 1.88300 | 40.8 | 0.5667 | 28.71 |
| 59 | 66.207 | 5.54 | 1.85478 | 24.8 | 0.6122 | 29.42 |
| 60 | −140.988 | 0.11 | | | | 30.08 |
| 61 | 70.000 | 1.00 | 1.69680 | 55.5 | 0.5433 | 30.64 |
| 62 | 61.235 | 5.07 | 1.62588 | 35.7 | 0.5893 | 30.56 |
| 63 | −83.708 | 45.93 | | | | 30.49 |
| Image surface | ∞ | | | | | |

Various data

| | |
|---|---|
| Focal length | 9.72 |
| F-number | 2.17 |
| Half angle of field | 39.38 |
| Image height | 7.97 |
| BF | 45.93 |

Numerical Embodiment 18

Unit mm

Surface data

| Surface number i | ri | di | ndi | vdi | θgFi | Effective diameter |
|---|---|---|---|---|---|---|
| 56 | −140.000 | 1.00 | 1.88300 | 40.8 | 0.5667 | 29.41 |
| 57 | 39.842 | 2.99 | | | | 28.64 |
| 58 | 440.499 | 1.00 | 1.95375 | 32.3 | 0.5898 | 28.85 |
| 59 | 134.952 | 2.42 | 1.85478 | 24.8 | 0.6122 | 29.09 |
| 60 | −812.792 | 1.45 | | | | 29.35 |
| 61 | 38.985 | 7.48 | 1.53172 | 48.8 | 0.5630 | 30.76 |
| 62 | −71.689 | 38.18 | | | | 30.46 |
| Image surface | ∞ | | | | | |

Various data

| | |
|---|---|
| Focal length | 8.38 |
| F-number | 1.87 |
| Half angle of field | 39.38 |
| Image height | 6.88 |
| BF | 38.18 |

Numerical Embodiment 19

Unit mm

Surface data

| Surface number i | ri | di | ndi | vdi | θgFi | Effective diameter |
|---|---|---|---|---|---|---|
| 56 | −2,322.801 | 1.20 | 2.04976 | 27.1 | 0.6050 | 29.01 |
| 57 | 52.701 | 3.73 | | | | 28.23 |
| 58 | 342.004 | 9.56 | 1.62588 | 35.7 | 0.5893 | 28.39 |
| 59 | −23.528 | 1.20 | 1.59522 | 67.7 | 0.5442 | 28.45 |
| 60 | −251.836 | 0.20 | | | | 28.36 |
| 61 | 38.419 | 2.91 | 1.60342 | 38.0 | 0.5835 | 28.06 |
| 62 | 79.967 | 38.00 | | | | 27.55 |
| Image surface | ∞ | | | | | |

Various data

| | |
|---|---|
| Focal length | 9.05 |
| F-number | 2.02 |
| Half angle of field | 39.38 |
| Image height | 7.42 |
| BF | 38.00 |

TABLE 1

| Conditional Expression | | Numerical Embodiment | | | | | | |
|---|---|---|---|---|---|---|---|---|
| | | 1 | 2 | 3 | 4 | 5 | 6 | 7 |
| (1) | IC × β/I | 1.00 | 1.00 | 1.10 | 1.00 | 1.00 | 1.00 | 1.00 |
| (2) | L/FB | 1.46 | 2.75 | 1.35 | 1.81 | 1.98 | 1.69 | 1.77 |
| (3) | β | 1.30 | 2.83 | 1.35 | 1.50 | 2.00 | 1.40 | 1.44 |
| (4) | \|ff/fcv\| | 0.07 | 0.78 | 0.42 | 0.07 | 1.22 | 0.06 | 0.02 |
| (5) | SK/FB | 0.84 | 0.83 | 0.61 | 0.95 | 0.77 | 0.86 | 0.86 |
| (6) | Lc/FB/β | 0.25 | 0.57 | 0.33 | 0.37 | 0.45 | 0.38 | 0.42 |
| (7) | \|f1/fc\| | 0.07 | 0.51 | 0.49 | 0.07 | 0.41 | 0.06 | 0.02 |
| (8) | nlav | 1.94 | 1.94 | 1.88 | 2.00 | 1.98 | 2.00 | 2.00 |
| (9) | v1n − v1p | 12.19 | 12.19 | 15.34 | 10.80 | 7.97 | 10.80 | 9.34 |
| | IC | 11 | 11 | 11 | 11 | 11 | 11 | 11 |
| | I | 14.3 | 31.1 | 13.5 | 16.5 | 22 | 15.4 | 15.84 |
| | L | 70.09 | 131.83 | 64.88 | 86.83 | 95.06 | 81.04 | 84.84 |
| | FB | 48 | 48 | 48 | 48 | 48 | 48 | 48 |
| | ff | −30.35 | −59.36 | −69.41 | −42.85 | −122.61 | −39.26 | −57.24 |
| | fc | −405.84 | −75.72 | −166.36 | −595.74 | −100.28 | −643.54 | −2,632.04 |
| | SK | 40.14 | 40.02 | 29.29 | 45.80 | 36.88 | 41.31 | 41.31 |
| | Lc | 15.44 | 77.30 | 21.07 | 26.52 | 43.66 | 25.22 | 29.01 |
| | f1 | −30.35 | −38.41 | −80.99 | −42.85 | −41.30 | −39.26 | −42.03 |
| | v1n | 34.95 | 34.95 | 40.76 | 29.70 | 30.73 | 29.70 | 29.70 |
| | v1p | 22.76 | 22.76 | 25.42 | 18.90 | 22.76 | 18.90 | 20.36 |

TABLE 2

| | | Numerical Embodiment | | | | | |
|---|---|---|---|---|---|---|---|
| | | 10 | 11 | 12 | 13 | 14 | 15 |
| Conditional Expression (10) | SK/Ls | 0.21 | 0.22 | 0.33 | 0.14 | 0.32 | 0.18 |
| Conditional Expression (11) | Ls/I | 3.28 | 3.15 | 3.28 | 3.18 | 3.59 | 2.88 |
| Conditional Expression (12) | SK/BF | 0.29 | 0.25 | 0.35 | 0.22 | 0.54 | 0.31 |
| Conditional Expression (13) | La/Lc | 0.31 | 0.60 | 0.42 | 0.30 | 0.46 | 0.50 |
| Conditional Expression (14) | \|ff/f\| | 0.13 | 1.02 | 0.30 | 0.46 | 0.25 | 0.48 |
| Conditional Expression (15) | nnav | 1.91 | 1.86 | 1.95 | 1.91 | 1.83 | 1.92 |
| Conditional Expression (16) | \|r2/r1\| | 0.13 | 0.39 | 0.68 | 0.17 | 0.37 | 0.07 |
| Conditional Expression (17) | Lo/Ls | 0.34 | 0.07 | 0.36 | 0.25 | −0.15 | 0.23 |
| | SK | 13.55 | 11.39 | 16.34 | 9.99 | 24.93 | 14.24 |
| | BF | 46.17 | 46.17 | 46.17 | 46.17 | 46.17 | 46.17 |
| | Ls | 65.04 | 52.02 | 48.78 | 69.86 | 79.00 | 79.15 |
| | I | 19.80 | 16.50 | 14.85 | 22.00 | 22.00 | 27.50 |
| | La | 12.68 | 24.32 | 9.18 | 14.96 | 24.88 | 33.46 |
| | Lc | 40.49 | 40.62 | 21.76 | 49.19 | 54.08 | 66.51 |
| | ff | −46.48 | −178.29 | −36.11 | −28.49 | −74.14 | −24.79 |
| | f | −345.88 | −175.58 | 119.58 | 61.60 | −295.93 | 51.88 |
| | r1 | 309.41 | 233.33 | −67.26 | −172.56 | 103.97 | −490.22 |
| | r2 | 38.96 | 90.98 | 46.03 | 29.38 | 38.75 | 32.28 |
| | Lo | 22.07 | 3.86 | 17.60 | 17.48 | −12.19 | 17.94 |

TABLE 3

| | | Numerical Embodiment | | | |
|---|---|---|---|---|---|
| Conditional Expression | | 16 | 17 | 18 | 19 |
| (18) | \|fn/f\| | 0.066 | 0.192 | 0.024 | 0.202 |
| (19) | BFair/Lc | 2.471 | 2.759 | 2.337 | 2.022 |
| (20) | Nn | 2.001 | 2.050 | 1.883 | 2.050 |
| (21) | Nave | 1.882 | 1.877 | 1.918 | 1.822 |
| (22) | (θp − θn)/(vp − vn) | −2.26E−03 | −2.85E−03 | −2.98E−03 | −1.41E−03 |
| (23) | (R1 + R2)/(Ra − R2) | 0.649 | 0.632 | 0.557 | 0.956 |
| (24) | β | 1.300 | 1.450 | 1.250 | 1.350 |
| | fn | −29.130 | −41.419 | −34.830 | −48.652 |
| | f | −444.260 | 215.736 | −1,429.422 | −241.084 |
| | BFair | 39.996 | 45.925 | 38.182 | 37.996 |

TABLE 3-continued

|  | Numerical Embodiment | | | |
|---|---|---|---|---|
| Conditional Expression | 16 | 17 | 18 | 19 |
| Lc | 16.186 | 16.646 | 16.337 | 18.792 |
| R1 | −167.926 | −239.002 | −140.000 | −2,322.801 |
| R2 | 35.739 | 53.833 | 39.842 | 52.701 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-148595, filed Jul. 28, 2015, Japanese Patent Application No. 2015-148596, filed Jul. 28, 2015 and Japanese Patent Application No. 2016-037528, filed Feb. 29, 2016 which are hereby incorporated by reference herein in their entirety.

What is claimed is:

1. An image pickup apparatus comprising:
a mount to which an interchangeable lens is mountable;
an optical system;
an image pickup element; and
an optical filter arranged between the optical system and the image pickup element,
wherein the optical system has a refractive power, and is configured to image an object point, which is located on an image side of a surface, closest to an object side, of the optical system, onto the image pickup element, and
wherein expressions $1.0 < L/FB < 3.0$; and $1.0 < \beta < 3.0$; and $0.2 < Lc/FB/\beta < 0.6$ are satisfied where FB represents an air-equivalent distance on an optical axis from a flange surface of the mount to the object point, L represents a distance on the optical axis from the flange surface to the image pickup element, and β represents a lateral magnification of the optical system under a state in which the interchangeable lens is mounted to the mount and the object point is imaged onto the image pickup element, and Lc represents a distance from the surface, closest to the object side, of the optical system to a surface, closest to the image side, of the optical system.

2. The image pickup apparatus according to claim 1, wherein the optical system is divided into a front lens unit on the object side of a largest air interval within the optical system and a rear lens unit on the image side of the largest air interval, and the front lens unit has a negative refractive power,
wherein an expression $|ff/f| < 1.5$ is satisfied where ff represents a focal length of the front lens unit, and f represents a focal length of the optical system.

3. The image pickup apparatus according to claim 1, wherein an expression is satisfied:

$0.52 < SK/FB < 1.10$ is satisfied where SK represents an air-equivalent distance from the surface of the optical system closest to the image side to the image pickup element.

4. The image pickup apparatus according to claim 1, wherein the optical system comprises six or less lenses.

5. The image pickup apparatus according to claim 4, wherein the optical system includes, in order from the object side to the image side, a negative lens, a negative lens, either one of a positive lens or a negative lens, a positive lens, and a negative lens, and
wherein an expression $0.05 < f1/f| < 0.60$ is satisfied where f1 represents a focal length of the negative lens closest to the object side, and f represents a focal length of the optical system.

6. The image pickup apparatus according to claim 5, wherein the optical system includes a first lens unit which consists of two negative lenses and a positive lens, and expressions $1.8 < n1av$; and $5 < v1n - v1p < 20$ are satisfied where n1av represents an average refractive index of the two negative lenses included in the first lens unit, v1n represents an average Abbe number of the two negative lenses included in the first lens unit, and v1p represents an Abbe number of the positive lens included in the first lens unit.

7. The image pickup apparatus according to claim 1, wherein an expression $0.2 < Lc/FB/\beta < 0.58$ is satisfied.

8. An image pickup apparatus to which an interchangeable lens is mountable, the image pickup apparatus comprising:
an image pickup element; and
an optical system configured to cause a focal length obtained by the optical system and the interchangeable lens to be different from that of the interchangeable lens,
wherein the expressions $0.1 < SK/Ls < 0.7$; and $2.0 < Ls/I < 4.0$ are satisfied where Ls represents a distance from a vertex of a lens surface, closest to an object side, of a lens of the optical system to the image pickup element, SK represents an air-equivalent distance from the image pickup element to a vertex of a lens surface, closest to an image side, of a lens among lenses, having refractive powers, of the optical system, and I represents a diagonal length of the image pickup element.

9. The image pickup apparatus according to claim 8, wherein an expression $0.1 < SK/BF < 0.7$ is satisfied where BF represents an air-equivalent back focus of the interchangeable lens mounted to the image pickup apparatus.

10. The image pickup apparatus according to claim 8, wherein an expression $$0.1 < La/Lc < 0.7$$

is satisfied where La represents a largest air interval in the optical system, and Lc represents a distance from the vertex of the lens surface, closest to the object side, of the optical system to the vertex of the lens surface, closest to the image side, of the optical system.

11. The image pickup apparatus according to claim 8,
wherein the optical system comprises a front lens unit having a negative refractive power on the object side of a largest air interval in the optical system and a rear lens unit having a positive refractive power on the image side of the largest air interval, and
wherein an expression $$0.05 < |ff/f| < 1.5$$

is satisfied where f represents a focal length of the optical system and ff represents a focal length of the front lens unit.

12. The image pickup apparatus according to claim 8, wherein an expression $$1.8 < nnav$$

is satisfied where nnav represents an average refractive index of lenses, having negative refractive powers, of the optical system.

13. The image pickup apparatus according to claim 8,
wherein the lens, closest to the object side, of the optical system has a negative refractive power, and
wherein an expression $$0.01 < |r2r1| < 0.9$$

is satisfied where r1 and r2 respectively represent a curvature radius of a lens surface on the object side and a curvature radius of a lens surface on the image side of the lens, closest to the object side, of the optical system,
wherein the lens, closest to the object side, of the optical system comprises either one of a single lens or a cemented lens.

14. The image pickup apparatus according to claim 8, wherein an expression $$-0.4 < Lo/Ls < 0.4$$

is satisfied where Lo represents a distance from a paraxial object point position of the optical system to a vertex of a lens surface on the image side of a lens having a strongest negative refractive power in the optical system, wherein the lens having the strongest negative refractive power in the optical system comprises either one of a single lens or a cemented lens.

15. The image pickup apparatus according to claim 8, further comprising an optical filter, which is arranged either in a largest air interval in the optical system
or on the object side of the optical system.

16. An image pickup system comprising:
an image pickup apparatus defined in claim 8; and
an interchangeable lens mounted to the image pickup apparatus.

17. An image pickup system comprising:
an image pickup apparatus, wherein the image pickup apparatus comprises:
a mount to which an interchangeable lens is mountable;
an optical system;
an image pickup element; and
an optical filter arranged between the optical system and the image pickup element,
wherein the optical system has a refractive power, and is configured to image an object point, which is located on an image side of a surface, closest to an object side, of the optical system, onto the image pickup element, and
wherein expressions $$1.0 < L/FB < 3.0;$$

$$1.0 < \beta < 3.0; \text{ and}$$

$$0.2 < Lc/FB/\beta < 0.6$$

are satisfied where FB represents an air-equivalent distance on an optical axis from a flange surface of the mount to the object point, L represents a distance on the optical axis from the flange surface to the image pickup element, and β represents a lateral magnification of the optical system under a state in which the interchangeable lens is mounted to the mount and the object point is imaged onto the image pickup element, Lc represents a distance from the surface, closest to the object side, of the optical system to a surface, closest to the image side, of the optical system; and
an interchangeable lens mounted to the mount.

* * * * *